United States Patent [19]
Yasui et al.

[11] Patent Number: 6,112,517
[45] Date of Patent: Sep. 5, 2000

[54] PLANT CONTROL SYSTEM

[75] Inventors: Yuji Yasui; Shusuke Akazaki; Yoshihisa Iwaki, all of Wako, Japan

[73] Assignee: Honda Giken Kogyo Kabushiki Kaisha, Tokyo, Japan

[21] Appl. No.: 09/153,300

[22] Filed: Sep. 15, 1998

[30] Foreign Application Priority Data

Sep. 16, 1997 [JP] Japan ................................ 9-251141
Apr. 16, 1998 [JP] Japan ................................ 10-106738

[51] Int. Cl.$^7$ .................................................. F01N 3/00
[52] U.S. Cl. ........................... 60/274; 60/285; 60/276; 123/674; 123/679; 701/103; 701/109
[58] Field of Search ........................... 60/274, 276, 285, 60/286, 277, 301, 297; 123/674, 679, 672; 701/103, 115, 109

[56] References Cited

U.S. PATENT DOCUMENTS

| | | | |
|---|---|---|---|
| 5,448,978 | 9/1995 | Hasegawa et al. | 123/480 |
| 5,479,897 | 1/1996 | Kawai et al. . | |
| 5,540,209 | 7/1996 | Hasegawa et al. . | |
| 5,590,638 | 1/1997 | Nishimura et al. | 123/687 |
| 5,682,317 | 10/1997 | Keeler et al. | 364/431.03 |
| 5,694,910 | 12/1997 | Hasegawa . | |
| 5,845,490 | 12/1998 | Yasui et al. | 60/276 |
| 5,845,491 | 12/1998 | Yasui et al. | 60/276 |
| 5,852,930 | 12/1998 | Yasui et al. | 60/276 |
| 5,880,952 | 3/1999 | Yasui et al. | 364/148.01 |
| 5,924,281 | 7/1999 | Yasui et al. | 60/276 |

FOREIGN PATENT DOCUMENTS

| | | |
|---|---|---|
| 0 518 289 | 12/1992 | European Pat. Off. . |
| 0 582 085 | 2/1994 | European Pat. Off. . |
| 0 728 926 | 8/1996 | European Pat. Off. . |
| 0 800 125 | 10/1997 | European Pat. Off. . |
| 4-369471 | 12/1992 | Japan . |
| 5-79374 | 3/1993 | Japan . |
| 5-321721 | 12/1993 | Japan . |
| 7-83094 | 3/1995 | Japan . |
| 7-259588 | 10/1995 | Japan . |
| 8-21273 | 1/1996 | Japan . |
| 8-105345 | 4/1996 | Japan . |
| 9-273438 | 10/1997 | Japan . |
| 9-324681 | 12/1997 | Japan . |

OTHER PUBLICATIONS

"Identification of a Pulsed Liquid—Liquid Extraction Column", NAJIM et al, *8th IFAC/IFORS Symposium*, vol. 2, Aug. 27, 1988, pp. 1165–1170.

*Primary Examiner*—Thomas Denion
*Assistant Examiner*—Binh Tran
*Attorney, Agent, or Firm*—Arent Fox Kintner Plotkin & Kahn

[57] ABSTRACT

A plant control system controls a plant modeled as a discrete-system model including an element relative to a response delay of the plant. The plant control system includes an actuator for generating an input to the plant, a first detector detecting an output from the plant, and a second detector for detecting the input to the plant which is generated by the actuator. An identifier identifies parameters to be established of the discrete-system model based on data representing an output of the first detector and data representing an output of the second detector. A manipulated variable determining unit determines a manipulated variable which determines the input to the plant to control operation of the actuator such that the output from the first detector will be equalized to a predetermined target value, according to a predetermining algorithm using the parameters of the discrete-system model which are identified by the identifier.

33 Claims, 25 Drawing Sheets

PLANT CONTROL SYSTEM

BACKGROUND OF THE INVENTION

1. Field of the Invention

The present invention relates to a plant control system.

2. Description of the Prior Art

It is desirable from the standpoint of environmental protection that systems for purifying an exhaust gas emitted from internal combustion engines on automobiles, for example, with a catalytic converter such as a three-way catalytic converter and discharging a purified exhaust gas control the air-fuel ratio of an exhaust gas emitted from an internal combustion engine and introduced into the catalytic converter at an appropriate air-fuel ratio which allows the catalytic converter to have a better ability to purify an exhaust gas. The air-fuel ratio of the exhaust gas is more accurately the ratio of air to fuel in an air-fuel mixture which generates the exhaust gas when combusted.

One conventional air-fuel ratio control system combined with an internal combustion engine has been disclosed in Japanese laid-open patent publication No. 5-321721 which corresponds to U.S. Pat. No. 5,426,935.

The disclosed air-fuel ratio control system has an exhaust gas sensor ($O_2$ sensor) disposed downstream of a catalytic converter for detecting the concentration of oxygen contained in an exhaust gas which has passed through the catalytic converter. The air-fuel ratio control system determines a target air-fuel ratio for the exhaust gas upstream of the catalytic converter according to a PID (proportional plus integral plus derivative) control process such that the oxygen concentration detected by the exhaust g as sensor will be of a predetermined target value. The air-fuel ratio control system then controls the internal combustion engine according to the target air-fuel ratio thereby to place the air-fuel ratio of the exhaust gas introduced into the catalytic converter (the air-fuel ratio of the air-fuel mixture to be combusted by the internal combustion engine) within a given range or window which enables the catalytic converter to have a good purifying ability.

In the above conventional air-fuel ratio control system, the exhaust system, including the catalytic converter, which ranges from a position upstream of the catalytic converter to a position downstream of the catalytic converter may be considered to be a plant for generating and emitting an exhaust gas having an oxygen concentration detected by the exhaust gas sensor, from an exhaust gas having a certain air-fuel ratio. The internal combustion engine may be considered to be an actuator for generating and emitting an exhaust gas having an air-fuel ratio to be supplied to the plant. Thus, the air-fuel ratio control system may be expressed as a system for determining a target input for the plant (more generally, a manipulated variable which defines an input to the plant) such that an output from the exhaust gas sensor (an oxygen concentration of the exhaust gas) as an output from the plant will be equalized to a given target value, and controlling an output of the internal combustion engine (=an input to the plant) as the actuator according to the target input.

As a result of various studies made by the inventors, it has been found that in order to keep the catalytic converter maximally effective to purify the exhaust gas regardless of aging thereof, it is necessary to adjust the concentration of a certain component, e.g., the concentration of oxygen, of the exhaust gas downstream of the catalytic converter to a predetermined target value with high accuracy. In the above conventional air-fuel ratio control system based on the PID control process, it is difficult to adjust the oxygen concentration of the exhaust gas having passed through the catalytic converter highly accurately to a given target value because of disturbances and a dead time present in the exhaust system of the internal combustion engine.

The inventors have devised a control system for controlling the air-fuel ratio of an exhaust gas introduced into a catalytic converter to equalize the output of an exhaust gas sensor positioned downstream of the catalytic converter to a predetermined target value based on a continuous system (specifically, a continues time system) into which an exhaust system including the catalytic converter and ranging from a position upstream of the catalytic converter to a position downstream of the catalytic converter (see, for example, U.S. patent application Ser. No. 08/833,091 (Japanese laid-open patent publication No. 9-324681) and U.S. patent application Ser. No. 08/835,192 (Japanese laid-open patent publication No. 9-273438)).

Based on the above continuous system model, it is possible to compensate for (eliminate) the effect of the dead time present in the exhaust system and construct a control system which employs a control process, e.g., a sliding mode control process for making disturbance control stability higher than a PID control process, and hence for increasing the accuracy and stability of air-fuel ratio control for the exhaust system.

According to the above control system, since the exhaust system including the catalytic converter is modeled as a continuous system, an algorithm for air-fuel ratio control is constructed on the continuous system model. However, because a computer for executing the algorithm can only perform discrete-time processing, it is tedious and time-consuming to effect processing operations with the computer.

Furthermore, inasmuch as the exhaust system including the catalytic converter is modeled as a continuous system, it is difficult to set parameters, including gain coefficients, of the continues system model in a manner to match various operating conditions of the exhaust system, and hence to model the exhaust system with accuracy. If an error between the model and the actual exhaust system, i.e., a modeling error, is too large, then it is difficult to carry out the control process stably for adjusting the output from the exhaust gas sensor downstream of the catalytic converter to the given target value.

The above drawbacks are not limited to the above air-fuel ratio control system, but may also be addressed to any arbitrary system in which in order to control an output from a plant at a predetermined target value, the plant is modeled as a continuous system.

SUMMARY OF THE INVENTION

It is therefore an object of the present invention to provide a plant control system which is controlled by a simple algorithm, suitable for being carried out by computer processing, for controlling an input to a plant such that an output from the plant will be equalized to a predetermined target value, and which is also capable of stably and highly accurately controlling the output from the plant at the predetermined target value.

Another object of the present invention is to provide a plant control system for controlling a plant comprising an exhaust system of an internal combustion engine which ranges from a position upstream of a catalytic converter for purifying an exhaust gas from the internal combustion engine to a position downstream of the catalytic converter, to control the air-fuel ratio of an exhaust gas introduced into the catalytic converter such that the concentration of a certain component of the exhaust gas downstream of the catalytic converter will be equalized to a predetermined target value.

To achieve the above objects, there is provided in accordance with the present invention a plant control system for controlling a plant modeled as a discrete-system model including an element relative to a response delay of the plant, comprising an actuator for generating an input to the plant, first detecting means for detecting an output from the plant, second detecting means for detecting the input to the plant which is generated by the actuator, identifying means for identifying parameters to be established of the discrete-system model based on data representing an output of the first detecting means and data representing an output of the second detecting means, and manipulated variable determining means for determining a manipulated variable which determines the input to the plant to control operation of the actuator such that the output from the first detecting means will be equalized to a predetermined target value, according to a predetermining algorithm using the parameters of the discrete-system model which are identified by the identifying means.

Since the identifying means can identify parameters to be established of the discrete-system model on a real-time basis based on the data representing the output of the first detecting means and the data representing the output of the second detecting means, the discrete-system model can be a highly accurate model which matches the actual plant irrespective of behavioral changes and characteristic changes of the plant. When the manipulated variable determining means determines the manipulated variable which determines the input to the plant, i.e., the output of the actuator, such that the output of the first detecting means will be equalized to the target value, according to the algorithm using the identified parameters of the discrete-system model, the manipulated variable matches the actual plant for thereby allowing the output of the first detecting means to be controlled at the target value stably and accurately. Since the algorithm for determining the manipulated variable uses the parameters of the discrete-system model, the algorithm can be constructed as a discrete time algorithm suitable for being carried out by computer processing.

Therefore, the algorithm for controlling the output of the plant at the predetermined target value can be of a simple process suitable for being carried out by computer processing, and the output of the first detecting means can be controlled at the target value stably and accurately.

More specifically, the plant comprises a system of an exhaust system of an internal combustion engine which ranges from a position upstream of a catalytic converter in the exhaust system to a position downstream of the catalytic converter, and wherein the input to the plant comprises an air-fuel ratio of an exhaust gas generated by the internal combustion engine as the actuator and introduced into the catalytic converter, and the output from the plant comprises the concentration of a component of the exhaust gas which has passed through the catalytic converter.

The parameters identified by the identifying means preferably include a gain coefficient of the element relative to the response delay of the discrete-system model.

The data representing the output of the first detecting means preferably comprises a difference between the output of the first detecting means and the target value, and the data representing the output of the second detecting means preferably comprises a difference between the output of the second detecting means and a predetermined reference value. With those data, the processing operation of the identifying means and the discrete-system model can easily be constructed.

It is possible to identify the parameters of the discrete-system model directly using the outputs from the first and second detecting means.

If a relatively long dead time exists in the plant, then the dead time serves as an obstacle to controlling the output of the first detecting means reliably at the target value. Particularly, if the plant comprises a system of an exhaust system of an internal combustion engine which ranges from a position upstream of a catalytic converter in the exhaust system to a position downstream of the catalytic converter, the dead time existing in the system tends to be relatively long.

The discrete-system model includes an element relative to a dead time of the plant, and the plant control system further comprises estimating means for generating data representing an estimated value of the output of the first detecting means after the dead time, based on the data representing the output of the first detecting means and the data representing the output of the second detecting means in the discrete-system model, the manipulated variable determining means comprising means for determining the manipulated variable such that the estimated value, represented by the data generated by the estimating means, of the output of the first detecting means after the dead time will be equalized to the target value.

The plant is modeled as a discrete-system model including an element relative to a response delay of the plant and an element relative to a dead time of the plant. Based on the discrete-system model, it is possible to generate data representing an estimated value of an output of the first detecting means after the dead time according to an algorithm suitable for being carried out by computer processing, from the data representing the outputs of the first and second detecting means. Because the parameters of the discrete-system model are identified to match the actual plant by the identifying means, the data representing the estimated value can appropriately be estimated depending on the actual plant. By determining the manipulated variable such that the estimated value of the output of the first detecting means will be equalized to the target value, the output of the first detecting means can be controlled at the target value accurately and stably while eliminating the effect of the dead time.

If the output of the first detecting means is estimated by the estimating means with respect to the discrete-system model including the element relative to the dead time, then the parameters identified by the identifying means preferably include a gain coefficient of the element relative to the response delay of the discrete-system model and a gain coefficient of the element relative to the dead time.

Preferably, the data representing the output of the first detecting means comprises a difference between the output of the first detecting means an d the target value, and the data representing the output of the second detecting means comprises a difference between the output of the second detecting means and a predetermined reference value, and wherein the data generated by the estimating means and representing the estimated value of the output of the first detecting means after the dead time comprises a difference between the estimated value of the output of the first detecting means and the target value. With those data, the data processing of the estimating means and the identifying means and the discrete-system model can easily be constructed. Since the manipulated variable determining means may determine the manipulated variable such that the difference between the estimated value, produced by the estimating means, of the output of the first detecting means and the target value is "0", the processing operation for determining the manipulated variable can easily be performed.

It is possible to identify the parameters of the discrete-system model and to generate the estimated value of the output of the first detecting means or to generate the difference between the estimated value and the target value, directly using the outputs from the first and second detecting means.

The manipulated variable determining means may comprise means for determining the manipulated variable from the data representing the output of the first detecting means according to a sliding mode control process.

Similarly, the manipulated variable determining means may comprise means for determining the manipulated variable from the data representing the estimated value of the output of the first detecting means after the dead time according to a sliding mode control process.

The sliding mode control process is a variable-structure feedback control process. According to the sliding mode control process, a plurality of state quantities of an object to be controlled are converged onto a hyperplane which is defined by a linear function whose variables are represented by the state quantities, and while the state quantities are being converged onto the hyperplane, the state quantities are converged toward a balanced point (each of the state quantities agrees with its own target value) on the hyperplane. The sliding mode control process is capable of converging the state quantities toward the balanced point on the hyperplane highly stably, without being affected by disturbances, once the state quantities are converged onto the hyperplane.

With the manipulated output determined according to the sliding mode control process, the output of the first detecting means can be controlled at the target value highly stably.

The state quantities for defining the hyperplane for the sliding mode control process may be a plurality of time-series data of the output of the first detecting means or its estimated value after the dead time.

If the sliding mode control process is employed to determine the manipulated variable, then the manipulated variable determining means may comprise means for determining the manipulated variable according to an adaptive sliding mode control process taking into account the effect of a disturbance or a modeling error.

The general sliding mode control process comprises a reaching control law for converging state quantities to be controlled onto a hyperplane and a control law (so-called equivalent control input) for converging the state quantities toward a balanced point on the hyperplane while converging the state quantities onto the hyperplane. If there is a disturbance or a modeling error of an object to be controlled by the sliding mode control process, it is often difficult to converge the state quantities onto the hyperplane only with the reaching control law. According to the adaptive sliding mode control process, an adaptive control law is additionally employed to compensate for a disturbance or a modeling error in converging the state quantities onto the hyperplane. The adaptive sliding mode control process makes it possible to converge the state quantities to be controlled stably onto the hyperplane while minimizing the effect of disturbances with the reaching control law and the adaptive control law.

When the manipulated variable is determined according to the adaptive sliding mode control process, the output of the first detecting means can stably be controlled at the target value while eliminating the effect of disturbances.

The manipulated variable to be determined by the manipulated variable determining means comprises a target input to the plant, and the plant control system further comprises feedback control means for feedback-controlling operation of the actuator such that the output of the second detecting means will be equalized to the target input.

Since the manipulated variable to be determined by the manipulated variable determining means comprises a target input to the plant (a target output of the actuator), and the plant control system feedback-controls operation of the actuator such that the output of the second detecting means will be equalized to the target input, the input to the plant can accurately be controlled at the target input determined by the manipulated variable determining unit such that the output of the first detecting means will be equalized to the target value.

The manipulated variable determined by the manipulated variable determining unit is not limited to the target input to the plant, but may be a corrective amount of operation of the actuator, e.g., a corrective quantity for the amount of supplied fuel if the actuator comprises an internal combustion engine. When the manipulated variable is the target input to the plant, it is possible to control the amount of operation of the actuator in a feed-forward manner from the target input, i.e., the target output of the actuator.

When the plant control system has the feedback control means, the feedback control means preferably comprises a recursive-type controller.

The recursive-type controller comprises an adaptive controller, an optimum regulator, etc. When the recursive-type controller feedback-controls operation of the actuator such that the output of the second detecting means will be equalized to the target input, the input to the plant can be controlled at the target input while accurately following dynamic changes including changes in the operation of the actuator and time-depending characteristic changes thereof. The ability for the output of the first detecting means to follow the target value can also be increased.

The recursive-type controller determines a new feedback control quantity according to a predetermined recursive formula including a given number of previous time-series data of the feedback control quantity for operation of the actuator, e.g., a corrective quantity for the amount of supplied fuel if the actuator comprises an internal combustion engine.

The recursive-type controller preferably comprises an adaptive controller.

If the manipulated variable for controlling the output of the first detecting means at the target value using the parameters of the discrete-system model which are identified by the identifying means, it is preferable that the frequency characteristics of the gain of a change in the output of the actual plant with respect to a chain in the input thereto should basically have the same tendency as the frequency characteristics of the gain of a change in the output of the discrete-system model with respect to a chain in the input thereto.

The parameters can be identified by the identifying means using an algorithm which identifies the parameters such that an error between an identified value of the data representing the output of the first detecting means on the discrete-system model and the data representing the actual output of the first detecting means will be minimized. When the parameters are identified using such an algorithm, importance is often attached to behavioral changes of the outputs of the first and second detecting means in a frequency band that is different from the frequency band in which the gain of the actual plant is relatively large. In such a case, the frequency characteristics of the gain of the actual plant and the frequency characteristics of the gain of the discrete-system model do not match each other, making it difficult to determine the manipulated variable appropriately for controlling the output of the first detecting means at the target value.

Specifically, the actual plant often has a high-gain frequency band (which is generally a low frequency band) in which the gain of a change in the output of the actual plant with respect to a chain in the input thereto is relatively large, and a low-gain frequency band (which is generally a frequency band higher than the high-gain frequency band) in which the gain is relatively small. For example, if the plant comprises an exhaust system including a catalytic converter, then the gain of the plant is generally relatively large in a low frequency band, and the gain is relatively small in a frequency band higher than the low frequency band. If the parameters of the discrete-system model of the plant are identified using a standard identifying algorithm, then important is attached to the gain characteristics in the low-gain frequency band of the discrete-system model of the plant whose characteristics are determined by the identified parameters, and the gain of a change in the output of the discrete-system model with respect to a change in the input thereto tends to be smaller at all frequencies than the gain of a change in the output of the actual plant with respect to a change in the input thereto. Such a tendency manifests itself in the high-gain frequency band.

If the parameters of the discrete-system model of the plant are thus identified, then when the output of the actual plant (the output of the first detecting means) changes with respect to the target value due to a disturbance-induced change in the input in the high-gain frequency band, the manipulated variable determining means which determines the manipulated variable (the manipulated variable for the input to the plant) using the parameters of the discrete-system model recognizes that there is developed a larger input change than an input change in the actual plant. The manipulated variable determining means then changes the manipulated variable excessively in order to cancel the input change, with the result that the process of controlling the output of the first detecting means at the target value will be unstable.

In view of the above drawback, the identifying means comprises means for identifying the parameters according to an algorithm to minimize an error between an identified value of the data representing the output of the first detecting means in the discrete-system model and the data representing actual data of the first detecting means, further comprising means for filtering the identified value of the data representing the output of the first detecting means in the discrete-system model and the data representing the actual data of the first detecting means with predetermined identical frequency characteristics having a predetermined weighted frequency band when the identifying means calculates the error.

When the identifying means calculates the error, it filters the identified value of the data representing the output of the first detecting means in the discrete-system model and the data representing the actual data of the first detecting means with predetermined identical frequency characteristics having a predetermined weighted frequency band. Therefore, the error for identifying the parameters can be determined by attaching importance to the frequency band in which the gain of the actual plant is relatively large. By identifying the parameters so as to minimize the error, the frequency characteristics of the gain of the actual plant and the frequency characteristics of the gain of the discrete-system model can be matched. By determining the manipulated variable using the identified parameters of the discrete-system model, it is possible to determine the manipulated variable suitable for controlling the output of the first detecting means at the target value.

The above filtering may eventually be effected on the identified value of the data representing the output of the first detecting means and the data representing the actual output of the first detecting means. Therefore, the error may be filtered, or the error may be determined after the data representing the outputs of the first and second detecting means required to determine the identified value have been filtered.

For the above filtering, the frequency characteristics are preferably established such that frequency characteristics of a gain of the discrete-system model and frequency characteristics of a gain of the plant have substantially identical tendencies, and the gain at each frequency of the discrete-system model is greater than the gain at each frequency of the plant.

With the filtering frequency characteristics thus established, since the parameters are identified such that the gain at each frequency of the discrete-system model is greater than the gain at each frequency of the actual plant, a change in the output of the discrete-system model with respect to a chain in the input thereto is greater than a change in the output of the actual plant at each frequency. Consequently, when the output of the actual plant changes with respect to the target value due to a disturbance-induced input change, the manipulated variable determining means which determines the manipulated variable using the parameters of the discrete-system model recognizes that there is developed a smaller input change than an input change in the actual plant. The manipulated variable determining means then determines a change in the manipulated variable as a small change as a whole. Therefore, when the output of the input detecting means is controlled at the target value, the input to the plant is prevented from changing excessively, resulting in stably controlling the output of the input detecting means.

Alternatively, the frequency characteristics may be established such that frequency characteristics of a gain of the discrete-system model and frequency characteristics of a gain of the plant have substantially identical tendencies, and the gain at each frequency of the discrete-system model is greater than the gain at each frequency of the plant in a frequency band other than the predetermined weighted frequency band.

With this arrangement, the frequency characteristics of the gain of the discrete-system model in the high-gain frequency band in which the gain of the plant is relatively large are substantially the same as the frequency characteristics of the gain of the actual plant, and in the low-gain frequency band in which the gain of the plant is relatively small, it is possible to identify the parameters of the discrete-system model such that the gain at each frequency of the discrete-system model will be greater than the gain at each frequency of the actual plant. Therefore, in the high-gain frequency band of the plant which is important for controlling the output of the first detecting means at the target value, when the output of the first detecting means changes with respect to the target value, the manipulated variable is determined such that the output of the first detecting means will quickly return to the target value according to the characteristics of the actual plant. Consequently, the output of the first detecting means can be controlled at the target value with a quick tracking capability, i.e., a quick response. In the low-gain frequency band, as described above, since the manipulated variable is determined as a relatively small manipulated variable, the control stability can be increased.

The identifying means preferably comprise means for identifying the parameters depending on a particular behavior of the output of the first detecting means.

According to a finding of the inventors, there is a behavioral state of the output of the first detecting means, which is capable of identifying the parameters of the discrete-system model that are suitable for determining the manipulated variable to control the output of the first detecting means at the target value. In other behavioral states of the output of the first detecting means, the magnitudes of the identified parameters may be too small to be appropriate for determining the manipulated variable.

By identifying the parameters depending on the particular behavior of the output of the first detecting means, it is possible to identify the parameters suitable for controlling the output of the first detecting means at the target value.

If the plant comprises an exhaust system including a catalytic converter, and also if the first detecting means comprises an oxygen concentration sensor for detecting an oxygen concentration in the exhaust gas which has passed through the catalytic converter (at this time, the output of the first detecting means corresponds to the air-fuel ratio of the exhaust gas having passed through the catalytic converter), then the particular behavior is preferably such that the air-fuel ratio of the exhaust gas represented by the output of the first detecting means changes from a lean side to a rich side.

The identifying means may comprise means for deciding whether the output of the first detecting means is having the particular behavior, based on a value of a predetermined function determined by a plurality of present and previous time-series data representing the output of the first detecting means.

In the above plant control system, when the values of the parameters identified by the identifying means are inappropriate, the manipulated variable determined by the manipulated variable determining means may become inappropriate for controlling the output of the first detecting means (the output of the plant) at the target value.

Even when the parameters which are not problematic in controlling the output of the first detecting means at the target value are identified by the identifying means, the manipulated variable determined using the parameters may fluctuate frequently or oscillate with time at a high frequency depending on the values of the parameters. In this case, though no problem arises in controlling the output of the first detecting means at the target value, since the manipulated variable which determines the input to the plant fluctuates frequently, the operation of the actuator also fluctuates frequently. Such a situation is not preferable for stably operating the actuator. If the plant comprises an exhaust system including a catalytic converter and the actuator for generating the input to the plant (the air-fuel ratio of the exhaust gas introduced into the catalytic converter) comprises an internal combustion engine, then the frequent fluctuation of the manipulated variable, i.e., the manipulated variable which determines the air-fuel ratio, is not preferable for stably operating the internal combustion engine.

If the estimating means is provided, and the estimating means generates date representing an estimated value of the output of the first detecting means after the dead time according to a predetermined estimating algorithm using the data representing the outputs of the first and second detecting means and a plurality of coefficient values determined by the parameters identified by the identifying means, then whether the manipulated variable fluctuates frequently is likely to be affected by combinations of the coefficient values.

The identifying means comprises means for limiting values of the parameters to be identified by the identifying means to values which satisfy predetermined conditions.

Particularly if the estimating means is provided, and the estimating means comprises means for generating the data representing the estimated value of the output of the first detecting means after the dead time, according to a predetermined estimating algorithm using the data representing the output of the first detecting means and the data representing the output of the second detecting means and a plurality of coefficient values determined by values of the parameters to be identified by the identifying means, then the identifying means comprises means for limiting the values of the parameters to values which satisfy predetermined conditions, the predetermined conditions being established such that the coefficient values determined by the values of the parameters are provided in a predetermined combination.

When the parameters identified by the identifying means are limited to the values which satisfy predetermined conditions, the manipulated variable determined by the manipulated variable determining means is prevented from becoming inappropriate for controlling the output of the first detecting means (the output of the plant) at the target value, or from fluctuating frequently.

The predetermined conditions may be determined through experimentation or simulation.

If there are plural parameters to be identified by the identifying means in limiting the parameters, then a predetermined condition for independently limiting each of the parameters, e.g., a range for the value of each of the parameters, may be established. Preferably, however, the predetermined conditions include a condition for limiting combinations of values of at least two of the parameters to a predetermined combination.

Therefore, if there are plural parameters, then the predetermined conditions include a condition for limiting combinations of values of at least two of the parameters to a predetermined combination, so that the output of the first detecting means (the output of the plant) can be controlled at the target value without excessively limiting the value of each of the parameters, and optimum values of the parameters can be identified for maintaining stability of the manipulated variable, i.e., for smoothing a time-dependent change in the manipulated variable.

The predetermined conditions preferably include a condition for limiting a value of at least one of the parameters to be identified by the identifying means to upper and lower limit values.

Generally, if the values of the identified parameters are too large or too small, even when the manipulated variable is determined using these parameters and the input to the plant (the output of the actuator) is controlled using the manipulated variable thus determined, the output of the first detecting means often fails to be controlled at the target value. When the predetermined conditions include a condition for limiting a value of at least one of the parameters to upper and lower limit values, the value of the parameter is prevented from becoming excessively large or excessively small, so that the controllability of the output of the plant is prevented from being lowered.

If the identifying means comprises means for updating and identifying the values of the parameters which have been determined in past control cycles, in each control cycle, then the values in the past of the parameters used in the algorithm are preferably limited to values which satisfy the predetermined conditions.

By updating and identifying the values of the parameters using the values in the past of the parameters limited to values which satisfy the predetermined conditions, the values of the parameters which satisfy the predetermined conditions can be identified with ease.

If the element relative to the response delay of the discrete-system model includes an element relative to a primary autoregressive term and an element relative to a secondary autoregressive term, and the parameters to be identified by the identifying means including a first gain coefficient of the element relative to the primary autoregressive term and a second gain coefficient of the element relative to the secondary autoregressive term, then the predetermined conditions are established such that a point on a coordinate plane having two coordinate components represented by values of the first and second gain coefficients resides in a predetermined range defined on the coordinate plane.

When the predetermining conditions for limiting the values of the first and second coefficients that are the above parameters are thus established in a predetermined range defined on the coordinate plane, combinations of the values of the first and second coefficients can be limited to appropriate combinations.

The predetermined range may have any shape, but preferably has straight boundaries.

Since the boundaries of the predetermined range are straight, they can be represented by a single functional expression (including a constant-valued function parallel to the coordinate axes). Thus, it is easy to decide whether the values of the first and second gain coefficients satisfy the predetermined conditions or not, i.e., whether a point on the coordinate plate whose coordinate components are represented by the values of the first and second gain coefficients exists in the predetermined range, and also to limit those values to the values which satisfy the predetermined conditions.

The predetermined range has boundaries, at least part of the boundaries being defined by a predetermined functional expression having variables represented by the first and second gain coefficients.

With the boundaries thus defined, the predetermined conditions determined by the predetermined range can be established by a combination in which the values of the first and second gain coefficients are correlated to each other, and it is possible to establish the predetermined conditions optimally for controlling the output of the first detecting means at the target value and also for determining the manipulated variable, i.e., the manipulated variable for generating a smooth change, stably with the manipulated variable determining means.

If the predetermined range is established for limiting the values of the first and second gain coefficients, then the identifying means comprises means for changing the values of the first and second gain coefficients to values in the predetermined range to minimize a change in the value of the first gain coefficient for thereby limiting the values of the first and second gain coefficients, if a point on the coordinate plane determined by the values of the first and second gain coefficients identified based on the data representing the outputs of the first and second detecting means deviates from the predetermined range.

Specifically, the value of the first gain coefficient of the element relative to the primary autoregressive term of the discrete-system model is more important than the value of the second gain coefficient of the element relative to the second autoregressive term thereof in maintaining the reliability of the manipulated variable which is determined by the manipulated variable determining means. This is because the lower-order autoregressive term (newer autoregressive term) is more highly correlated to the present output of the plant (the output of the first detecting means) and more highly reliable. Therefore, when the point on the coordinate plane determined by the values of the first and second gain coefficients identified based on the data representing the outputs of the first and second detecting means deviates from the predetermined range, if the value of the first gain coefficient is changed excessively largely in order to limit the values of the first and second gain coefficients to values of a point within the predetermined range, then the manipulated variable tends to change abruptly. According to the present invention, for limiting the values of the first and second gain coefficients, the values of the first and second gain coefficients are limited to values of a point within the predetermined range in order to minimize the change of the value of the first gain coefficient. In this manner, the manipulated variable is prevented from changing abruptly by limiting the values of the first and second gain coefficients.

In the plant control apparatus according to the present invention, it is possible to prevent inappropriate parameter values from being identified by limiting the parameters identified by the identifying means to values which satisfy the predetermined conditions. However, in order to prevent inappropriate parameter values for controlling the output of the first detecting means at the target value from being identified, the following process may be employed:

The plant control system may further comprise means for determining stability of a process carried out by the identifying means to identify the parameters, the identifying means comprising means for resetting values of the parameters or a predetermined variable used by the identifying means in the process to identify the parameters, to a predetermined initial value if the process carried out by the identifying means to identify the parameters is judged as being unstable.

Alternatively, the plant control system may further comprises means for determining stability of a process carried out by the manipulated variable determining means to determine the manipulated variable, the identifying means comprising means for resetting values of the parameters or a predetermined variable used by the identifying means in a process to identify the parameters, to a predetermined initial value if the process carried out by the manipulated variable determining means to determine the manipulated variable is judged as being unstable.

With these arrangements, if the process of identifying the parameters with the identifying means is unstable, resulting in a danger for the parameters to be identified as inappropriate values, or if inappropriately identified parameters are used to make unstable the process of determining the manipulated variable with the manipulated variable determining means, then the identifying means resets values of the parameters or a predetermined variable used by the identifying means in a process to identify the parameters, to a predetermined initial value. As a result, the output of the first detecting means is prevented from being abnormally controlled using inappropriately parameter values.

If the plant is a system that ranges from a position upstream of the catalytic converter to a position downstream of the catalytic converter, of the exhaust system of the internal combustion engine, then the first detecting means preferably comprises an oxygen concentration sensor, and a target value for the output of the oxygen concentration sensor is preferably a predetermined constant value for the purpose of achieving an optimum purifying performance level for the catalytic converter.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A plant control system according to a first embodiment of the present invention will be described below with reference to FIGS. 1 through 23. According to the first embodiment, the plant control system is a system for controlling a plant which comprises an exhaust system of an internal combustion engine that ranges from a position upstream of a catalytic converter for purifying an exhaust gas emitted from the internal combustion engine to a position downstream of the catalytic converter.

Figure 1:
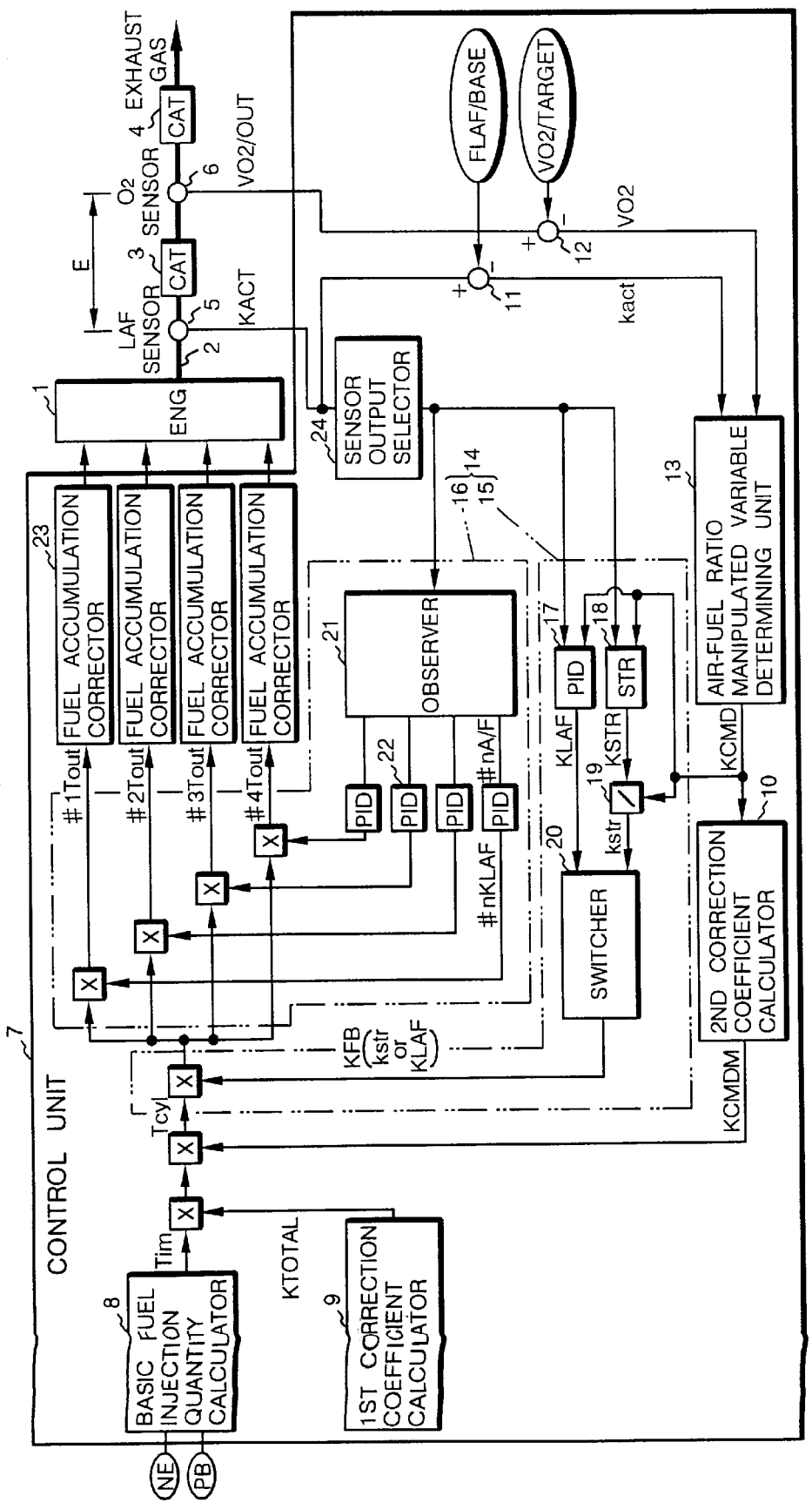
FIG. 1 is a block diagram of a plant control system according to a first embodiment of the present invention.
Figure 2:
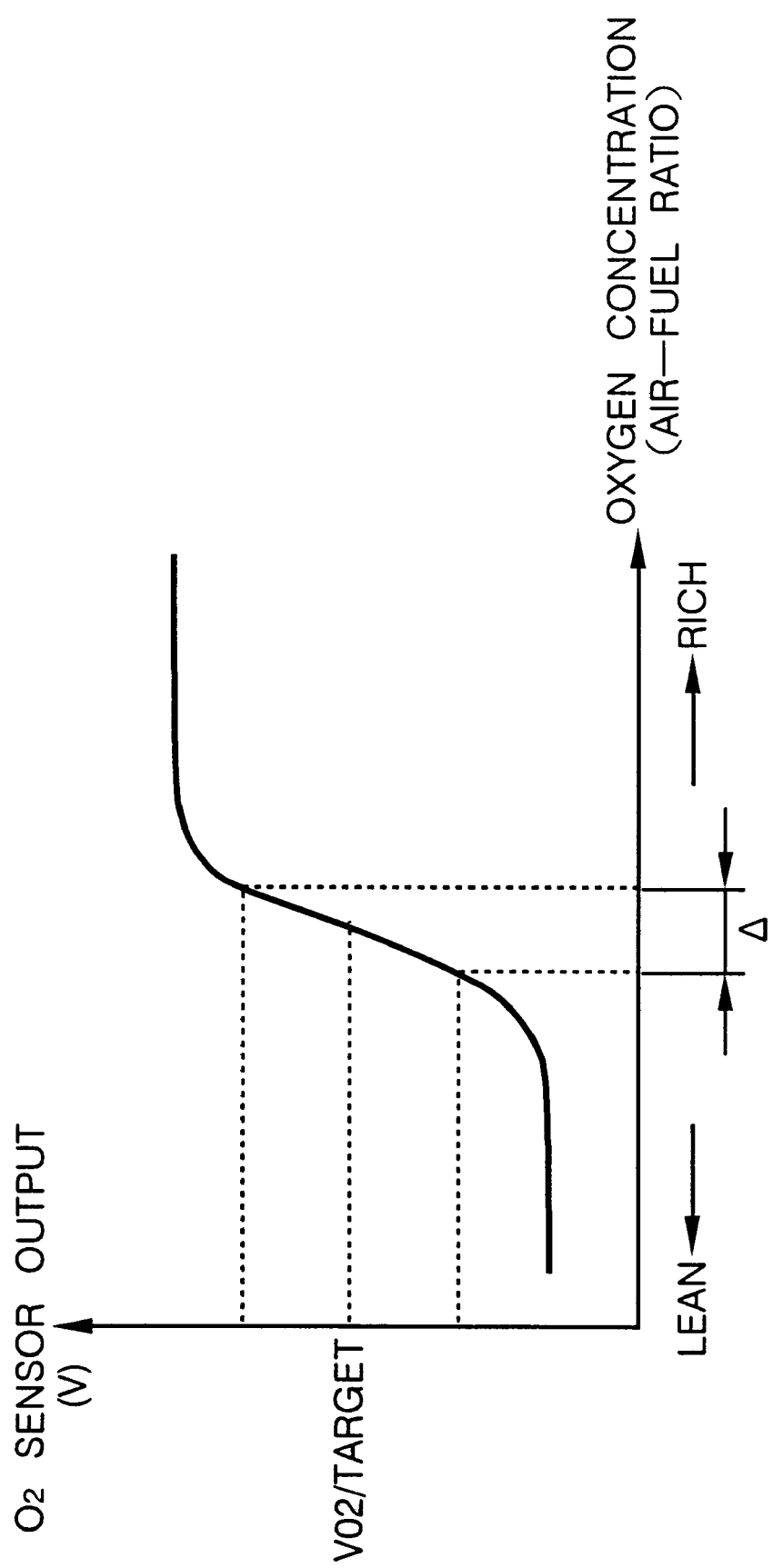
FIG. 2 is a diagram showing output characteristics of an $O_2$ sensor used in the plant control system shown in FIG. 1.

FIG. 1 shows in block form the plant control system according to the first embodiment. As shown in FIG. 1, an internal combustion engine 1 such as a four-cylinder internal combustion engine generates an exhaust gas which is emitted from each cylinder into a common discharge pipe 2 positioned n ear the internal combustion engine 1, from which the exhaust gas is discharged into the atmosphere. Two three-way catalytic converters 3, 4 are mounted in the common exhaust pipe 2 at successively downstream locations thereon. The downstream catalytic converter 4 may be dispensed with. The internal combustion engine 1 corresponds to an actuator.

The plant control system serves to control an air-fuel ratio in the exhaust system of the internal combustion engine 1. The plant control system comprises a wide-range air-fuel ratio sensor 5 mounted on the exhaust pipe 2 upstream of the catalytic converter 3, or more precisely at a position where exhaust gases from the cylinders of the internal combustion engine 1 are put together, an $O_2$ sensor (oxygen concentration sensor) 6 mounted as an first detecting means on the exhaust pipe 2 downstream of the catalytic converter 3 and upstream of the catalytic converter 4, and a control unit 7 for carrying out a control process (described later on) based on detected output signals from the sensors 5, 6. The control unit 7 is supplied with detected output signals from the sensors 5, 6 and also detected output signals from various other sensors for detecting operating conditions of the internal combustion engine 1, including a engine speed sensor, an intake pressure sensor, a coolant temperature sensor, etc.

The wide-range air-fuel ratio sensor 5 is in the form of an O₂ sensor, and outputs a signal having a level depending on the air-fuel ratio of an exhaust gas emitted from the internal combustion engine 1 and introduced into the catalytic converter 3. More precisely, the air-fuel ratio is the same as the air-fuel ratio of an air-fuel mixture that is supplied to and burned in the internal combustion engine 1 to produce the exhaust gas introduced into the catalytic converter. The air-fuel ratio is represented by the oxygen concentration of the exhaust gas introduced into the catalytic converter. The output signal from the wide-range air-fuel ratio sensor 5 (hereinafter referred to as an LAF sensor 5) is processed by a detecting circuit such as a linearizer (not shown) into a signal having an output signal KACT having a level which is proportional to the air-fuel ratio of the exhaust gas introduced into the catalytic converter in a wide range of air-fuel ratios, i.e., an output signal KACT representative of a detected value of the air-fuel ratio of the exhaust gas. The LAF sensor 5 is disclosed in detail in Japanese laid-open patent publication No. 4-369471, which corresponds to U.S. Pat. No. 5,391,282, and will not be described below.

The O₂ sensor 6 disposed downstream of the catalytic converter 3 generates an output signal VO2/OUT having a level depending on the oxygen concentration of the exhaust gas that has passed through the catalytic converter 3, i.e., an output signal VO2/OUT representing a detected value of the oxygen concentration of the exhaust gas, as with ordinary O₂ sensors. The output signal VO2/OUT from the O₂ sensor 6 will change with high sensitivity in proportion to the oxygen concentration of the exhaust gas that has passed through the catalytic converter 3, with the air-fuel ratio (oxygen concentration) of the exhaust gas being in a range Δ close to a stoicheometric air-fuel ratio.

The control unit 7 comprises a microcomputer and has, as its main functions, a basic fuel injection quantity calculator 8 for determining a basic fuel injection quantity Tim to be injected into the internal combustion engine 1, a first correction coefficient calculator 9 for determining a first correction coefficient KTOTAL to correct the basic fuel injection quantity Tim, and a second correction coefficient calculator 10 for determining a second correction coefficient KCMDM to correct the basic fuel injection quantity Tim.

The basic fuel injection quantity calculator 8 determines a reference fuel injection quantity from the rotational speed NE and intake pressure PB of the internal combustion engine 1 using a predetermined map, and corrects the determined reference fuel injection quantity depending on the effective opening area of a throttle valve (not shown) of the internal combustion engine 1, thereby calculating a basic fuel injection quantity Tim.

The first correction coefficient KTOTAL determined by the first correction coefficient calculator 9 serves to correct the basic fuel injection quantity Tim in view of an exhaust gas recirculation ratio of the internal combustion engine 1, i.e., the proportion of an exhaust gas contained in an air-fuel mixture introduced into the internal combustion engine 1, an amount of purged fuel supplied to the internal combustion engine 1 when a canister (not shown) is purged, a coolant temperature, an intake temperature, etc.

The second correction coefficient KCMDM determined by the second correction coefficient calculator 10 serves to correct the basic fuel injection quantity Tim in view of the charging efficiency of an air-fuel mixture due to the cooling effect of fuel flowing into the internal combustion engine 1 depending on a target air-fuel ratio KCMD determined by an air-fuel ratio manipulated variable determining unit 13 (described later on).

The control unit 7 corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the internal combustion engine 1.

Specific details of processes for calculating the basic fuel injection quantity Tim, the first correction coefficient KTOTAL, and the second correction coefficient KCMDM are disclosed in detail in Japanese laid-open patent publication No. 5-79374 (U.S. Pat. No. 5,253,630), and will not be described below.

The control unit 7 also has a subtractor 11 for determining a difference kact (=KACT−FLAF/BASE) between the output signal KACT from the LAF sensor 5 and a predetermined reference value FLAF/BASE (which is established as about "1" (constant value) converted as an air-fuel ratio in the first embodiment), a subtractor 12 for determining a difference VO2 (=VO2/OUT−VO2/TARGET) between the output signal VO2/OUT from the O₂ sensor 6 and a target value VO2/TARGET therefor (which is established as a constant value for achieving optimum exhaust gas purifying performance of the catalytic converter 3), an air-fuel ratio manipulated variable determining unit 13 (manipulated variable determining means) for determining a target air-fuel ratio KCMD for the exhaust gas at the LAF sensor as a manipulated variable for determining the air-fuel ratio of the exhaust gas emitted from the internal combustion engine 1 and introduced into the catalytic converter 3, using data of the differences kact, VO2 as data representing the output signals from the LAF sensor 5 and the O₂ sensor 6, and a feedback controller 14 (feedback control means) for feedback-controlling a fuel injection quantity (fuel supply quantity) of the internal combustion engine 1 so as to converge the output signal KACT of the LAF sensor 5 (the detected air-fuel ratio of the exhaust gas introduced into the catalytic converter 3) toward the target air-fuel ratio KCMD.

The air-fuel ratio manipulated variable determining unit 13, whose details will be described later on, handles an exhaust system (denoted by E in FIG. 1) including the catalytic converter 3, which ranges from the LAF sensor 5 to the O₂ sensor 6 along the exhaust pipe 2, as a plant to be controlled. The air-fuel ratio manipulated variable determining unit 13 sequentially determines the target air-fuel ratio KCMD for the exhaust gas at the LAF sensor 5 so as to adjust the output signal VO2/OUT of the O₂ sensor 6 to the target value VO2/TARGET therefor, i.e., to converge the output signal VO2/OUT of the O₂ sensor 6 toward "0", according to a sliding mode control process, or more precisely, an adaptive sliding mode control process, in view of a dead time present in the exhaust system E (plant) to be controlled and behavioral changes of the exhaust system E.

The feedback controller 14 comprises a general feedback controller 15 for feedback-controlling a total fuel injection quantity for all the cylinders of the internal combustion engine 1 and a local feedback controller 16 for feedback-controlling a fuel injection quantity for each of the cylinders of the internal combustion engine 1.

The general feedback controller 15 sequentially determines a feedback correction coefficient KFB to correct the demand fuel injection quantity Tcyl (by multiplying the demand fuel injection quantity Tcyl) so as to converge the output signal KACT from the LAF sensor 5 toward the target air-fuel ratio KCMD. The general feedback controller 15 comprises a PID controller 17 for determining a feedback manipulated variable KLAF as the feedback correction coefficient KFB depending on the difference between the output signal KACT from the LAF sensor 5 and the target air-fuel ratio KCMD according to a known PID control process, and an adaptive controller 18 (indicated by "STR" in FIG. 1) which is a recursive-type controller for adaptively determining a feedback manipulated variable KSTR for determining the feedback correction coefficient KFB in view of changes in operating conditions of the internal combustion engine 1 or characteristic changes thereof from the output signal KACT from the LAF sensor 5 and the target air-fuel ratio KCMD.

In the first embodiment, the feedback manipulated variable KLAF generated by the PID controller 17 is of "1" and can be used directly as the feedback correction coefficient KFB when the output signal KACT (the detected air-fuel ratio) from the LAF sensor 5 is equal to the target air-fuel ratio KCMD. The feedback manipulated variable KSTR generated by the adaptive controller 18 becomes the target air-fuel ratio KCMD when the output signal KACT from the LAF sensor 5 is equal to the target air-fuel ratio KCMD. A feedback manipulated variable kstr (=KSTR/KCMD) which is produced by dividing the feedback manipulated variable KSTR by the target air-fuel ratio KCMD with a divider 19 can be used as the feedback correction coefficient KFB.

The feedback manipulated variable KLAF generated by the PID controller 17 and the feedback manipulated variable kstr which is produced by dividing the feedback manipulated variable KSTR from the adaptive controller 18 by the target air-fuel ratio KCMD are selected one at a time by a switcher 20. A selected one of the feedback manipulated variable KLAF and the feedback manipulated variable KSTR is used as the feedback correction coefficient KFB. The demand fuel injection quantity Tcyl is corrected by being multiplied by the feedback correction coefficient KFB. Details of the general feedback controller 15 (particularly, the adaptive controller 18) will be described later on.

The local feedback controller 16 comprises an observer 21 for estimating real air-fuel ratios #nA/F (n=1, 2, 3, 4) of the respective cylinders from the output signal KACT from the LAF sensor 5, and a plurality of PID controllers 22 (as many as the number of the cylinders) for determining respective feedback correction coefficients #nKLAF for fuel injection quantities for the cylinders from the respective seal air-fuel ratios #nA/F estimated by the observer 21 according to a PID control process so as to eliminate variations of the air-fuel ratios of the cylinders.

Briefly stated, the observer 21 estimates a real air-fuel ratio #nA/F of each of the cylinders as follows: A system from the internal combustion engine 1 to the LAF sensor 5 (where the exhaust gases from the cylinders are combined) is considered to be a system for generating an air-fuel ratio detected by the LAF sensor 5 from a real air-fuel ratio #nA/F of each of the cylinders, and is modeled in view of a detection response delay (e.g., a time lag of first order) of the LAF sensor 5 and a chronological contribution of the air-fuel ratio of each of the cylinders to the air-fuel ratio in the position where the exhaust gases from the cylinders are combined. Based on the modeled system, a real air-fuel ratio #nA/F of each of the cylinders is estimated from the output signal KACT (the detected air-fuel ratio) from the LAF sensor 5.

Details of the observer 21 are disclosed in Japanese laid-open patent publication No. 7-83094, which corresponds to U.S. Pat. No. 5,531,208, for example, and will not be described below.

Each of the PID controllers 22 of the local feedback controller 16 divides the output signal KACT from the LAF sensor 5 by an average value of the feedback correction coefficients #nKLAF determined by the respective PID controllers 22 in a preceding control cycle to produce a quotient value, and uses the quotient value as a target air-fuel ratio for the corresponding cylinder. Each of the PID controllers 22 then determines a feedback correction coefficient #nKLAF in a present control cycle so as to eliminate any difference between the target air-fuel ratio and the corresponding real air-fuel ratio #nA/F determined by the observer 21.

The local feedback controller 16 multi plies a value, which has been produced by multiplying the demand fuel injection quantity Tcyl by the selected feedback correction coefficient KFB produced by the general feedback controller 15, by the feedback correction coefficient #nKLAF for each of the cylinders, thereby determining an output fuel injection quantity #nTout (n=1, 2, 3, 4) for each of the cylinders.

The output fuel injection quantity #nTout thus determined for each of the cylinders is corrected for accumulated fuel particles on intake pipe walls of the internal combustion engine 1 by a fuel accumulation corrector 23 in the control unit 7. The corrected output fuel injection quantity #nTout is applied to each of fuel injectors (not shown) of the internal combustion engine 1, which injects fuel into each of the cylinders with the corrected output fuel injection quantity #nTout.

The correction of the output fuel injection quantity in view of accumulated fuel particles on intake pipe walls is disclosed in detail in Japanese laid-open patent publication No. 8-21273, which corresponds to U.S. Pat. No. 5,568,799, for example, and will not be described in detail below.

A sensor output selector 24 shown in FIG. 1 serves to select the output signal KACT from the LAF sensor 5, which is suitable for the estimation of a real air-fuel ratio #nA/F of each cylinder with the observer 21, depending on the operating conditions of the internal combustion engine 1. Details of the sensor output selector 24 are disclosed in detail in Japanese laid-open patent publication No. 7-259588, which corresponds to U.S. Pat. No. 5,540,209, and will not be described in detail below.

The air-fuel ratio manipulated variable determining unit 13 will be described in detail below.

As described above, the air-fuel ratio manipulated variable determining unit 13 sequentially determines the target air-fuel ratio KCMD for the exhaust gas at the LAF sensor 5 so as to adjust the output signal VO2/OUT of the $O_2$ sensor 6 to the target value VO2/TARGET therefor, according to an adaptive sliding mode control process in view of a dead time present in the exhaust system E and behavioral changes of the exhaust system E. In order to carry out such a control process, according to the first embodiment, the exhaust system E is regarded as a plant for generating the output signal VO2/OUT of the $O_2$ sensor 6 (the oxygen concentration of the exhaust gas having passed through the catalytic converter 3) from the output signal KACT of the LAF sensor 5 (the air-fuel ratio of the exhaust gas introduced into the catalytic converter 3) via a dead time element and a response delay element, and the plant is modeled as a discrete system.

For simplifying the processing by the air-fuel ratio manipulated variable determining unit 13, the discrete-system model of the exhaust system E is expressed, using the differential output kact (=KACT−FLAF/BASE) from the LAF sensor 5 and the differential output VO2 (=VO2/OUT−VO2/TARGET) from the $O_2$ sensor 6, instead of the output signal KACT of the LAF sensor 5 and the output signal VO2/OUT of the $O_2$ sensor 6, according to the following equation (1):

$$VO2(k+1)=a1 \cdot VO2(k)+a2 \cdot VO2(k-1)+b1 \cdot kact(k-d) \quad (1)$$

According to the equation (1), the exhaust system E is regarded as a plant for generating the differential output VO2 from the $O_2$ sensor 6 from the differential output kact from the LAF sensor 5 via a dead time element and a response delay element, and modeled as a discrete system (an autoregressive model having a dead time).

In the equation (1), "k" represents the number of a discrete-time control cycle, and "d" the dead time (the time required until the output signal KACT or differential output kact from the LAF sensor 5 at each point of time as an input to the exhaust system E is reflected in the output signal VO2/OUT or the differential output VO2 from the $O_2$ sensor 6 as an output from the exhaust system E) of the exhaust system E as indicated by the number of control cycles. In the first embodiment, the dead time of the exhaust system E is equal to the time of d control cycles (d=3–10) each having a period ranging from 30 to 100 ms. The first and second terms of the right side of the equation (1) correspond to a response delay element of the exhaust system E, the first term being a primary autoregressive term and the second term being a secondary autoregressive term. In the first and second terms, "a1", "a2" represent respective gain coefficients of the primary autoregressive term and the secondary autoregressive term. The third term of the right side of the equation (1) corresponds to a dead time element of the exhaust system E. In the third term, "b1" represents a gain coefficient of the dead time element. The gain coefficients "a1", "a2", "b1" are parameters which define the discrete-system model.

The air-fuel ratio manipulated variable determining unit 13 carries out the above control process in predetermined (constant) control cycles based on the discrete-system model expressed by the equation (1). The air-fuel ratio manipulated variable determining unit 13 has its functions as shown in FIG. 3.

Figure 3:
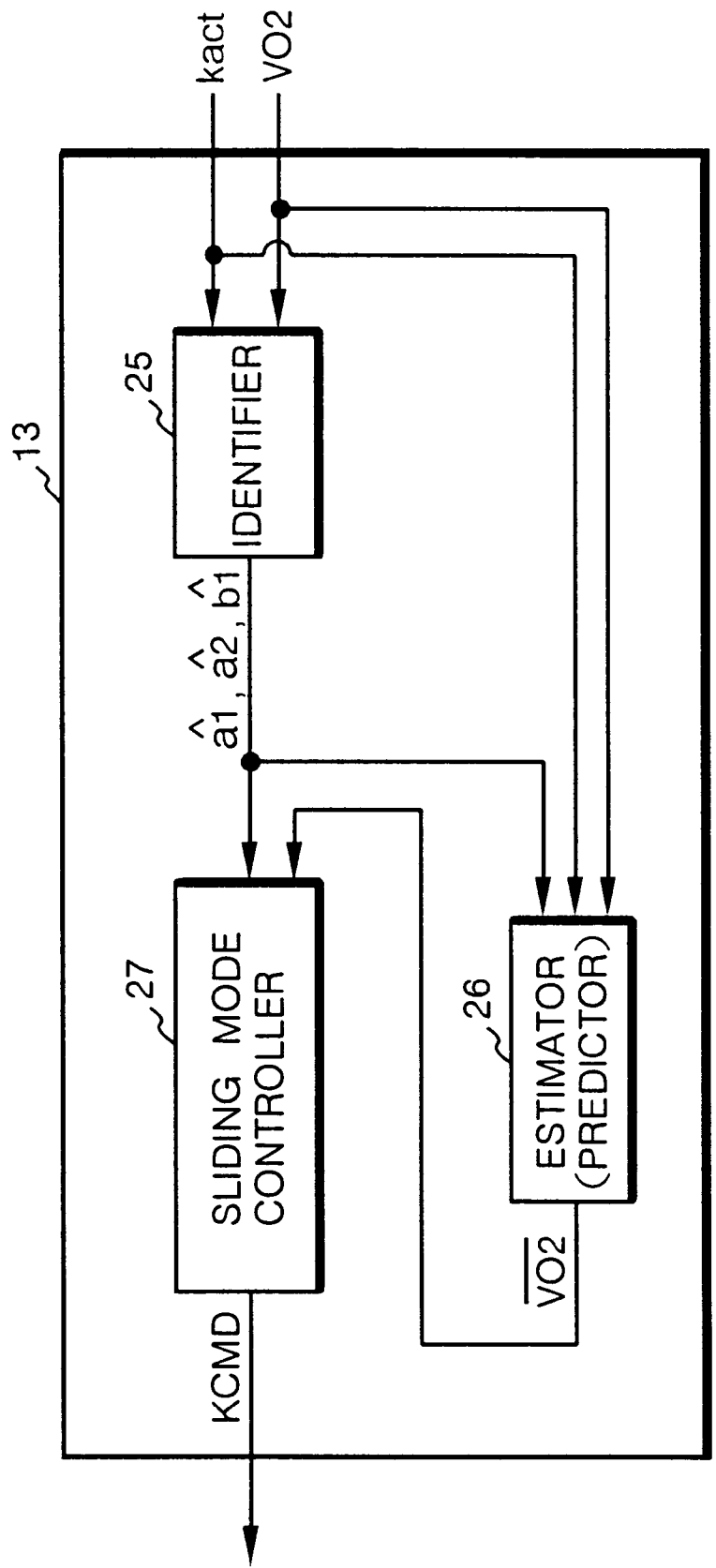
FIG. 3 is a block diagram showing a basic arrangement of an air-fuel ratio manipulated variable determining unit of the plant control system shown in FIG. 1.

As shown in FIG. 3, the fuel ratio manipulated variable determining unit 13 comprises an identifier 25 (identifying means) for sequentially identifying in each control cycle values of the gain coefficients a1, a2, b1 that are parameters to be established for the discrete-system model, from the data of the differential output kact from the LAF sensor 5 and the differential output VO2 from the $O_2$ sensor 6, an estimator 26 (estimating means), which is generally called a "predictor", for sequentially estimating in each control cycle an estimated value VO2 bar of the differential output VO2 from the $O_2$ sensor 6 (hereinafter referred to as an estimated differential output VO2 bar) after the dead time d of the exhaust system E using identified values a1 hat, a2 hat, b1 hat of the gain coefficients a1, a2, b1 that are identified by the identifier 25 (hereinafter referred to as identified gain coefficients a1 hat, a2 hat, b1 hat), from the data of the differential output kact from the LAF sensor 5 and the differential output VO2 from the $O_2$ sensor 6, and a sliding mode controller 27 for sequentially determining in each control cycle a target air-fuel ratio KCMD for the exhaust gas at the LAF sensor 5, i.e., the exhaust gas introduced into the catalytic converter 3, using the identified gain coefficients a1 hat, a2 hat, b1 hat, from the estimated differential output VO2 bar from the $O_2$ sensor 6 which has been determined by the estimator 26, according to an adaptive slide mode control process.

The algorithm of a processing operation to be carried out by the identifier 25, the estimator 26, and the sliding mode controller 27 is constructed on the basis of the discrete-system model as follows:

With respect to the identifier 25, actual gain coefficients of the exhaust system E which correspond to the gain coefficients a1, a2, b1 of the discrete-system model generally vary depending on behavioral conditions and time-dependent characteristic changes of the exhaust system E. Therefore, in order to minimize a modeling error of the discrete-system model with respect to the actual exhaust system E for increasing the accuracy of the discrete-system model, it is preferable to identify the gain coefficients a1, a2, b1 of the discrete-system model on a real-time basis depending on the behavioral conditions and time-dependent characteristic changes of the actual exhaust system E.

The identifier 25 serves to identify the gain coefficients a1, a2, b1 sequentially on a real-time basis for the purpose of minimizing a modeling error of the discrete-system model. The identifier 25 carries out its identifying process as follows:

In each control cycle, the identifier 25 determines an identified value VO2 hat of the present differential output VO2 from the $O_2$ sensor 6 (hereinafter referred to as an identified differential output VO2 hat) on the presently established discrete-system model, using the identified gain coefficients a1 hat, a2 hat, b1 hat of the presently established discrete-system model, i.e., identified gain coefficients a1 hat (k−1), a2 hat (k−1), b1 hat (k−1) determined in a preceding control cycle, and past data of the differential output kact from the LAF sensor 5 and the differential output VO2 from the $O_2$ sensor 6, according to the following equation (2):

$$V\hat{O}2(k)=\hat{a1}(k-1)\cdot VO2(k-1)+\hat{a2}(k-1)\cdot VO2(k-2)+\hat{b1}(k-1)\cdot kact(k-d-1) \quad (2)$$

The equation (2) corresponds to the equation (1) which is shifted into the past by one control cycle with the gain coefficients a1, a2, b1 being replaced with the respective gain coefficients a1 hat (k−1), a2 hat (k−1), b1 hat (k−1). "d" in the third term of the equation (2) represents a set value of the dead time of the exhaust system E (more specifically, a set value of the dead time indicated by the number of control cycles), the set value being of a time equal to or slightly longer than the actual dead time of the exhaust system E.

If vectors Θ, ξ defined by the following equations (3), (4) are introduced (the letter T in the equations (3), (4) and other equations represents a transposition), then the equation (2) is expressed by the equation (5):

$$\Theta^T(k)=[\hat{a1}(k)\hat{a2}(k)\hat{b1}(k)] \quad (3)$$

$$\xi^T(k)=[VO2(k-1)\ VO2(k-2)\ kact(k-d-1)] \quad (4)$$

$$V\hat{O}2(k)=\Theta^T(k-1)\cdot\xi(k) \quad (5)$$

The identifier 25 also determines a difference id/e between the identified differential output VO2 hat from the $O_2$ sensor 6 which is determined by the equation (2) or (5) and the present differential output VO2 from the $O_2$ sensor 6, as representing a modeling error of the discrete-system model with respect to the actual exhaust system E (hereinafter the difference id/e will be referred to as an identified error id/e), according to the following equation (6):

$$id/e(k)=VO2(k)-V\hat{O}2(k) \quad (6)$$

The identifier 25 further determines new identified gain coefficients a1(k) hat, a2(k) hat, b1(k) hat, stated otherwise, a new vector Θ(k) having these identified gain coefficients as elements (hereinafter the new vector Θ(k) will be referred to as an identified gain coefficient vector Θ), in order to minimize the identified error id/e, according to the equation (7) given below. That is, the identifier 25 varies the identified gain coefficients a1 hat (k−1), a2 hat (k−1), b1 hat (k−1) determined in the preceding control cycle by a quantity proportional to the identified error id/e for thereby determining the new identified gain coefficients a1(k) hat, a2(k) hat, b1(k) hat.

$$\Theta(k)=\Theta(k-1)+K\theta(k)\cdot id/e(k) \quad (7)$$

where Kθ represents a cubic vector determined by the following equation (8), i.e., a gain coefficient vector for determining a change depending on the identified error id/e of the identified gain coefficients a1 hat, a2 hat, b1 hat):

$$K\theta(k) = \frac{P(k-1)\xi(k)}{1+\xi^T(k)P(k-1)\xi(k)} \quad (8)$$

where P represents a cubic square matrix determined by a recursive formula expressed by the following equation (9):

$$P(k) = \frac{1}{\lambda_1(k)}\left[I - \frac{\lambda_2(k)P(k-1)\xi(k)\xi^T(k)}{\lambda_1(k)+\lambda_2(k)\xi^T(k)P(k-1)\xi(k)}\right]P(k-1) \quad (9)$$

where I represents a unit matrix.

In the equation (9), $\lambda_1$, $\lambda_2$ are established to satisfy the conditions $0 < \lambda_1 \leq 1$ and $0 \leq \lambda_2 < 1$, and an initial value P(0) of P represents a diagonal matrix whose diagonal components are positive numbers.

Depending on how $\lambda_1$, $\lambda_2$ in the equation (9) are established, any one of various specific algorithms including a fixed gain method, a degressive gain method, a method of weighted least squares, a method of least squares, a fixed tracing method, etc. may be employed. According to the first embodiment, a method of least squares ($\lambda_1=\lambda_2=1$), for example, is employed.

Basically, the identifier 25 sequentially determines in each control cycle the identified gain coefficients a1 hat, a2 hat, b1 hat of the discrete-system model in order to minimize the identified error id/e according to the above algorithm (calculating operation). Through this operation, it is possible to sequentially obtains the identified gain coefficients a1 hat, a2 hat, b1 hat which match the actual exhaust system E.

According to the first embodiment, in calculating the identified error id/e, the identifier 25 filters the identified differential output VO2 from the $O_2$ sensor 6 and the differential output VO2 from the $O_2$ sensor 6, and identifies the gain coefficients a1, a2, b1, i.e., updates the identified gain coefficients a1 hat, a2 hat, b1 hat, in certain behavioral conditions of the exhaust system E. Such operations of the identifier 25 will be described later on.

The estimator 26 sequentially determines in each control cycle the estimated differential output VO2 bar which is an estimated value of the differential output VO2 from the $O_2$ sensor 6 after the dead time d in order to compensate for the effect of the dead time d of the exhaust system E for the determination of the target air-fuel ratio KCMD with the sliding mode controller 27 as described in detail later on. The estimator 26 determines the estimated differential output VO2 as follows:

If a vector X defined by the following equation (10) is introduced into the discrete-system model expressed by the equation (1), then the equation (1) may be rewritten as the equation (11):

$$X(k) = \begin{bmatrix} VO2(k) \\ VO2(k-1) \end{bmatrix} \quad (10)$$

$$X(k+1) = \begin{bmatrix} a1 & a2 \\ 1 & 0 \end{bmatrix}X(k) + \begin{bmatrix} b1 \\ 0 \end{bmatrix}\cdot kact(k-d) \quad (11)$$

$$= A \cdot X(k) + B \cdot kact(k-d)$$

$$\left(A = \begin{bmatrix} a1 & a2 \\ 1 & 0 \end{bmatrix}, B = \begin{bmatrix} b1 \\ 0 \end{bmatrix}\right)$$

When the recursive formula according to the equation (11) is repeatedly used, X(k+d) after the dead time d is expressed by the following equation (12), using the matrix A and the vector B which are defined in the equation (11) and time-series data kact(k−j) (j=1, 2, . . . , d) of the differential output kact from the LAF sensor 5:

$$X(k+d) = \begin{bmatrix} VO2(k+d) \\ VO2(k+d-1) \end{bmatrix} \quad (12)$$

$$= A^d \cdot X(k) + \sum_{j=1}^{d} A^{j-1} \cdot B \cdot kact(k-j)$$

Since the first-row element of the left side of the equation (12) represents the differential output VO2(K+d) from the $O_2$ sensor 6 after the dead time d, its estimated value (estimated differential output) VO2(k+d) bar can be determined by calculating the first-row element of the right side of the equation (12).

Attention is paid to the first-row element of each of both sides of the equation (12), and it is assumed that α1, α2 are substituted for the first-row, first-column element and the first-row, second-column element of the matrix $A^d$ of the first term of the right side, and βj (j=1, 2, . . . , d) is substituted for the first-row elements of the vector $A^{j-1}\cdot B$ (j=1, 2, . . . , d) of the second term of the right side. At this time, the estimated differential output VO2 bar for the $O_2$ sensor 6 can be determined using time-series data VO2(k), VO2(k−1) of the differential output VO2 from the $O_2$ sensor 6 and time-series data kact(k−j) (j=1, 2, . . . , d) of the differential output kact from the LAF sensor 5, according to the following equation (13):

$$\overline{VO2}(k+d) = \alpha 1 \cdot VO2(k) + \alpha 2 VO2(k-1) + \quad (13)$$

$$\sum_{j=1}^{d} \beta j \cdot kact(k-j)$$

The coefficients α1, α2, βj (j=1, 2, . . . , d) in the equation (13) can be determined by using the identified gain coefficients a1 hat, a2 hat, b1 hat determined by the identifier 25 as the gain coefficients a1, a2, b1 which serve as elements of the matrix A and the vector B (see the equation 11) and determining the matrix $A^d$ and the vector $A^{j-1}\cdot B$ (j=1, 2, . . . , d) in the equation (12) from the matrix A and the vector B.

Therefore, the estimator 26 basically calculates the coefficients α1, α2, βj (j=1, 2, . . . , d) in the equation (13), using the identified gain coefficients a1 hat, a2 hat, b1 hat determined by the identifier 25 (specifically, the identified gain coefficients a1(k) hat, a2(k) hat, b1(k) hat determined in the present control cycle). The estimator 26 further calculates the equation (13) from the calculated coefficients α1, α2, βj, the time-series data VO2(k), VO2(k−1), which precede the present time, of the differential output VO2 from the O$_2$ sensor 6, and the time-series data kact(k−j) (j=1, 2, . . . , d) in the past of the differential output kact from the LAF sensor 5, for thereby determining the estimated differential output VO2(k+d) bar for the O$_2$ sensor 6. This process is a basic calculating operation (estimating algorithm) of the estimator 26.

According to the first embodiment, in calculating the estimated differential output VO2(k+d) bar for the O$_2$ sensor 6, the estimator 26 filters the differential output kact from the LAF sensor 5. Such an operation of the estimator 26 will be described later on.

The sliding mode controller 27 will be described in detail below.

A general sliding mode control process will first briefly be described below with reference to FIG. 4.

The sliding mode control process is a feedback control process of variable structure. According to the sliding mode control process, if there are two state quantities $x_1$, $x_2$ of an object to be controlled, then a hyperplane expressed by σ=0 is designed beforehand using a linear function σ=$s_1 x_1 + s_2 x_2$ ($s_1$, $s_2$ are coefficients) with the state quantities $x_1$, $x_2$ used as variables therein. The hyperplane σ=0 is often called a switching line if a phase plane is of the second degree (there are two state quantities), and the linear function σ is called a switching function. If the degree of the phase plane is larger, then the switching line changes to a switching plane and then to a hyperplane which cannot geometrically be illustrated. The hyperplane may also be called a slip plane. They will be represented by a linear function and a hyperplane in the scope of claims according to the present invention.

Figure 4:
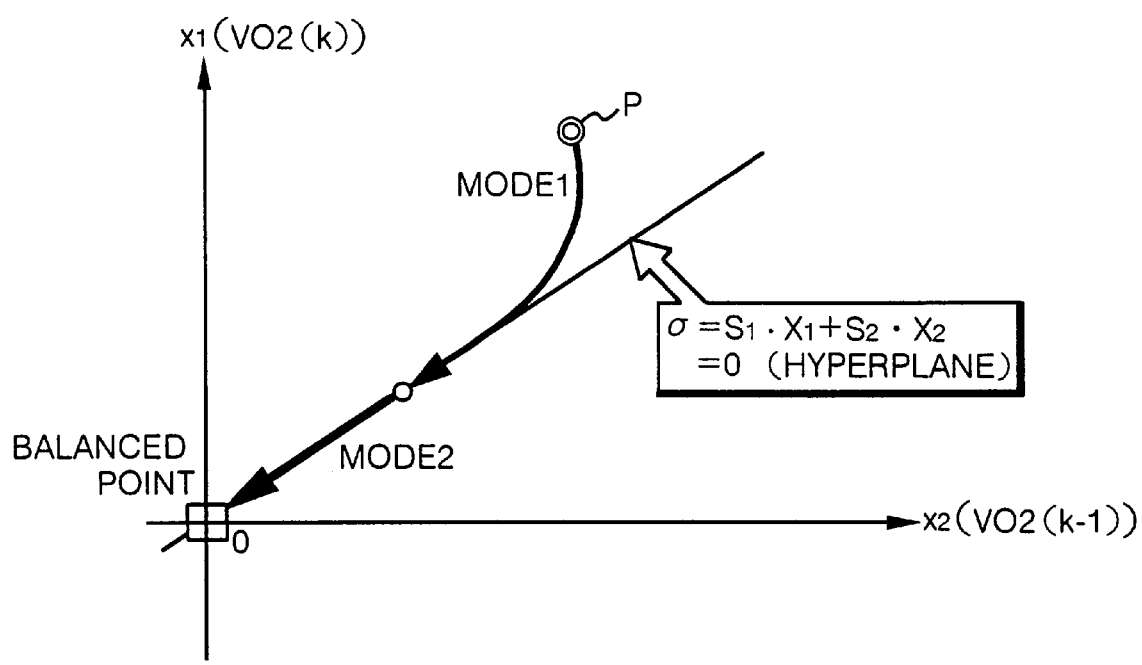
FIG. 4 is a diagram illustrative of a sliding mode control process employed by the plant control system shown in FIG. 1.

When the state quantities $x_1$, $x_2$ are such that the state quantities $x_1$, $x_2$ are σ≠0 as indicated by a point P in FIG. 4, the state quantities $x_1$, $x_2$ are caused to converge at a high speed onto the hyperplane σ=0 under high gain control according to the so-called reaching control law (mode 1), and then to converge toward a balanced point (a point where $x_1=x_2=0$) on the hyperplane σ=0 while converging onto the hyperplane σ=0 according to the so-called equivalent control input (mode 2).

In the sliding mode control process, the state quantities $x_1$, $x_2$ can converge highly stably toward the balanced point on the hyperplane σ=0 according to the equivalent control input without being affected by a disturbance, etc. simply when the state quantities $x_1$, $x_2$ are converged onto the hyperplane σ=0. If there is a disturbance or a modeling error of the object to be controlled, then the state quantities $x_1$, $x_2$ do not converge strictly toward the balanced point (the point where $x_1=x_2=0$), but toward a point near the balanced point.

In the sliding mode control process, it is important to converge the state quantities $x_1$, $x_2$ stably onto the hyperplane σ=0 particularly in the mode 1. In the presence of a disturbance, etc., it is generally difficult to converge the state quantities $x_1$, $x_2$ onto the hyperplane H according to only the reaching control law. In view of this, there has in recent years been proposed an adaptive sliding mode control process which employs an adaptive control law for converging state quantities onto a hyperplane while eliminating the effect of a disturbance, in addition to the reaching control law, as disclosed in, for example, "Sliding mode control—design theory of nonlinear robust control—", pages 134–135, published Oct. 20, 1994 by Corona Co., Ltd.

The sliding mod e controller 27 uses such an adaptive sliding mode control process to determine an input (which will hereinafter referred to as an SLD manipulating input usl) to be applied to the exhaust system E (specifically, the difference between the air-fuel ratio of the exhaust gas detected by the LAF sensor 5 and the reference value FLAF/BASE, the difference corresponding to the differential output kact from the LAF sensor 5) in order to adjust the output signal VO2/OUT from the O$_2$ sensor 6 to its target value VO2/TARGET, i.e., to converge the output signal VO2/OUT from the O$_2$ sensor 6 toward "0", and determine the target air-fuel ratio KCMD from the determined SLD manipulating input usl. An algorithm for such an operation of the sliding mode controller 27 is arranged as follows:

First, the construction of a hyperplane required for the adaptive sliding mode control process of the sliding mode controller 27 will be described below.

Since the sliding mode controller 27 effects its control process to converge the output signal VO2/OUT from the O$_2$ sensor 6 toward "0", the sliding mode controller 27 may determine the SLD manipulating input usl to be applied to the exhaust system E for converging time-series data of the output signal VO2/OUT from the O$_2$ sensor 6 toward "0".

According to a basic concept of the sliding mode control process in the first embodiment, the differential output VO2(k) from the O$_2$ sensor 6 in each control cycle and the differential output VO2(k−1) in each preceding control cycle are used as state quantities to be controlled, and the linear function σ which defines a hyperplane for the sliding mode control process is established according to the following equation (14):

$$\sigma(k) = s1 \cdot VO2(k) + s2 \cdot VO2(k-1) \quad (14)$$
$$= S \cdot X$$

$$\left( S = [\ s1\ \ s2\ ],\ X = \begin{bmatrix} VO2(k) \\ VO2(k-1) \end{bmatrix} \right)$$

In the first embodiment, time-series data of the estimated differential output VO2 bar determined by the estimator 26 are actually used as state quantities that are variables in the linear function, as described later on.

With the linear function σ defined as described above, the hyperplane for the sliding mode control process is expressed by σ=0 (since there are two state quantities, the hyperplane is a straight line as shown in FIG. 4). The coefficients s1, s2 (see the equation (14)) of the linear function σ which determines the hyperplane σ=0 are established as follows:

When a vector X (hereinafter referred to simply as a state quantity X) in the equation (14) which has the state quantities VO2(k), VO2(k−1) as elements is converged onto the hyperplane σ=0, the linear function σ has a value of "0". From this and the equation (14), the following equation (15) is obtained:

$$VO2(k) = -\frac{s2}{s1} \cdot VO2(k-1) \quad (15)$$

Because a system represented by the equation (15) is an input-free system having a time lag of first order, the condition to be met for the state quantity X to be converged stably toward a balanced point (a point where VO2(k)=VO2(k−1)=0) on the hyperplane σ=0 is that a pole of the system represented by the equation (15) exists within a unit circle.

According to the first embodiment, therefore, the coefficients s1, s2 of the linear function σ are established to satisfy the following equation (16):

$$-1 < \frac{s2}{s1} < 1 \quad (16)$$

(when s1=1, −1<s2<1)

For the sake of brevity, the coefficient s1 is set to s1=1 (s2/s1=s2), and the coefficient s2 is established to satisfy the condition: −1<s2<1.

The SLD manipulating input usl (the difference between the air-fuel ratio of the exhaust gas detected by the LAF sensor 5 and the reference value FLAF/BASE) to be generated by the sliding mode controller 27 according to the sliding mode control process for converging the state quantity X toward the balanced point on the hyperplane σ=0 is expressed as the sum of an equivalent control input ueq to be applied to the exhaust system E according to the control law for converging the state quantity X onto the hyperplane σ=0, an input urch (hereinafter referred to as a reaching control law input urch) to be applied to the exhaust system E according to the reaching control law for converging the state quantity X onto the hyperplane σ=0, and an input uadp (hereinafter referred to as an adaptive control law uadp) to be applied to the exhaust system E according to the adaptive control law for converging the state quantity X onto the hyperplane σ=0 while compensating for the effect of a disturbance, etc. (see the following equation (17)).

$$Usl = Ueq + Urch + Uadp \quad (17)$$

The equivalent control input ueq, the reaching control law input urch, and the adaptive control law uadp can be determined on the basis of the equation (1) or the equation (11) as follows:

With respect to the equivalent control input ueq, the condition to be met for the state quantity X to stay on the hyperplane σ=0 is represented by σ(k+1)=σ(k)=0, and this condition is rewritten into the following equation (18) using the equations (11), (14:

$$\sigma(k+1) = S \cdot A \cdot X(k) + S \cdot B \cdot kact(k-d) = S \cdot X(k) = \sigma(k) \quad (18)$$
$$\therefore S \cdot (A-I) \cdot X(k) + S \cdot B \cdot kact(k-d) = 0$$

Since the equivalent control input ueq is an input (the difference between the air-fuel ratio of the exhaust gas detected by the LAF sensor 5 and the reference value FLAF/BASE) to be applied to the exhaust system E for converging the state quantity X onto the hyperplane σ=0, the equivalent control input ueq is equal to the differential output kact from the LAF sensor 5 which satisfies the condition expressed by the equation (18).

From the equation (18), the following equation (19) is obtained.

$$Ueq(k-d) = kact(k-d) = -(S \cdot B)^{-1} \cdot \{S \cdot (A-I)\} \cdot X(k) \quad (19)$$

By shifting both sides of the equation (19), the following equation (20) is obtained:

$$Ueq(k) = -(S \cdot B)^{-1} \cdot \{S \cdot (A-I)\} \cdot X(k+d) \quad (20)$$
$$= \frac{-1}{s1b1} \cdot \{[s1 \cdot (a1-1) + s2] \cdot VO2(k+d) + (s1 \cdot a2 - s2) \cdot VO2(k+d-1)\}.$$

The equation (20) is a basic formula for determining the equivalent control input ueq in each control cycle.

According to the first embodiment, the reaching control law input urch is basically determined according to the following equation (21):

$$Urch(k) = -(S \cdot B)^{-1} \cdot F \cdot \sigma(k+d) \quad (21)$$
$$= \frac{-1}{s1b1} \cdot F \cdot \sigma(k+d)$$

Specifically, the reaching control law input urch is determined in proportion to the value σ(k+d) of the linear function σ after the dead time d, in view of the effect of the dead time d.

The coefficient F (which determines a gain of the reaching control law) in the equation (21) is established as follows:

In the equation (11), kact(k) is set to kact(k)=ueq(k)+urch (k), and the equations (14), (20), (21) are used to obtain the following equation (22):

$$\sigma(k+1) = (1-F) \cdot \sigma(k) \quad (22)$$

Because a system represented by the equation (22) is an input-free system having a time lag of first order, the condition to be met for the value of the linear function σ to be converged stably onto the hyperplane σ=0, i.e., for the state quantity S to be converged stably onto the hyperplane σ=0, is that a pole (represented by "1−F") of the system represented by the equation (22) exists within a unit circle.

Therefore, the coefficient F which determine the reaching control law input urch is established to satisfy the condition expressed by the following equation (23):

$$0 < F < 2 \quad (23)$$

The value of the linear function σ may possibly vary in an oscillating fashion (so-called chattering) with respect to the hyperplane σ=0. In order to suppress such chattering, it is preferable that the pole "1−F" of the system represented by the equation (22) satisfy the condition of 0<1−F<1 in addition to the above condition:

Therefore, the coefficient F which determines the reaching control law input urch is established to satisfy the condition expressed by the following equation (24):

$$0 < F < 1 \quad (24)$$

The adaptive control law input uadp is basically determined according to the following equation (25) (ΔT in the equation (25) represents the period of the control cycles):

$$Uadp(k) = -(S \cdot B)^{-1} \cdot G \cdot \sum_{i=0}^{k+d} (\sigma(i) \cdot \Delta T) \quad (25)$$
$$= \frac{-1}{s1b1} \cdot G \cdot \sum_{i=0}^{k+d} (\sigma(i) \cdot \Delta T)$$

Therefore, the adaptive control law input uadp is determined in proportion to an integrated value (which corresponds to an integral of the values of the linear function σ) over control cycles of values of the linear function σ until after the dead time d, in view of the effect of the dead time d.

The coefficient G (which determines a gain of the adaptive control law) in the equation (25) is established as follows:

If it is assumed that an error component due to a disturbance, etc. between the air-fuel ratio detected by the LAF sensor 5 and the target air-fuel ratio KCMD is represented by v, then the differential output kact from the LAF sensor 5 can be expressed by the following equation (26), using the equivalent control input ueq, the reaching control law input urch, the adaptive control law uadp, and the error component v:

$$kact(k) = Ueq(k) + Urch(k) + Uadp(k) + v(k) \qquad (26)$$

When the equation (26) is applied to the equation (11) and the equations (14), (20), (21), (25) are used, the following equation (27) is obtained:

$$\sigma(k+1) = (1-F)\cdot\sigma(k) - G\cdot\sum_{i=0}^{k}(\sigma(i)\cdot\Delta T) + S\cdot B\cdot v(k) \qquad (27)$$

When both sides of the equation (26) are Z-transformed, the following equation (28) is obtained:

$$Z\cdot\Sigma = (1-F)\Sigma - G\Delta\frac{T\cdot Z}{Z-1}\cdot\Sigma + S\cdot B\cdot V \qquad (28)$$

The equation (28) can be modified into the following equation (29):

$$\Sigma = \frac{S\cdot B\cdot(Z-1)}{Z^2 + (F-2+G\cdot\Delta T)\cdot Z + 1 - F}\cdot V \qquad (29)$$
$$= M(Z)\cdot V$$

"Σ" and "V" in the equations (28), (29) are representative of the linear function σ and the error component v, respectively, as they are Z-transformed. "M(Z)" in the equation (29) represents a pulse transfer function of the linear function σ with respect to the error component v, and is expressed by the fractional expression in the upper line of the equation (29).

The condition to be met for the linear function σ to be stable against the error component v (disturbance) is that a pole of the pulse transfer function M(Z), i.e., solutions (there are two solutions) to the characteristic equation (30) exists in a unit circle.

$$Z^2 + (F - 2 + G\cdot\Delta T)\cdot Z + 1 - F = 0 \qquad (30)$$

The two solutions, indicated by λm1, λm2, to the characteristic equation (30) are represented respectively by the following equations (31), (32):

$$\lambda m1 = \frac{-(F-2+G\cdot\Delta T) + \sqrt{(F-2+G\cdot\Delta T)^2 - 4\cdot(1-F)}}{2} \qquad (31)$$

$$\lambda m2 = \frac{-(F-2+G\cdot\Delta T) - \sqrt{(F-2+G\cdot\Delta T)^2 - 4\cdot(1-F)}}{2} \qquad (32)$$

Consequently, the condition to be met for the linear function σ to be stable against the error component v (disturbance) is that the solutions λm1, λm2 represented respectively by the following equations (31), (32) exist in a unit circle.

To satisfy the above condition, the coefficient G is established according to the following equation (33):

$$G = J\cdot\frac{2-F}{\Delta T} \qquad (33)$$

(0<J<2)

In the first embodiment, the sliding mode controller 27 basically determines the sum (ueq+urch+uadp) of the equivalent control input ueq, the reaching control law input urch, and the adaptive control law uadp determined according to the respective equations (20), (21), (25) as the SLD manipulating input usl to be applied to the exhaust system E. However, the differential outputs VO2(K+d), VO2(k+d−1) and the value σ(k+d) of the linear function σ, etc. used in the equations (20), (21), (25) cannot actually be obtained as they are values in the future.

According to the first embodiment, therefore, the sliding mode controller 27 actually uses the estimated differential outputs VO2(k+d) bar, VO2(k+d−1) bar determined by the estimator 26, instead of the differential outputs VO2(K+d), VO2(k+d−1) from the O2 sensor 6 for determining the equivalent control input ueq according to the equation (20), and calculates the equivalent control input ueq in each control cycle according to the following equation (34):

$$Ueq(k) = \frac{-1}{s1b1}\{[s1\cdot(a1-1)+s2]\cdot\overline{VO2}(k+d) + \qquad (34)$$
$$(s1\cdot a2 - s2)\cdot\overline{VO2}(k+d-1)\}$$

According to the first embodiment, furthermore, the sliding mode controller 27 actually uses time-series data of the estimated differential output VO2 bar sequentially determined by the estimator 26 as described as a state quantity to be controlled, and defines a linear function σ bar according to the following equation (35) (the linear function σ bar corresponds to time-series data of the differential output VO2 in the equation (14) which is replaced with time-series data of the estimated differential output VO2 bar):

$$\overline{\sigma(k)} = s1\cdot\overline{VO2}(k) + s2\cdot\overline{VO2}(k-1) \qquad (35)$$

The sliding mode controller 27 calculates the reaching control law input urch in each control cycle according to the following equation (36), using the linear function σ bar represented by the following equation (35), rather than the value of the linear function σ for determining the reaching control law input urch according to the equation (21):

$$Urch(k) = \frac{-1}{s1b1}\cdot F\cdot\overline{\sigma}(k+d) \qquad (36)$$

Similarly, the sliding mode controller 27 calculates the adaptive control law input uadp in each control cycle according to the following equation (37), using the linear function σ bar represented by the following equation (35), rather than the value of the linear function σ for determining the adaptive control law input uadp according to the equation (25):

$$Uadp(k) = \frac{-1}{s1b1}\cdot G\cdot\sum_{i=0}^{k+d}(\overline{\sigma}(i)\cdot\Delta T) \qquad (37)$$

The latest identified gain coefficients a1(k) hat, a2(k) hat, b1(k) hat which have been determined by the identifier 25 are basically used as the gain coefficients a1, a1, b1 that are required to calculate the equivalent control input ueq, the reaching control law input urch, and the adaptive control law input uadp according to the equations (34), (36), (37).

The sliding mode controller 27 determines the sum of the equivalent control input ueq, the reaching control law input urch, and the adaptive control law input uadp determined according to the equations (34), (36), (37), as the SLD manipulating input usl to be applied to the exhaust system E (see the equation (17)). The conditions for establishing the coefficients s1, s2, F, G used in the equations (34), (36), (37) are as described above.

The above process is a basic algorithm for determining the SLD manipulating input usl to be applied to the exhaust system E with the sliding mode controller 27. According to the above algorithm, the SLD manipulating input usl is determined to converge the estimated differential output VO2 bar from the $O_2$ sensor 6 toward "0", and as a result, to convert the output VO2 bar from the $O_2$ sensor 6 toward the target value VO2/TARGET.

While the sliding mode controller 27 eventually sequentially determines the target air-fuel ratio KCMD in each control cycle, the SLD manipulating input usl thus determined as described above signifies a target value for the difference between the air-fuel ratio of the exhaust gas detected by the LAF sensor 5 and the reference value FLAF/BASE. Consequently, the sliding mode controller 27 eventually determines the target air-fuel ratio KCMD by adding the reference value FLAF/BASE to the determined SLD manipulating input usl in each control cycle according to the following equation (38):

$$KCMD(k)=Usl(k)+FLAF/BASE=Ueq(k)+Urch(k)+Uadp(k)+FLAF/BASE \quad (38)$$

The above process is a basic algorithm for determining the target air-fuel ratio KCMD with the sliding mode controller 27 according to the first embodiment.

In the first embodiment, the stability of the adaptive sliding mode control process carried out by the sliding mode controller 27 is checked for limiting the value of the SLD manipulating input usl. Details of such a checking process will be described later on.

The general feedback controller 15, particularly, the adaptive controller 18, will be described below.

As shown in FIG. 1, the general feedback controller 15 effects a feedback control process to converge the output KACT (detected air-fuel ratio) from the LAF sensor 5 toward the target air-fuel ratio KCMD as described above. If such a feedback control process were carried out under the known PID control only, it would be difficult keep stable controllability against dynamic behavioral changes including changes in the operating conditions of the internal combustion engine 1, characteristic changes due to aging of the internal combustion engine 1, etc.

Figure 5:
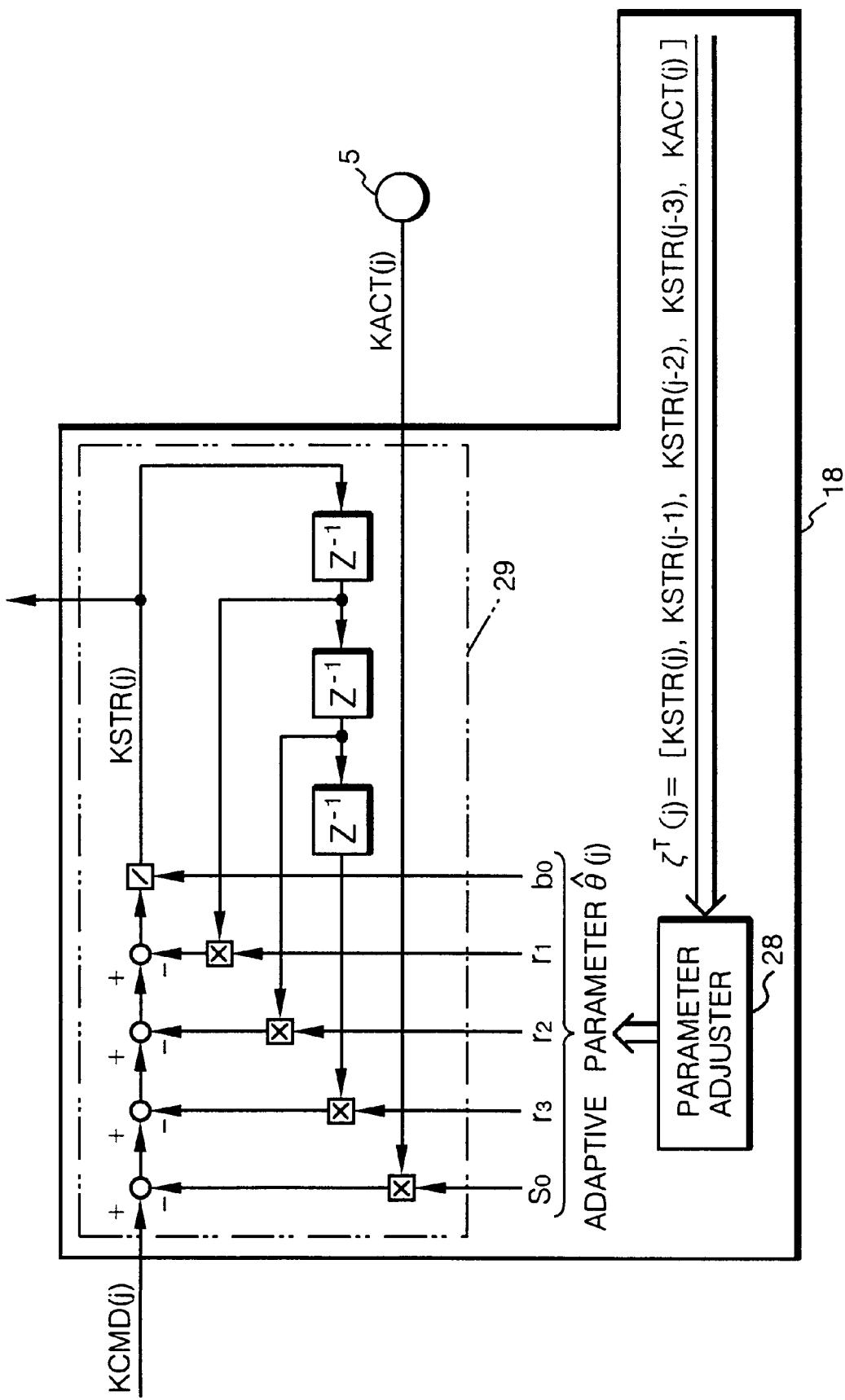
FIG. 5 is a block diagram of an adaptive controller in the plant control system shown in FIG. 1.

The adaptive controller 18 makes it possible to carry out a feedback control process while compensating for dynamic behavioral changes of the internal combustion engine 1. As shown in FIG. 5, the adaptive controller 18 comprises a parameter adjuster 28 for establishing a plurality of adaptive parameters using the parameter adjusting law proposed by I. D. Landau, et al., and a manipulated variable calculator 29 for calculating the feedback manipulated variable KSTR using the established adaptive parameters.

The parameter adjuster 28 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (39), (40), given below, an adaptive parameter θ hat (j) (j indicates the number of a control cycle) established by the parameter adjuster 28 is represented by a vector (transposed vector) according to the equation (41) given below. An input ζ(j) to the parameter adjuster 28 is expressed by the equation (42) given below. In the first embodiment, it is assumed that the internal combustion engine 1, which is an object to be controlled by the general feedback controller 15, is considered to be a plant of a first-order system having a dead time $d_p$ corresponding to three control cycles (a time corresponding to three combustion cycles of the internal combustion engine 1), and m=n=1, $d_p$=3, and five adaptive parameters $s_0$, $r_1$, $r_2$, $r_3$, $b_0$ are established (see FIG. 5). In the upper and middle expressions of the equation (42), $u_s$, $y_s$ generally represent an input (manipulated variable) to the object to be controlled and an output (controlled variable) from the object to be controlled. In the first embodiment, the input is the feedback manipulated variable KSTR and the output from the object (the internal combustion engine 1) is the output KACT (detected air-fuel ratio) from the LAF sensor 5, and the input ζ(j) to the parameter adjuster 28 is expressed by the lower expression of the equation (42) (see FIG. 5).

$$A(Z^{-1}) = 1 + a1Z^{-1} + \cdots + anZ^{-n} \quad (39)$$

$$B(Z^{-1}) = b0 + b1Z^{-1} + \cdots + bmZ^{-m} \quad (40)$$

$$\hat{\theta}^T(j) = \left[\hat{b}_0^{-1}(j), \hat{B}_R(Z^{-1}, j), \hat{S}(Z^{-1}, j)\right] \quad (41)$$
$$= [b_0(j), r_1(j), \cdots, r_{m+d_p-1}(j), s_0(j), \cdots, s_{n-1}(j)]$$
$$= [b_0(j), r_1(j), r_2(j), r_3(j), s_0(j)]$$

$$\zeta^T(j) = [u_s(j), \cdots, u_s(j-m-dp+1), y_s(j), \cdots, \quad (42)$$
$$y_s(j-n+1)]$$
$$= [u_s(j), u_s(j-1), u_s(j-2), u_s(j-3), y_s(j)]$$
$$= [KSTR(j), KSTR(j-1), KSTR(j-2),$$
$$KSTR(j-3), KACT(j)]$$

The adaptive parameter θ hat expressed by the equation (41) is made up of a scalar quantity element $b_0$ hat $(Z^{-1},j)$ for determining the gain of the adaptive controller 18, a control element $B_R$ hat $(Z^{-1},j)$ expressed using a manipulated variable, and a control element S hat $(Z^{-1},j)$ expressed using a controlled variable, which are expressed respectively by the following equations (43)–(45) (see the block of the manipulated variable calculator 29 shown in FIG. 5):

$$\hat{b}_0^{-1}(j) = \frac{1}{b_0} \quad (43)$$

$$\hat{B}_R(Z^{-1}, j) = r_1Z^{-1} + r_2Z^{-2} + \cdots + r_{m+d_p-1}Z^{-(n+dp-1)} \quad (44)$$
$$= r_1Z^{-1} + r_2Z^{-2} + r_3Z^{-3}$$

$$\hat{S}(Z^{-1}, j) = s_0 + s_1Z^{-1} + \cdots + s_{n-1}Z^{-(n-1)} \quad (45)$$
$$= s_0$$

The parameter adjuster 28 establishes coefficients of the scalar quantity element and the control elements, described above, and supplies them as the adaptive parameter θ hat expressed by the equation (26) to the manipulated variable calculator 29. The parameter adjuster 28 calculates the adaptive parameter θ hat so that the output KACT from the LAF sensor 5 will agree with the target air-fuel ratio KCMD, using time-series data of the feedback manipulated variable KSTR from the present to the past and the output KACT.

Specifically, the parameter adjuster 28 calculates the adaptive parameter θ hat according to the following equation (46):

$$\hat{\theta}(j)=\hat{\theta}(j-1)+\Gamma(j-1)\cdot\zeta(j-d_p)\cdot e^*(j) \qquad (46)$$

where Γ(j) represents a gain matrix (whose degree is indicated by m+n+$d_p$) for determining a rate of establishing the adaptive parameter θ hat, and e*(j) an estimated error of the adaptive parameter θ hat. Γ(j) and e*(j) are expressed respectively by the following recursive formulas (47), (48):

$$\Gamma(j) = \qquad (47)$$
$$\frac{1}{\lambda_1(j)}\left[\Gamma(j-1) - \frac{\lambda_2(j)\cdot\Gamma(j-1)\cdot\zeta(j-d_p)\cdot\zeta^T(j-d_p)\cdot\Gamma(j-1)}{\lambda_1(j)+\lambda_2(j)\cdot\zeta^T(j-d_p)\cdot\Gamma(j-1)\cdot\zeta(j-d_p)}\right]$$

where $0 < \lambda_1(j) \le 1$, $0 < \lambda_2(j) < 2$, $\Gamma(0) > 0$. $\qquad (48)$ $$e^*(j) = \frac{D(Z^{-1})\cdot KACT(j) - \hat{\theta}^T(j-1)\cdot\zeta(j-d_p)}{1+\zeta^T(j-d_p)\cdot\Gamma(j-1)\cdot\zeta(j-d_p)}$$

where $D(Z^{-1})$ represents an asymptotically stable polynomial for adjusting the convergence. In the first embodiment, $D(Z^{-1})=1$.

Various specific algorithms including the degressive gain algorithm, the variable gain algorithm, the fixed trace algorithm, and the fixed gain algorithm are obtained depending on how $\lambda_1(j)$, $\lambda_2(j)$ in the equation (47). For a time-dependent plant such as a fuel injection process, an air-fuel ratio, or the like of the internal combustion engine 1, either one of the degressive gain algorithm, the variable gain algorithm, the fixed gain algorithm, and the fixed trace algorithm is suitable.

Using the adaptive parameter θ hat ($s_0$, $r_1$, $r_2$, $r_3$, $b_0$) established by the parameter adjuster 28 and the target air-fuel ratio KCMD calculated by the target air-fuel ratio manipulated variable calculator 13, the manipulated variable calculator 29 determines the feedback manipulated variable KSTR according to a recursive formula expressed by the following equation (49):

$$KSTR(j) = \frac{KCMD(j) - s_0\cdot KACT(j) - r_1\cdot KSTR(j-1) - r_2\cdot KSTR(j-2) - r_3\cdot KSTR(j-3)}{b_0} \qquad (49)$$

The manipulated variable calculator 29 shown in FIG. 5 represents a block diagram of the calculations according to the equation (49).

The feedback manipulated variable KSTR determined according to the equation (49) becomes the target air-fuel ratio KCMD insofar as the output KACT of the LAF sensor 5 agrees with the target air-fuel ratio KCMD. Therefore, the feedback manipulated variable KSTR is divided by the target air-fuel ratio KCMD by the divider 19 for thereby determining the feedback manipulated variable kstr that can be used as the feedback correction coefficient KFB.

As is apparent from the foregoing description, the adaptive controller 18 thus constructed is a recursive-type controller taking into account dynamic behavioral changes of the internal combustion engine 1 which is an object to be controlled. Stated otherwise, the adaptive controller 18 is a controller described in a recursive form to compensate for dynamic behavioral changes of the internal combustion engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 18 constructed as described above is suitable for compensating for dynamic behavioral changes of the internal combustion engine 1.

The details of the adaptive controller 18 have been described above.

The PID controller 17, which is provided together with the adaptive controller 18 in the general feedback controller 20, calculates a proportional term (P term), an integral term (I term), and a derivative term (D term) from the difference between the output KACT (detected air-fuel ratio) of the LAF sensor 5 and the target air-fuel ratio KCMD, and calculates the total of those terms as the feedback manipulated variable KLAF, as is the case with the general PID control process. In the first embodiment, the feedback manipulated variable KLAF is set to "1" when the output KACT of the LAF sensor 5 agrees with the target air-fuel ratio KCMD by setting an initial value of the integral term (I term) to "1", so that the feedback manipulated variable KLAF can be used as the feedback correction coefficient KFB for directly correcting the fuel injection quantity. The gains of the proportional term, the integral term, and the derivative term are determined from the rotational speed and intake pressure of the internal combustion engine 1 using a predetermined map.

The switcher 20 of the general feedback controller 15 outputs the feedback manipulated variable KLAF determined by the PID controller 17 as the feedback correction coefficient KFB for correcting the fuel injection quantity if the combustion in the internal combustion engine 1 tends to be unstable as when the temperature of the coolant of the internal combustion engine 1 is low, the internal combustion engine 1 rotates at high speeds, or the intake pressure is low, or if the output KACT of the LAF sensor 5 is not reliable due to a response delay of the LAF sensor 5 as when the target air-fuel ratio KCMD changes largely or immediately after the air-fuel ratio feedback control process has started, or if the internal combustion engine 1 operates highly stably as when it is idling and hence no high-gain control process by the adaptive controller 18 is required. Otherwise, the switcher 20 outputs the feedback manipulated variable kstr which is produced by dividing the feedback manipulated variable KSTR determined by the adaptive controller 18 by the target air-fuel ration KCMD, as the feedback correction coefficient KFB for correcting the fuel injection quantity. This is because the adaptive controller 18 effects a high-gain control process and functions to converge the output KACT (detected air-fuel ratio) of the LAF sensor 5 quickly toward the target air-fuel ratio KCMD, and if the feedback manipulated variable KSTR determined by the adaptive controller 18 is used when the combustion in the internal combustion engine 1 is unstable or the output KACT of the LAF sensor 5 is not reliable, then the air-fuel ratio control process tends to be unstable.

Such operation of the switcher 20 is disclosed in detail in Japanese laid-open patent publication No. 8-105345 which corresponds to U.S. Pat. No. 5,558,075, and will not be described in detail below.

Operation of the plant control system will be described below.

Control cycles of a processing operation carried out by the control unit 7 will first be described below. Controlling the amount of fuel (fuel injection quantity) supplied to the internal combustion engine 1 needs to be in synchronism with the rotational speed of the internal combustion engine 1. In the first embodiment, the basic fuel injection quantity calculator 8, the first correction coefficient calculator 9, the second correction coefficient calculator 10, and the feedback controller 14 operate in control cycles in synchronism with a crankshaft angle period (so-called TDC) of the internal combustion engine 1. Output data from various sensors including the LAF sensor 5 and the $O_2$ sensor 6 are also read in synchronism with a crankshaft angle period (so-called TDC) of the internal combustion engine 1.

It is preferable that the operation of the air-fuel ratio manipulated variable determining unit 13 to determine the target air-fuel ratio KCMD for the exhaust gas upstream of the catalytic converter 3 be carried out in control cycles of a constant period in view of the dead time present in the catalytic converter 3, calculating loads, etc. In the first embodiment, the above operation of the air-fuel ratio manipulated variable determining unit 13 and the operation of the subtractors 11, 12 for calculating the differential outputs kact, VO2 required for the operation of the air-fuel ratio manipulated variable determining unit 13 are carried out in control cycles of a constant period (e.g., 30–100 ms).

The constant period may be determined depending on the type, reaction rate, volume, etc. of the catalytic converter 3 to be controlled. In the first embodiment, while under operating conditions (more specifically, at engine rotational speeds) for the air-fuel ratio manipulated variable determining unit 13 to be operating, the time interval of the above constant period is selected to be greater than the time interval of the crankshaft angle period (TDC).

Figure 6:
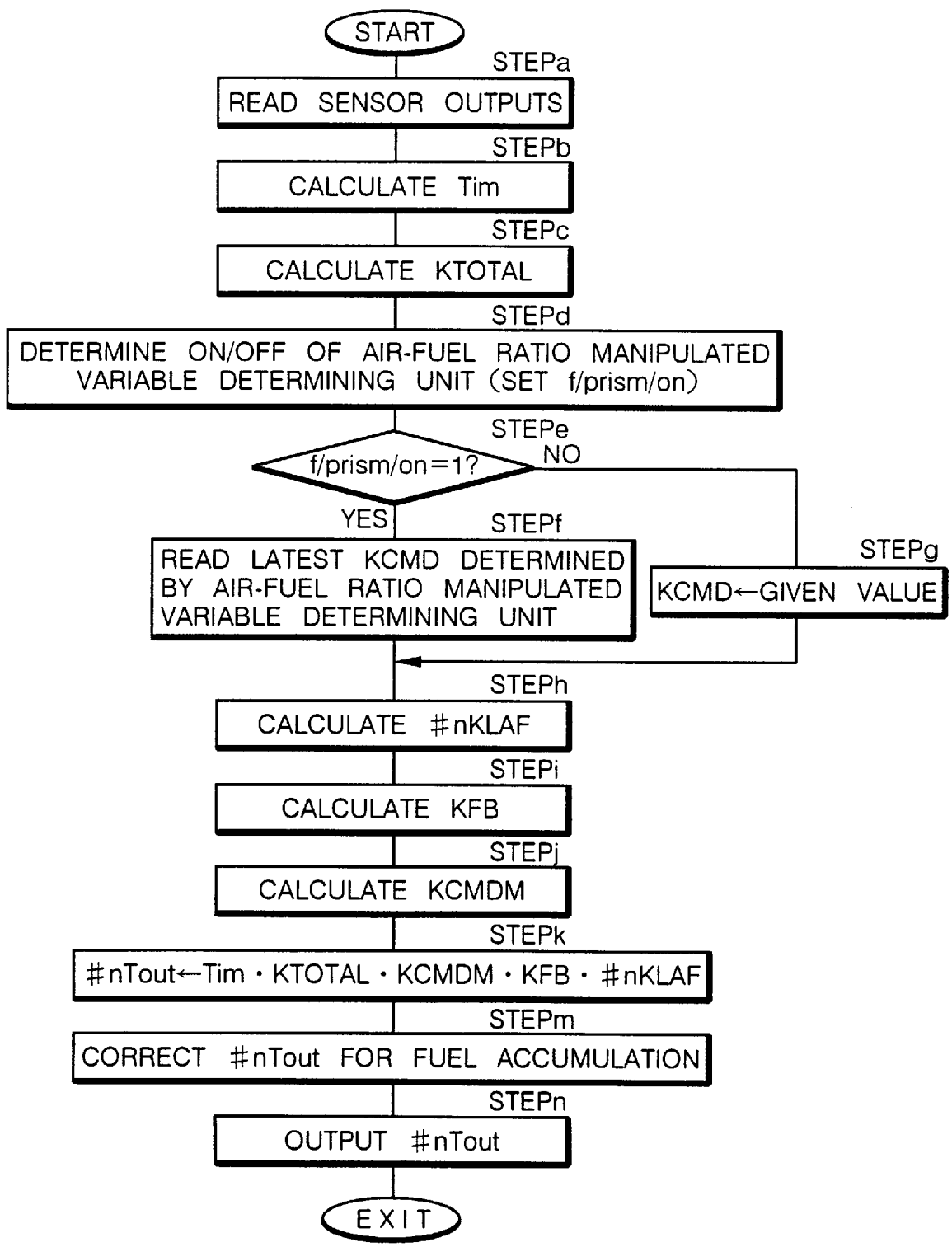
FIG. 6 is a flowchart of an engine fuel control process carried out by the plant control system shown in FIG. 1.

First, a process of calculating an output fuel injection quantity #nTout (n=1, 2, 3, 4) for each of the cylinders of the internal combustion engine 1 for controlling the amount of fuel supplied to the internal combustion engine 1 will be described below with reference to FIGS. 6 and 7. The control unit 7 calculates an output fuel injection quantity #nTout (n=1, 2, 3, 4) for each of the cylinders in synchronism with a crankshaft angle period of the internal combustion engine 1 as follows:

In FIG. 6, the control unit 7 reads outputs from various sensors including the LAF sensor 5 and the $O_2$ sensor 6 in STEPa. At this time, the output KACT of the LAF sensor 5 and the output VO2/OUT of the $O_2$ sensor 6, including data obtained in the past, are stored in a time-series fashion in a memory (not shown).

Then, the basic fuel injection quantity calculator 8 corrects a fuel injection quantity corresponding to the rotational speed NE and intake pressure PB of the internal combustion engine 1 depending on the effective opening area of the throttle valve, thereby calculating a basic fuel injection quantity Tim in STEPb. The first correction coefficient calculator 9 calculates a first correction coefficient KTOTAL depending on the coolant temperature and the amount by which the canister is purged in STEPc.

The control unit 7 decides whether the target air-fuel ratio KCMD generated by the air-fuel ratio manipulated variable determining unit 13 is to be used or not, i.e., determines ON/OFF of the air-fuel ratio manipulated variable determining unit 13, and sets a value of a flag f/prism/on which represents ON/OFF of the air-fuel ratio manipulated variable determining unit 13. When the value of the flag f/prism/on is "0", it means that the target air-fuel ratio KCMD generated by the air-fuel ratio manipulated variable determining unit 13 is not to be used, and when the value of the flag f/prism/on is "1", it means that the target air-fuel ratio KCMD generated by the air-fuel ratio manipulated variable determining unit 13 is to be used.

Figure 7:
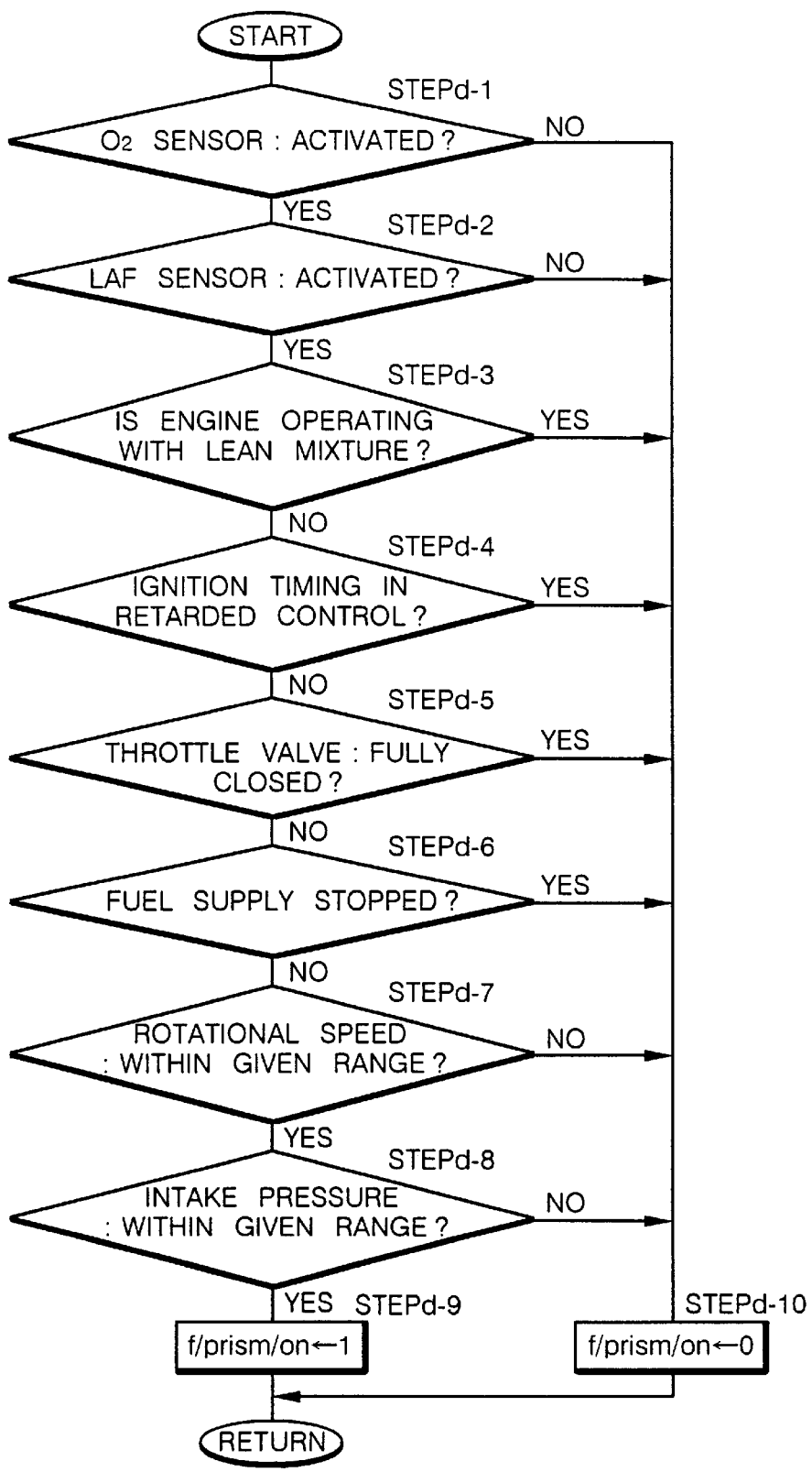
FIG. 7 is a flowchart of a subroutine of the engine fuel control process shown in FIG. 6.

The deciding subroutine of STEPd is shown in detail in FIG. 7. As shown in FIG. 7, the control unit 7 decides whether the $O_2$ sensor 6 and the LAF sensor 5 are activated or not respectively in STEPd-1, STEPd-2. If neither one of the $O_2$ sensor 6 and the LAF sensor 5 is activated, since detected data from the $O_2$ sensor 6 and the LAF sensor 5 for use by the air-fuel ratio manipulated variable determining unit 13 are not accurate enough, the value of the flag f/prism/on is set to "0" in STEPd-10.

Then, the control unit 7 decides whether the internal combustion engine 1 is operating with a lean air-fuel mixture or not in STEPd-3. The control unit 7 decides whether the ignition timing of the internal combustion engine 1 is retarded for early activation of the catalytic converter 3 immediately after the start of the internal combustion engine 1 or not in STEPd-4. The control unit 7 decides whether the throttle valve of the internal combustion engine 1 is fully open or not in STEPd-5. The control unit 7 decides whether the supply of fuel to the internal combustion engine 1 is being stopped or not in STEPd-6. If either one of the conditions of these steps is satisfied, then since it is not preferable to control the supply of fuel to the internal combustion engine 1 using the target air-fuel ratio KCMD generated by the air-fuel ratio manipulated variable determining unit 13, the value of the flag f/prism/on is set to "0" in STEPd-10.

The control unit 7 then decides whether the rotational speed NE and the intake pressure PB of the internal combustion engine 1 fall within respective given ranges or not respectively in STEPd-7, STEPd-8. If either one of the rotational speed NE and the intake pressure PB does not fall within its given range, then since it is not preferable to control the supply of fuel to the internal combustion engine 1 using the target air-fuel ratio KCMD generated by the air-fuel ratio manipulated variable determining unit 13, the value of the flag f/prism/on is set to "0" in STEPd-10.

If the conditions of STEPd-1, STEPd-2, STEPd-7, STEPd-8 are satisfied, and the conditions of STEPd-3, STEPd-4, STEPd-5, STEPd-6 are not satisfied, then value of the flag f/prism/on is set to "1" to use the target air-fuel ratio KCMD generated by the air-fuel ratio manipulated variable determining unit 13 for controlling the supply of fuel to the internal combustion engine 1 in STEPd-9.

In FIG. 6, after the value of the flag f/prism/on has been set, the control unit 7 determines the value of the flag f/prism/on in STEPe. If f/prism/on=1, then the control unit 7 reads the target air-fuel ratio KCMD generated by the air-fuel ratio manipulated variable determining unit 13 in STEPf. If f/prism/on=0, then the control unit 7 sets the target air-fuel ratio KCMD to a predetermined value in STEPg. The predetermined value to be established as the target air-fuel ratio KCMD is determined from the rotational speed NE and intake pressure PB of the internal combustion engine 1 using a predetermined map, for example.

In the local feedback controller 16, the PID controllers 22 calculates respective feedback correction coefficients #nKLAF in order to eliminate variations between the cylinders, based on actual air-fuel ratios #nA/F of the respective cylinders which have been estimated from the output KACT of the LAF sensor 5 by the observer 21, in STEPh. Then, the general feedback controller 15 calculates a feedback correction coefficient KFB in STEPi.

Depending on the operating conditions of the internal combustion engine 1, the switcher 20 selects either the feedback manipulated variable KLAF determined by the PID controller 17 or the feedback manipulated variable kstr which has been produced by dividing the feedback manipulated variable KSTR determined by the adaptive controller 18 by the target air-fuel ratio KCMD (normally, the switcher 20 selects the feedback manipulated variable kstr). The switcher 20 then outputs the selected feedback manipulated variable KLAF or kstr as a feedback correction coefficient KFB.

When switching the feedback correction coefficient KFB from the feedback manipulated variable KLAF from the PID controller 17 to the feedback manipulated variable kstr from the adaptive controller 18, the adaptive controller 18 determines a feedback manipulated variable KSTR in a manner to hold the correction coefficient KFB to the preceding correction coefficient KFB (=KLAF) as long as in the cycle time for the switching. When switching the feedback correction coefficient KFB from the feedback manipulated variable kstr from the adaptive controller 18 to the feedback manipulated variable KLAF from the PID controller 17, the PID controller 17 calculates a present correction coefficient KLAF in a manner to regard the feedback manipulated variable KLAF determined by itself in the preceding cycle time as the preceding correction coefficient KFB (=kstr).

After the feedback correction coefficient KFB has been calculated, the second correction coefficient calculator 10 calculates in STEPj a second correction coefficient KCMDM depending on the target air-fuel ratio KCMD determined in STEPf or STEPg.

Then, the control unit 7 multiplies the basic fuel injection quantity Tim, determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEPk. The output fuel injection quantities #nTout are then corrected for accumulated fuel particles on intake pipe walls of the internal combustion engine 1 by the fuel accumulation corrector 23 in STEPm. The corrected output fuel injection quantities #nTout are applied to the non-illustrated fuel injectors of the internal combustion engine 1 in STEPn.

In the internal combustion engine 1, the fuel injectors inject fuel into the respective cylinders according to the respective output fuel injection quantities #nTout.

The above calculation of the output fuel injection quantities #nTout and the fuel injection of the internal combustion engine 1 are carried out in successive cycle times synchronous with the crankshaft angle period of the internal combustion engine 1 for controlling the amount of fuel (fuel injection quantities) supplied to the internal combustion engine 1 in order to converge the output KACT of the LAF sensor 5 (the detected air-fuel ratio of the exhaust gas introduced into the catalytic converter 3) toward the target air-fuel ratio KCMD. While the feedback manipulated variable kstr from the adaptive controller 18 is being used as the feedback correction coefficient KFB, the output KACT of the LAF sensor 5 is quickly converged toward the target air-fuel ratio KCMD with high stability against behavioral changes such as changes in the operating conditions of the internal combustion engine 1 or characteristic changes thereof.

Figure 8:
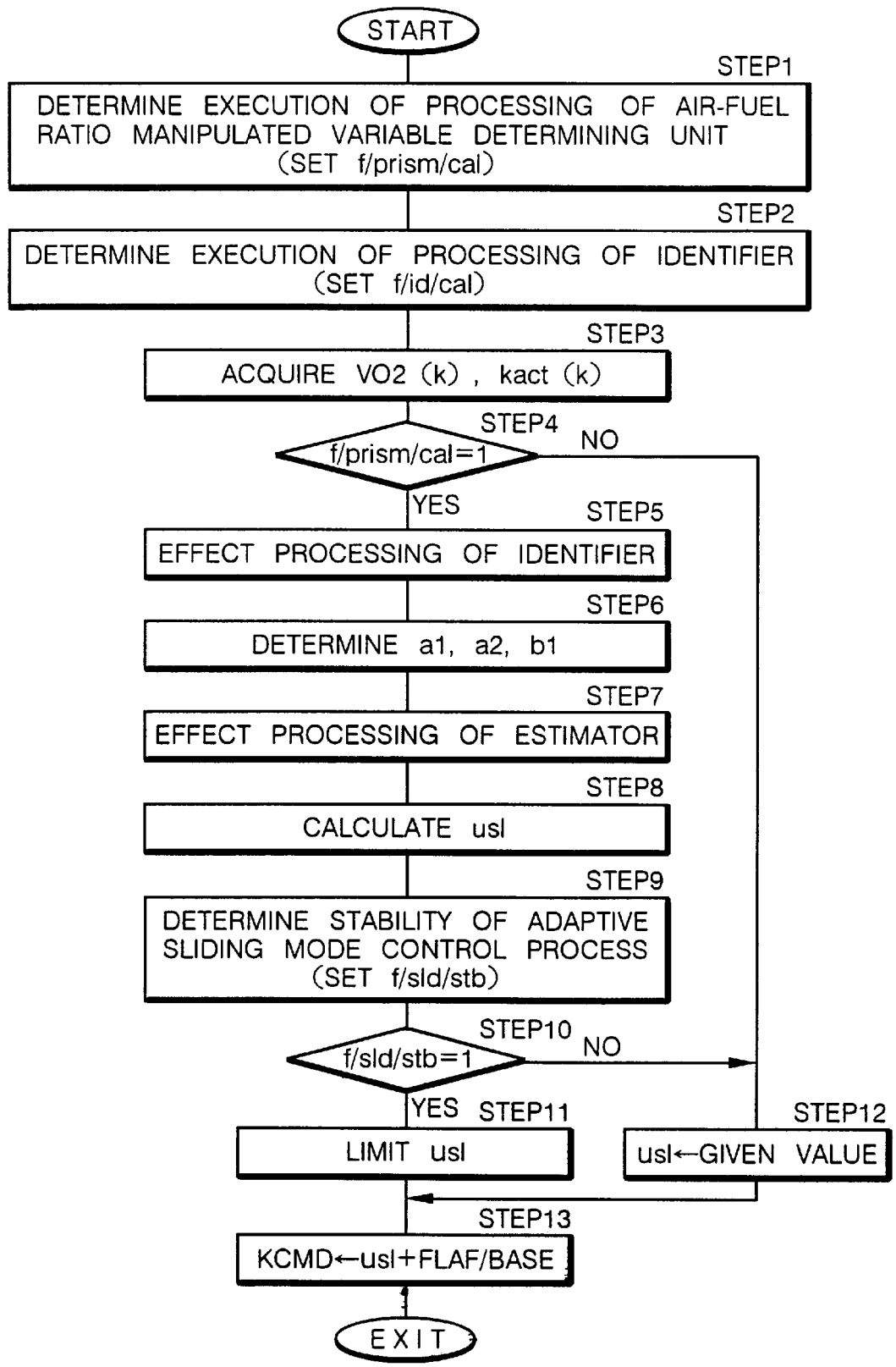
FIG. 8 is a flowchart of an overall process carried out by the air-fuel ratio manipulated variable determining unit of the plant control system shown in FIG. 1.

Concurrent with the above fuel control for the internal combustion engine 1, the air-fuel ratio manipulated variable determining unit 13 executes a main routine shown in FIG. 8 in control cycles of a constant period.

As shown in FIG. 8, the air-fuel ratio manipulated variable determining unit 13 decides whether its own processing (the processing of the identifier 25, the estimator 26, and the sliding mode controller 27) is to be executed or not, and sets a value of a flag f/prim/cal indicative of whether the processing is to be executed or not in STEP1. When the value of the flag f/prim/cal is "0", it means that the processing of the air-fuel ratio manipulated variable determining unit 13 is not to be executed, and when the value of the flag f/prim/cal is "1", it means that the processing of the air-fuel ratio manipulated variable determining unit 13 is to be executed.

Figure 9:
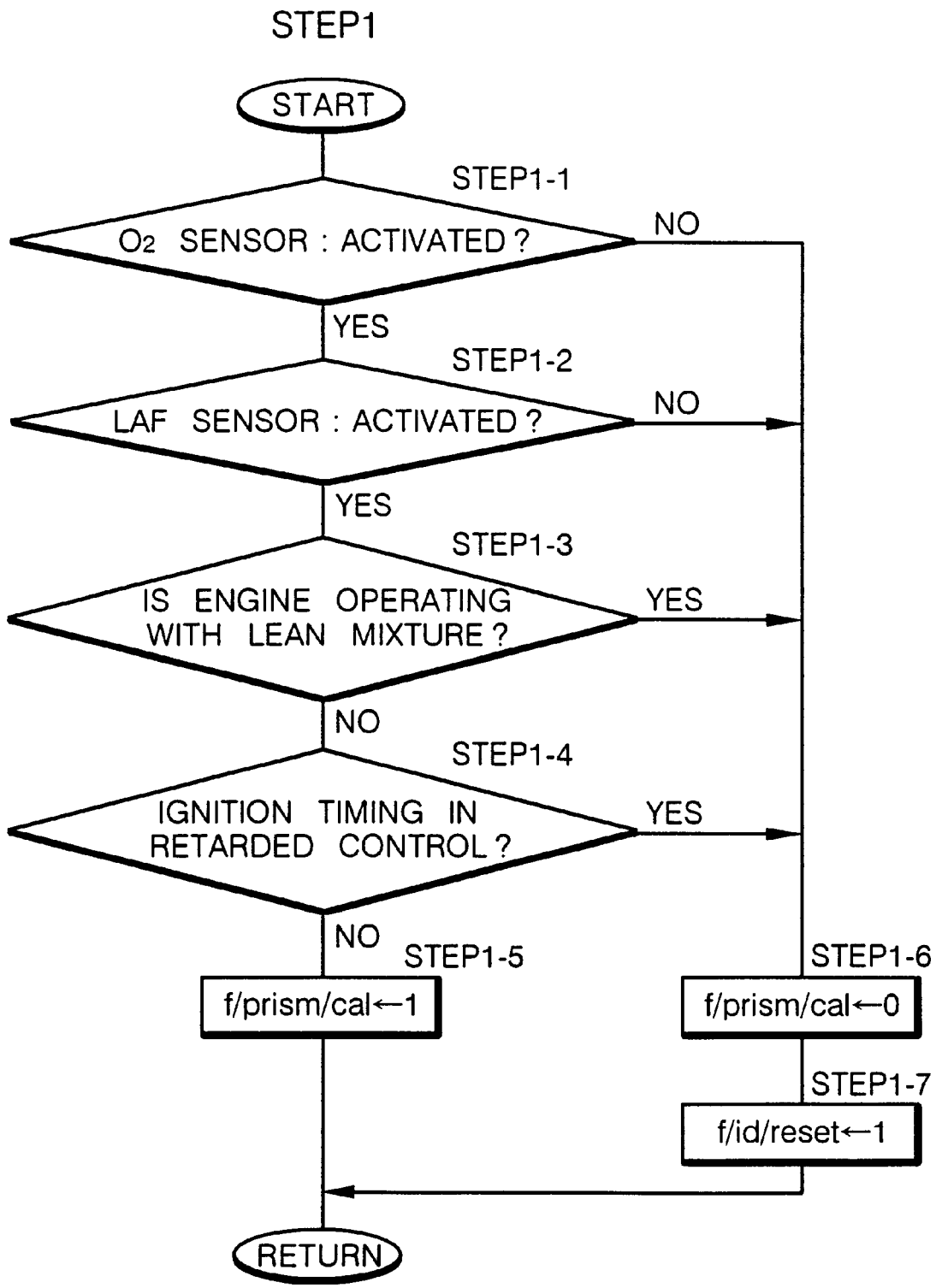
FIG. 9 is a flowchart of a subroutine of the process shown in FIG. 8.

The deciding subroutine in STEP1 is shown in detail in FIG. 9. As shown in FIG. 9, the air-fuel ratio manipulated variable determining unit 13 decides whether the $O_2$ sensor 6 and the LAF sensor 5 are activated or not respectively in STEP1-1, STEP1-2. If neither one of the $O_2$ sensor 6 and the LAF sensor 5 is activated, since detected data from the $O_2$ sensor 6 and the LAF sensor 5 for use by the air-fuel ratio manipulated variable determining unit 13 are not accurate enough, the value of the flag f/prism/cal is set to "0" in STEP1-6. Then, in order to initialize the identifier 25 as described later on, the value of a flag f/id/reset indicative of whether the identifier 25 is to be initialized or not is set to "1" in STEP1-7. When the value of the flag f/id/reset is "1", it means that the identifier 25 is to be initialized, and when the value of the flag f/id/reset is "0", it means that the identifier 25 is not to be initialized.

The air-fuel ratio manipulated variable determining unit 13 decides whether the internal combustion engine 1 is operating with a lean air-fuel mixture or not in STEP1-3. The air-fuel ratio manipulated variable determining unit 13 decides whether the ignition timing of the internal combustion engine 1 is retarded for early activation of the catalytic converter 3 immediately after the start of the internal combustion engine 1 or not in STEP1-4. If the conditions of these steps are satisfied, then since the target air-fuel ratio KCMD calculated to adjust the output VO2/OUT of the $O_2$ sensor 6 to the target value VO2/TARGET is not used for the fuel control for the internal combustion engine 1, the value of the flag f/id/cal is set to "0" in STEP1-6, and the value of the flag f/id/reset is set to "1" in order to initialize the identifier 25 in STEP1-7.

In FIG. 8, after the above deciding subroutine, the air-fuel ratio manipulated variable determining unit 13 decides whether a process of identifying (updating) the gain coefficients a1, a1, b1 with the identifier 25 is to be executed or not, and sets a value of a flag f/id/cal indicative of whether the process of identifying (updating) the gain coefficients a1, a1, b1 is to be executed or not in STEP2. When the value of the flag f/id/cal is "0", it means that the process of identifying (updating) the gain coefficients a1, a1, b1 is not to be executed, and when the value of the flag f/id/cal is "1", it means that the process of identifying (updating) the gain coefficients a1, a1, b1 is to be executed.

Figure 10:
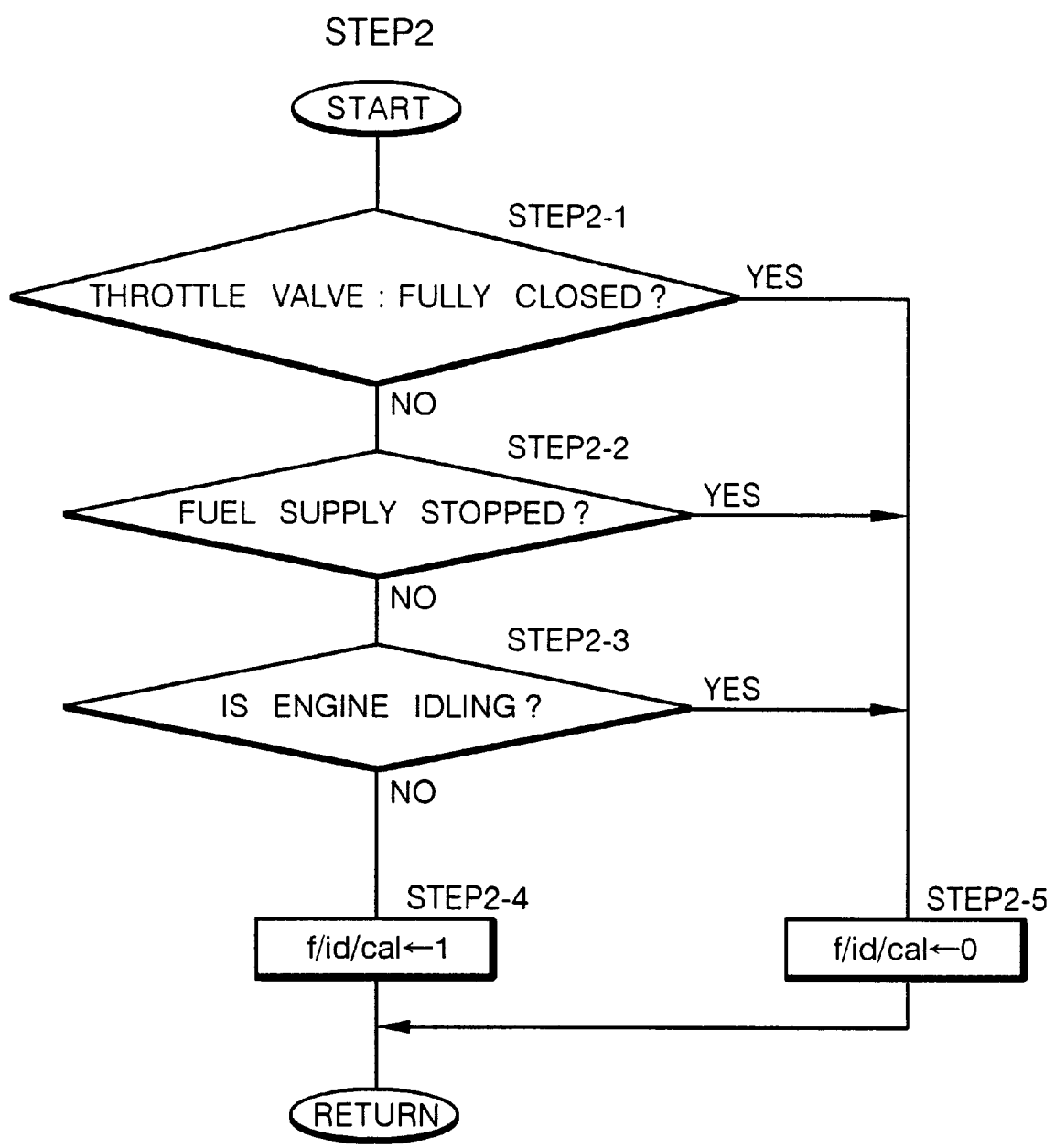
FIG. 10 is a flowchart of another subroutine of the process shown in FIG. 8.

The deciding subroutine of STEP2 is shown in detail in FIG. 10.

The air-fuel ratio manipulated variable determining unit 13 decides whether the throttle valve of the internal combustion engine 1 is fully open or not in STEP2-1. The air-fuel ratio manipulated variable determining unit 13 decides whether the supply of fuel to the internal combustion engine 1 is being stopped or not in STEP2-2. The air-fuel ratio manipulated variable determining unit 13 decides whether the internal combustion engine 1 is idling or not in STEP2-3. If either one of the conditions of these steps is satisfied, then since it is difficult to adjust the gain coefficients a1, a1, b1 appropriately, the value of the flag f/id/cal is set to "0" in STEP2-5. If neither one of the conditions of these steps is satisfied, then the value of the flag f/id/cal is set to "1" to identify (update) the gain coefficients a1, a1, b1 with the identifier 25 in STEP2-4.

Referring back to FIG. 8, the air-fuel ratio manipulated variable determining unit 13 acquires the latest differential outputs kact(k) (=KACT−FLAF/BASE), VO2(k) (=VO2/

OUT−VO2/TARGET) respectively from the subtractors 11, 12 in STEP3. Specifically, the subtractors 11, 12 select latest ones of the time-series data read and stored in the non-illustrated memory in STEPa shown in FIG. 6, calculate the differential outputs kact(k), VO2(k), and give the calculated differential outputs kact(k), VO2(k) to the air-fuel ratio manipulated variable determining unit 13. The differential outputs kact(k), VO2(k) given to the air-fuel ratio manipulated variable determining unit 13, as well as data given in the past, are stored in a time-series manner in a memory (not shown) in the air-fuel ratio manipulated variable determining unit 13.

Then, the air-fuel ratio manipulated variable determining unit 13 determines the value of the flag f/prism/cal set in STEP1. If the value of the flag f/prism/cal is "0", i.e., if the processing of the air-fuel ratio manipulated variable determining unit 13 is not to be executed, then the air-fuel ratio manipulated variable determining unit 13 forcibly sets the SLD manipulating input usl to be determined by the sliding mode controller 27 for the exhaust system E, to a predetermined value in STEP12. The predetermined value may be a fixed value (e.g., "0") or the value of the SLD manipulating input usl determined in a preceding control cycle. After the SLD manipulating input usl is set to the predetermined value in STEP12, the air-fuel ratio manipulated variable determining unit 13 adds the reference value FLAF/BASE to the SLD manipulating input usl for thereby determining a target air-fuel ratio KCMD in the present control cycle in STEP 13. Then, the processing in the present control cycle is finished.

If the value of the flag f/prism/cal is "1" in STEP4, i.e., if the processing of the air-fuel ratio manipulated variable determining unit 13 is to be executed, then air-fuel ratio manipulated variable determining unit 13 effects the processing of the identifier 25 in STEP5.

Figure 11:
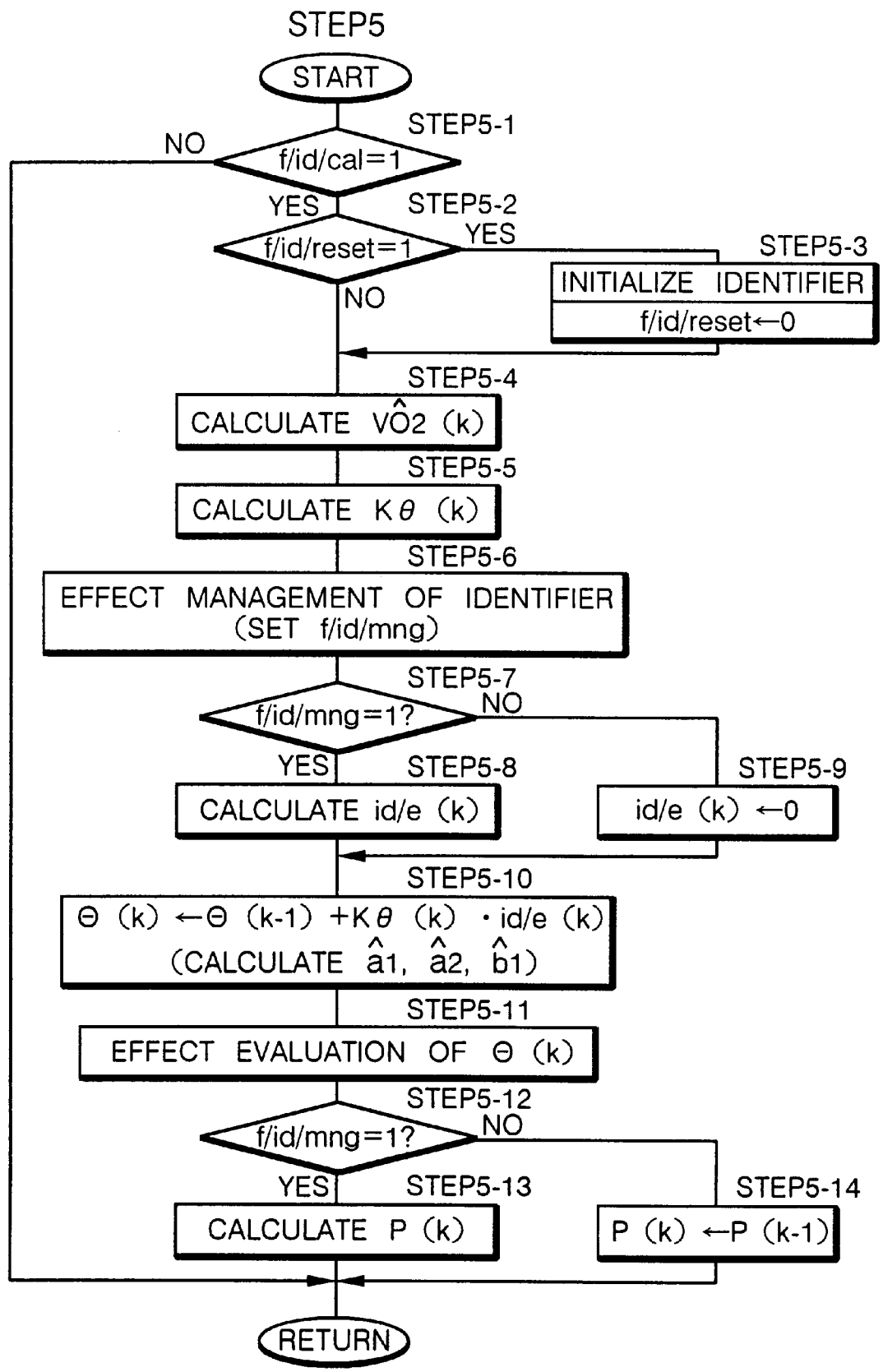
FIG. 11 is a flowchart of still another subroutine of the process shown in FIG. 8.

The processing subroutine of STEP5 is shown in detail in FIG. 11.

The identifier 25 determines the value of the flag f/id/cal set in STEP2 in STEP5-1. If the value of the flag f/id/cal is "0", then since the process of identifying the gain coefficients a1, a1, b1 with the identifier 25 is not carried out, control immediately goes back to the main routine shown in FIG. 8.

If the value of the flag f/id/cal is "1", then the identifier 25 determines the value of the flag f/id/reset set in STEP1 with respect to the initialization of the identifier 25 in STEP5-2. If the value of the flag f/id/reset is "1", the identifier 25 is initialized in STEP5-3. When the identifier 25 is initialized, the identified gain coefficients a1 hat, a2 hat, b1 hat are set to predetermined initial values (the identified gain coefficient vector Θ according to the equation (3) is initialized), and the elements of the matrix P (diagonal matrix) according to the equation (9) are set to predetermined initial values. The value of the flag f/id/reset is reset to "0".

Then, the identifier 25 calculates the identified differential output VO2(k) hat from the $O_2$ sensor 6 in the discrete-system model (see the equation (2)) of the exhaust system E which is expressed using the present identified gain coefficients a1(k−1) hat, a2(k−1) hat, b1(k−1) hat, according to the equation (2) or the equation (5) equivalent thereto, using the past data VO2(k−1), VO2(k−2), kact(k−d−1) of the differential outputs VO2, kact acquired in each control cycle in STEP3, and the identified gain coefficients a1(k−1) hat, a2(k−1) hat, b1(k−1) hat, in STEP5-4.

The identifier 25 then calculates the vector Kθ(k) to be used in determining the new identified gain coefficients a1 hat, a2 hat, b1 hat in STEP5-5. Thereafter, a management process for the identifier 25 is carried out in STEP5-6, as described below.

The relationship between the behavior of the output VO2/OUT or the differential output VO2 from the $O_2$ sensor 6 and the identification of the gain coefficients a1, a1, b1 of the discrete-system model of the exhaust system E with the identifier 25 will be described below.

Figure 12:
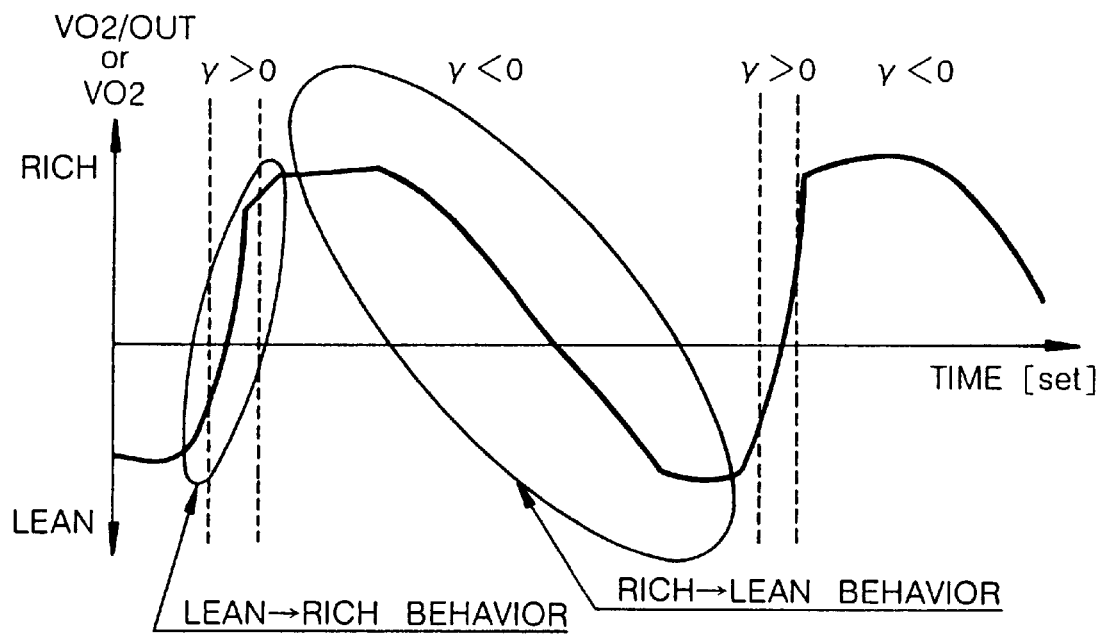
FIG. 12 is a diagram illustrative of the subroutine shown in FIG. 11.

As shown in FIG. 12, the output VO2/OUT or the differential output VO2 from the $O_2$ sensor 6 is indicative of the air-fuel ratio of the exhaust gas having passed through the catalytic converter 3. Generally, as shown in FIG. 12, the air-fuel ratio of the exhaust gas rapidly changes from a lean side toward a rich side, i.e., a time-dependent change of the output VO2/OUT or the differential output VO2 from the $O_2$ sensor 6 is relatively large, and gradually changes from a rich side toward a lean side, i.e., a time-dependent change of the output VO2/OUT or the differential output VO2 from the $O_2$ sensor 6 is relatively small. According to the findings of the inventors of the present invention, when the gain coefficients a1, a1, b1 are to be identified using the output VO2/OUT or the differential output VO2 from the $O_2$ sensor 6, if the time-dependent change of the output VO2/OUT or the differential output VO2 from the $O_2$ sensor 6 is relatively small, then the identified values of the gain coefficients a1, a1, b1 may become too small to obtain appropriate identified gain coefficients a1 hat, a2 hat, b1 hat.

In the first embodiment, the identifier 25 identifies (updates) the gain coefficients a1, a1, b1 when the air-fuel ratio represented by the output VO2/OUT or the differential output VO2 from the $O_2$ sensor 6 changes from a lean side to a rich side. The management process for the identifier 25 is a process for determining the above behavior of the air-fuel ratio represented by the output VO2/OUT or the differential output VO2 from the $O_2$ sensor 6.

Figure 13:
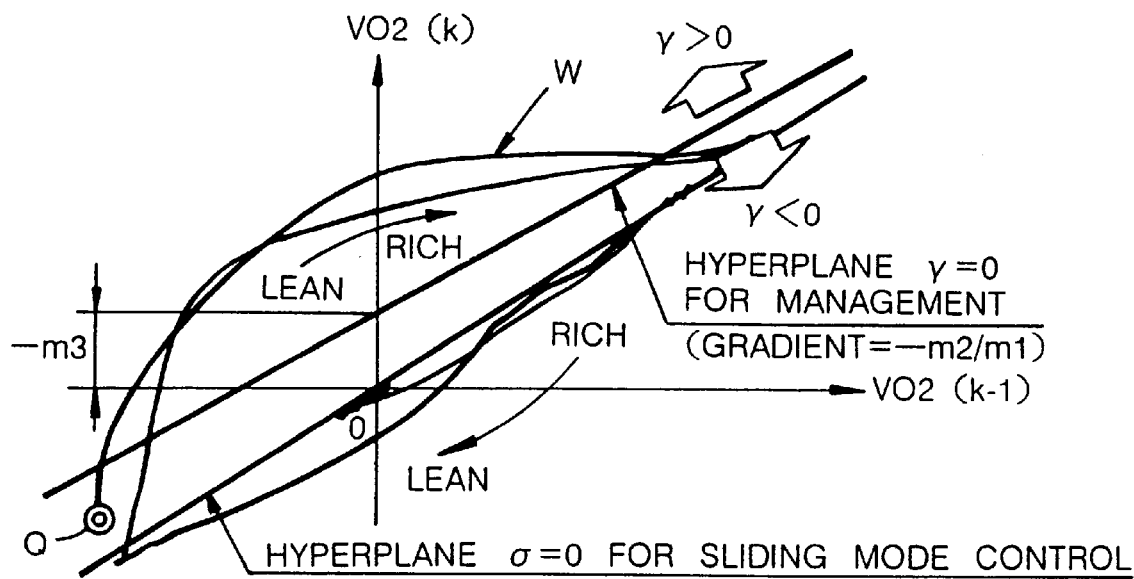
FIG. 13 is a diagram illustrative of the subroutine shown in FIG. 11.

In the control process using the adaptive sliding mode control process according to the first embodiment, as shown in FIG. 13, when an initial state of the state quantity X (VO2(k), $VO_2$(k−1)) of the differential output $VO_2$ from the $O_2$ sensor 6 is indicated by a point Q, the state quantity X changes as indicated by a path line W with respect to the hyperplane σ=0. Basically, in FIG. 13, the manner in which the state quantity X changes above the hyperplane σ=0 (at this time, the value of the linear function σ determined by the state quantity X is positive) represents the manner in which the air-fuel ratio of the exhaust gas having passed through the catalytic converter 3 changes from a lean side to a rich side, and the manner in which the state quantity X changes below the hyperplane σ=0 (at this time, the value of the linear function σ determined by the state quantity X is negative) represents the manner in which the air-fuel ratio of the exhaust gas having passed through the catalytic converter 3 changes from a rich side to a lean side.

Therefore, whether the air-fuel ratio of the exhaust gas having passed through the catalytic converter 3 changes from a lean side to a rich side can be judged basically by deciding whether the value of the linear function σ is positive or not. However, if the behavior of the air-fuel ratio of the exhaust gas changing from a lean side to a rich side is judged by deciding whether the value of the linear function σ is positive or not, then the judged result may change when the state quantity X changes slightly from the hyperplane σ=0. It is thus not preferable to depend on the judged result for stably identifying (updating) the gain coefficients a1, a1, b1.

According to the first embodiment, a management function γ defined using the time-series data of the differential output VO2 according to the following equation (50) is introduced:

$$\gamma(k) = m1 \cdot VO2(k) + m2 \cdot VO2(k-1) + m3 \tag{50}$$

Coefficients m1, m2, m3 of the management function γ are established such that a hyperplane for management expressed by γ=0 exists slightly above from the hyperplane σ=0 for sliding mode control, i.e., in a range where σ>0. In the first embodiment, the coefficient m1 of the management function γ is set to "1" to match the fact that the coefficient s1 of the linear function σ is set to "1".

With the management function γ being introduced, the air-fuel ratio of the exhaust gas reliably changes from a lean side to a rich side if γ≧0. Whether the air-fuel ratio of the exhaust gas behaves in this manner can stably be judged by deciding whether the value of the management function γ is positive (including "0") or not.

The management process for the identifier 25 in STEP5-6 serves to decide whether the air-fuel ratio of the exhaust gas which is represented by the differential output VO2 of the $O_2$ sensor 6 changes from a lean side to a rich side or not, i.e., whether the changing behavior of the air-fuel ratio of the exhaust gas is preferable for identifying (updating) the gain coefficients a1, a1, b1 with the identifier 25 or not, using the management function γ thus defined.

Figure 14:
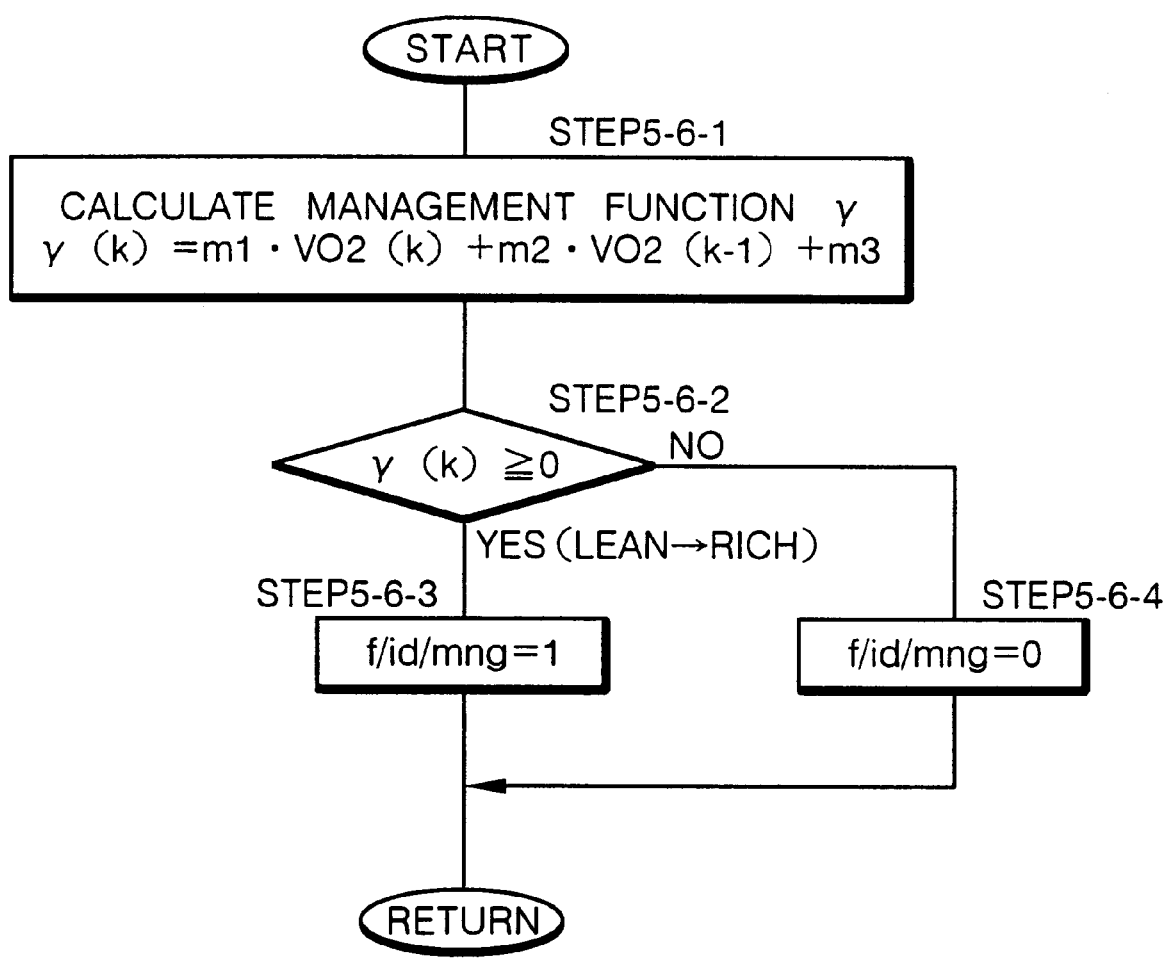
FIG. 14 is a flowchart of a subroutine of the subroutine shown in FIG. 11.
Figure 15:
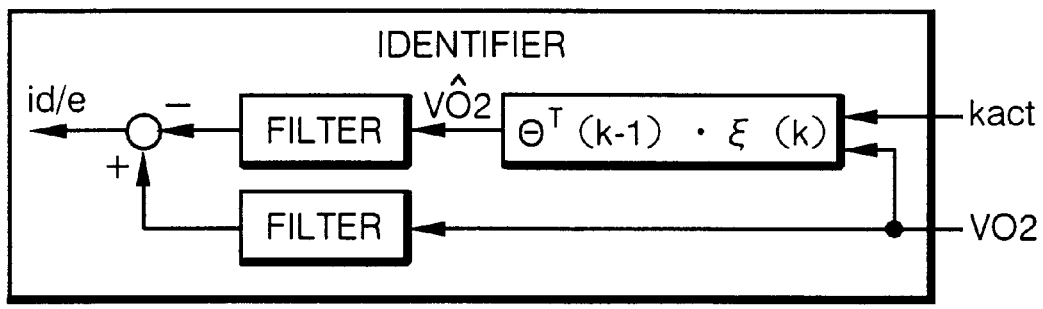
FIG. 15(a) is a block diagram illustrative of the subroutine shown in FIG. 11.
FIG. 15(b) is a block diagram illustrative of the subroutine shown in FIG. 11.
FIG. 15(c) is a block diagram illustrative of the subroutine shown in FIG. 11.
Figure 15:
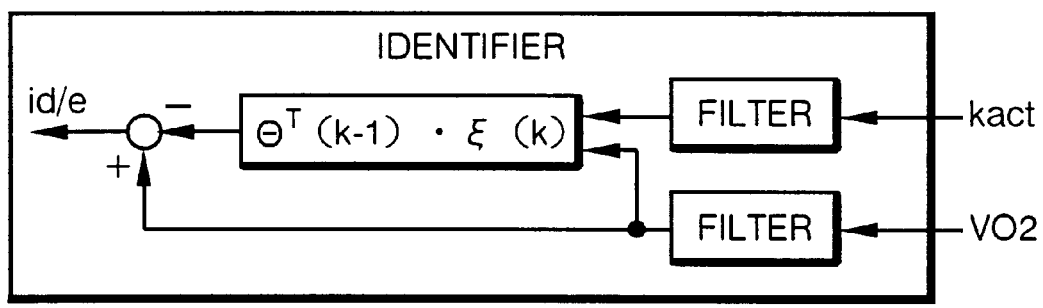
Figure 15:
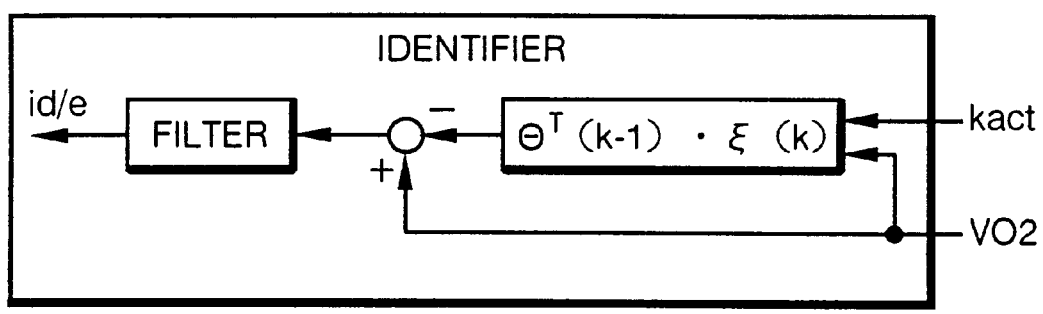

The management subroutine for the identifier 25 is illustrated in detail in FIG. 14.

As shown in FIG. 14, the identifier 25 calculates the value of the management function γ according to the equation (50), using the latest differential output VO2(k) acquired in STEP3 (see FIG. 8) and the differential output VO2(k−1) in the present control cycle, in STEP5-6-1.

Then, the identifier 25 decides whether γ≧0 or not in STEP5-6-2. If γ≧0, then the identifier 25 sets the value of a flag f/id/mng which indicates whether the air-fuel ratio of the exhaust gas changes from a lean side to a rich side or not, to "1" in STEP5-6-3. If γ<0, then the identifier 25 sets the value of the flag f/id/mng to "0" in STEP5-6-4.

Therefore, whether the air-fuel ratio of the exhaust gas changes from a lean side to a rich side or not, i.e., whether the changing behavior of the air-fuel ratio of the exhaust gas is preferable for identifying (updating) the gain coefficients a1, a1, b1 with the identifier 25 or not, is indicated by the value of the flag f/id/mng.

Referring back to FIG. 11, after the identifier 25 has effected its own management process, the identifier 25 determines the value of the flag f/id/mng that has been set in the management process in STEP5-7. If the value of the flag f/id/mng is "1", i.e., if the air-fuel ratio of the exhaust gas having passed through the catalytic converter 3 changes from a lean side to a rich side, i.e., if the changing behavior of the air-fuel ratio of the exhaust gas is preferable for identifying (updating) the gain coefficients a1, a2, b1, then the identifier 25 calculates the identified error id/e, i.e., the difference between the identified differential output VO2 hat from the $O_2$ sensor 6 in the discrete-system model and the actual differential output VO2 (see the equation (5)), in STEP5-8. If the value of the flag f/id/mng is "0", the identifier 25 forcibly sets the value of the identified error id/e to "0" in STEP5-9.

Then, the identifier 25 calculates a new identified gain coefficient vector Θ(k), i.e., new identified gain coefficients a1(k) hat, a2(k) hat, b1(k) hat, according to the equation (7), using the identified error id/e obtained in STEP5-8 or STEP5-9 and κθ calculated in STEP5-5, in STEP5-10.

The identified error id/e obtained in STEP5-8 may basically be calculated according to the equation (6). In the first embodiment, however, as shown in FIG. 15(a), the differential output VO2 acquired in each control cycle in STEP3 (see FIG. 8), and the identified differential output VO2 hat calculated in each control cycle in STEP5-4 are filtered with the same characteristics, and then the identified error id/e is calculated in STEP5-8.

Figure 16:
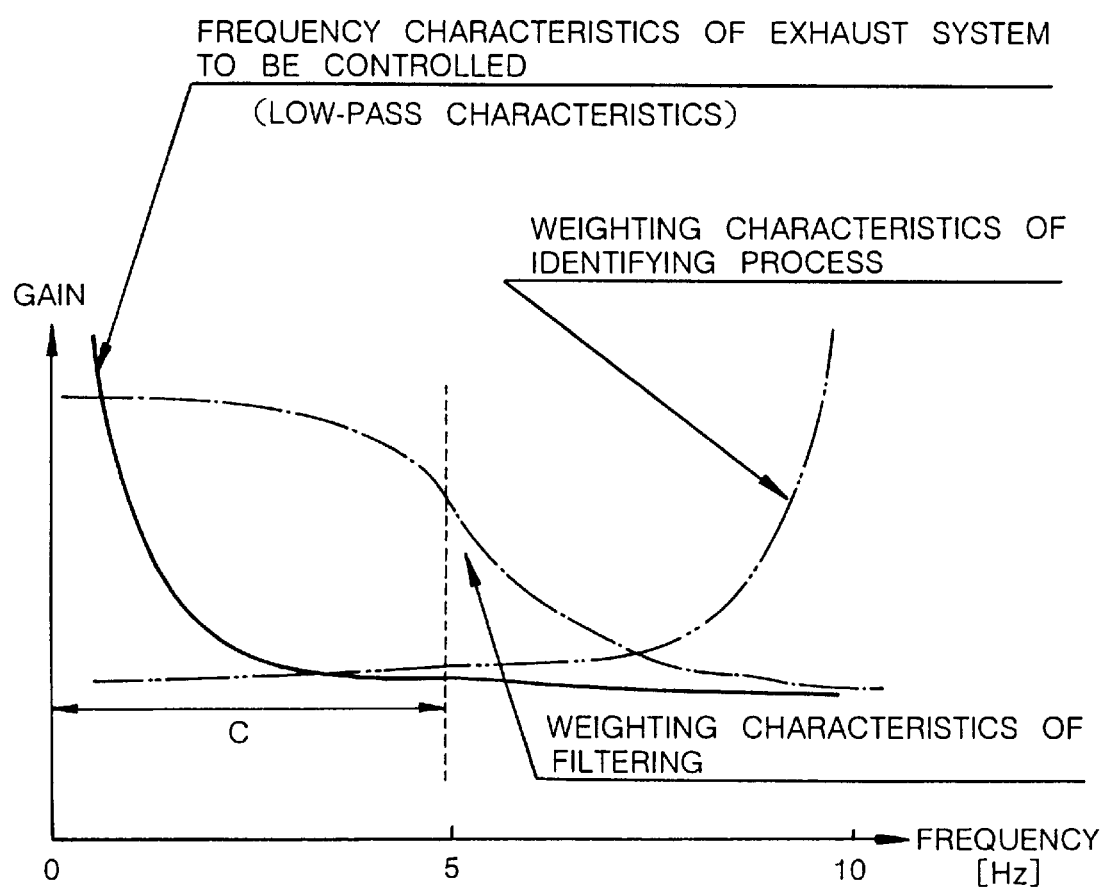
FIG. 16 is a diagram illustrative of the subroutine shown in FIG. 11.
Figure 17:
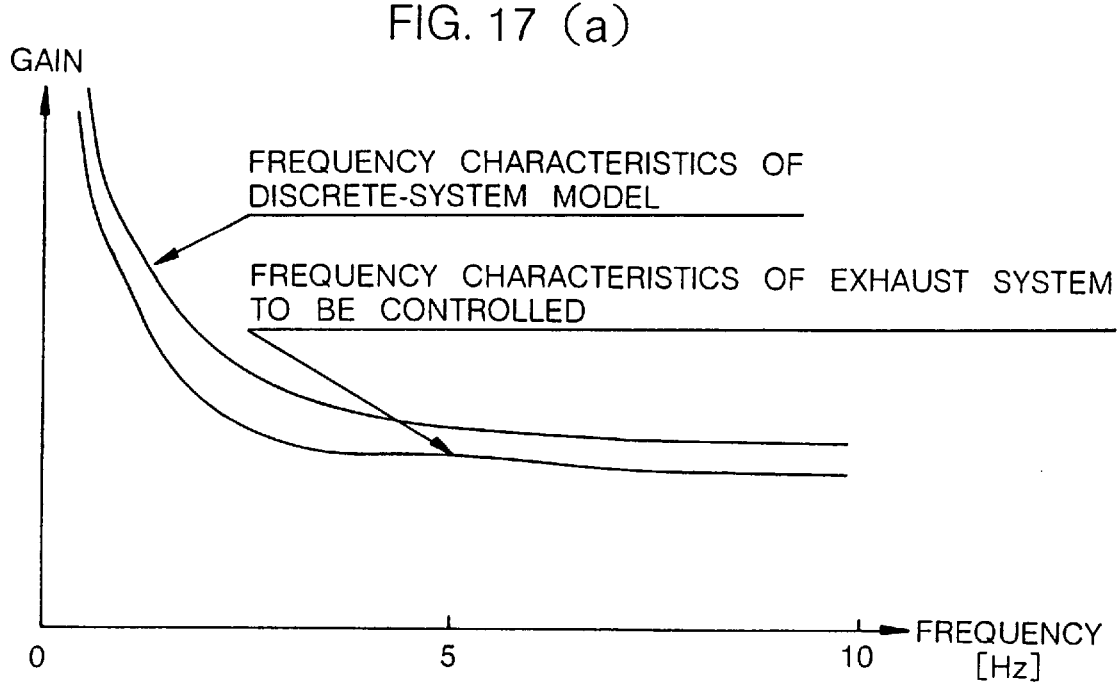
FIG. 17(a) is a diagram illustrative of the subroutine shown in FIG. 11.
FIG. 17(b) is a diagram illustrative of the subroutine shown in FIG. 11.
Figure 17:
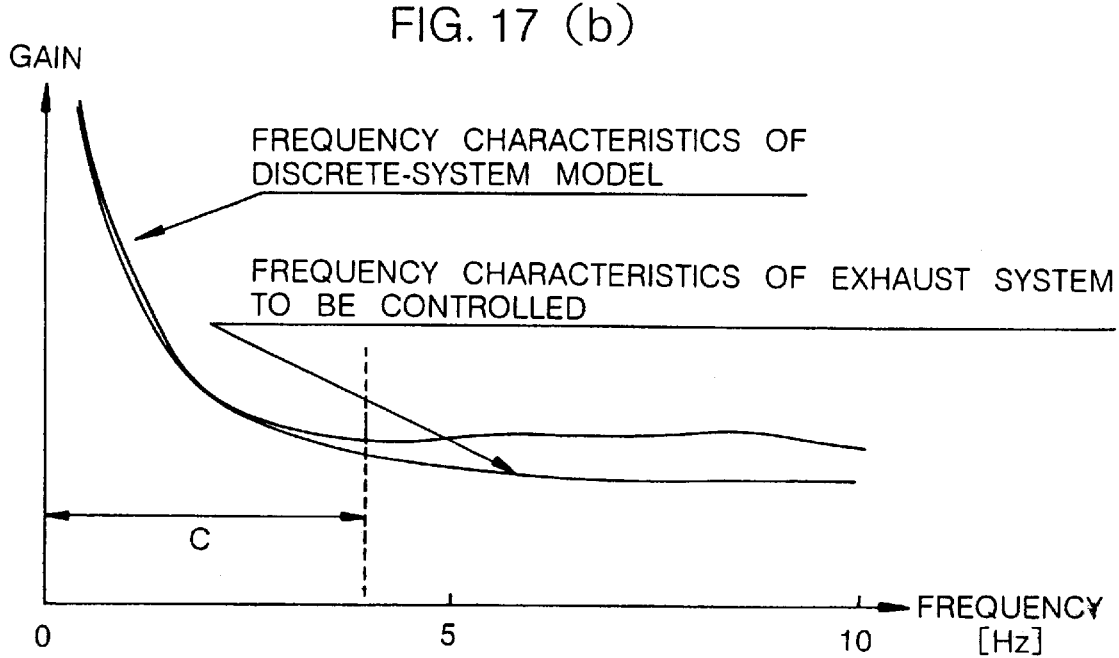

Specifically, as shown in FIG. 16, the frequency characteristics of a gain of an output change of the exhaust system E including the catalytic converter 3 (a change in the output VO2/OUT or the differential output VO2 from the $O_2$ sensor 6) with respect to an input change of the exhaust system E (a change in the output KACT or differential output kact from the LAF sensor 5) have low-pass characteristics with a passband for a low-frequency band C as indicated by the solid-line curve. Therefore, it is necessary to attach importance to the low-frequency band C in determining the target air-fuel ratio KCMD (the target value for the input of the exhaust system E) with the sliding mode controller 27 for controlling the output VO2/OUT of the $O_2$ sensor 6 (the output of the exhaust system E) at the target value VO2/TARGET.

Since the sliding mode controller 27 basically serves to determine the target air-fuel ratio KCMD using the gain coefficients a1, a2, b1 of the discrete-system model which are identified by the identifier 25 according to the equation (7), i.e., the identified gain coefficients a1 hat, a2 hat, b1 hat, the frequency characteristics of the discrete-system model which are determined by the identified gain coefficients a1 hat, a2 hat, b1 hat should preferably be frequency characteristics (the low-pass characteristics with the passband for the low-frequency band C) having the same tendency as the actual frequency characteristics of the exhaust system E.

The process for identifying the gain coefficients a1, a2, b1 of the discrete-system model with the identifier 25 (see the equations (7)–(9)) is weighted toward higher frequencies than the low-frequency band C as indicated by the imaginary lines in FIG. 16 because the exhaust system E has low-pass characteristics. Therefore, if the identified gain coefficients a1 hat, a2 hat, b1 hat were determined depending on the identified error id/e determined directly using the identified differential output VO2 hat and the differential output VO2, then the frequency characteristics of the discrete-system model determined by the identified gain coefficients a1 hat, a2 hat, b1 hat would not match the actual frequency characteristics of the exhaust system E, but would have importance attached to gain characteristics of the exhaust system E outside of the low-frequency band C. Particularly, the gain of the discrete-system model in the low-frequency band C would tend to be smaller than the actual gain of the exhaust system E.

In the first embodiment, the differential output VO2 and the identified differential output VO2 hat are filtered with characteristics (low-pass characteristics) with the low-frequency band C weighted as indicated by the dot-and-dash-line curve in FIG. 16, and then the identified error id/e is calculated in STEP5-8.

The filtering with the low-pass characteristics is carried out by storing the differential output VO2 acquired in STEP3 (see FIG. 8) and the identified differential output VO2 hat calculated in STEP5-4 in a time-series fashion, and calculating an arithmetic mean or a weighted arithmetic mean of a certain number of data, from the present into the past, of time-series data of the differential output VO2 and the identified differential output VO2 hat in each control cycle. This filtering process is one type of digital filtering process, and is generally known as the moving averaging process. The identified error id/e is calculated in STEP5-8 by subtracting the filtered value of the identified differential output VO2 hat from the filtered value of the differential output VO2.

According to the above filtering process, it is possible to convert the frequency characteristics of the discrete-system model determined by the identified gain coefficients a1 hat, a2 hat, b1 hat that are determined from the identified error id/e according to the equation (7), into the frequency characteristics having the same tendency as the actual frequency characteristics of the exhaust system E, as shown in FIG. 17(a), for example.

In the first embodiment, as shown in FIG. 17(a), the weighting of the filtering process is established such that the gain at each frequency of the discrete-system model is slightly greater as a whole than the gain at each frequency of the exhaust system E. With the weighting of the filtering process being thus established, an input change (a change in the output KACT or differential output kact from the LAF sensor 5) which causes an output change (a change in the output VO2/OUT or the differential output VO2 from the $O_2$ sensor 6) is smaller in the discrete-system model than in the exhaust system E. Consequently, the SLD manipulating input usl determined as an input to be applied to the exhaust system E by the sliding mode controller 27 using the identified gain coefficients a1 hat, a2 hat, b1 hat of the discrete-system model is of a small value at each frequency. As a result, the convergence of the output VO2/OUT of the $O_2$ sensor 6 toward the target value VO2/TARGET can be controlled with increased stability.

In the first embodiment, as shown in FIG. 17(a), the weighting of the filtering process is established such that the gain at each frequency of the discrete-system model is slightly greater as a whole than the gain at each frequency of the exhaust system E, as described above. However, if the frequency characteristics of the gain of the discrete-system model in the low-frequency band C are substantially the same as the frequency characteristics of the gain of the exhaust system E, then the weighting of the filtering process may be established such that the gain of the discrete-system model is slightly greater than the gain of the exhaust system E in a frequency band higher than the low-frequency band C, as is the case with the weighting shown in FIG. 17(a).

With the above weighting setting, the convergence of the output VO2/OUT of the $O_2$ sensor 6 toward the target value VO2/TARGET can be controlled with increased stability at frequencies higher than the low-frequency band C (a frequency band where the gain of the exhaust system E is relatively small), as is the case with the weighting shown in FIG. 17(a). In the low-frequency band C which is important for the convergence control, the SLD manipulating input url which matches the actual characteristics of the exhaust system E can be determined by the sliding mode controller 27. As a consequence, the output VO2/OUT of the $O_2$ sensor 6 can be converged toward the target value VO2/TARGET with a quick tracking capability, i.e., a quick response.

In the first embodiment, as shown in FIG. 15(a), the differential output VO2 and the identified differential output VO2 hat are filtered, and then the identified error id/e is calculated. However, as shown in FIG. 15(b), before the identified differential output VO2 hat is calculated in STEP5-4, the differential outputs kact, VO2 to be used for calculating the identified differential output VO2 hat may be filtered with the same characteristics, and the identified error id/e may be calculated from the identified differential output VO2 hat calculated from the filtered values according to the equation (5) and the value of the differential output VO2 which has been filtered previously. Alternatively, as shown in FIG. 15(c), the identified error id/e may be calculated according to the equation (6) directly using the identified differential output VO2 hat calculated directly using the differential outputs kact, VO2, and the differential output VO2, after which the identified error id/e may be filtered.

For calculating the identified error id/e, consequently, the differential output VO2 and the identified differential output VO2 hat may be filtered with the same characteristics, and the timing of such a filtering process may be selected arbitrarily.

Figure 18:
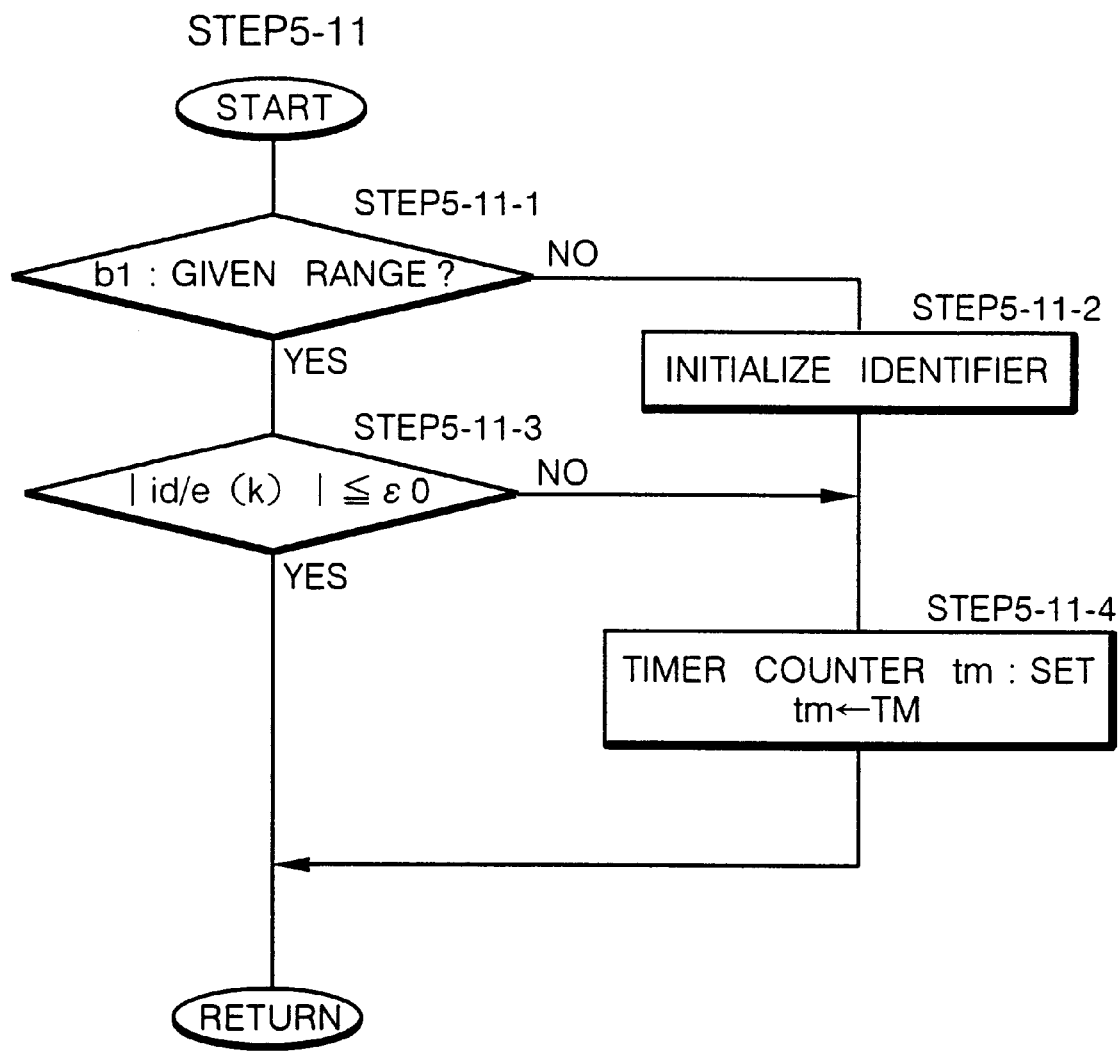
FIG. 18 is a flowchart of another subroutine of the subroutine shown in FIG. 11.

Referring back to FIG. 11, after the identifier 25 has calculated the identified gain coefficients a1 hat, a2 hat, b1 hat (the identified gain coefficient vector Θ), the identifier 25 evaluates the calculated identified gain coefficients a1 hat, a2 hat, b1 hat in STEP5-11. The evaluating subroutine of STEP5-11 is shown in detail in FIG. 18. As shown in FIG. 18, the identifier 25 decides whether the value of the identified gain coefficient b1 hat falls in a predetermined range or not, thereby to determine the stability of the identifying process of the identifier 25 in STEP5-11-1. If the value of the identified gain coefficient b1 hat falls in the predetermined range, then the identifier 25 decides whether or not the magnitude (absolute value) of the identified error id/e calculated in STEP5-8 is of a sufficiently small value equal to or smaller than a predetermined value ε0, i.e., whether the identified error id/e has converged substantially toward "0" and the identified gain coefficients a1 hat, a2 hat, b1 hat have been determined definitely or not, in STEP5-11-3. If $|id/e| \leq \epsilon 0$, then control returns to the routine shown in FIG. 11.

If the value of the identified gain coefficient b1 hat does not fall in the predetermined range in STEP5-11-1, then it is considered that the process of identifying the gain coefficients a1, a1, b1 with the identifier 25 is unstable, making it difficult to determine appropriate identified gain coefficients a1 hat, a2 hat, b1 hat. Therefore, as is the case with STEP5-3, the identifier 25 is initialized in STEP5-11-2, and the value of a timer counter tm (count-down timer) to be used for determining the stability of the sliding mode control process is set to a predetermined initial value TM, i.e., the timer counter tm is started, in STEP5-11-4. If $|id/e| > \epsilon 0$ in STEP5-11-3, i.e., if the identified gain coefficients a1 hat, a2 hat, b1 hat have not been determined definitely, then the processing in STEP5-11-4 is carried out to set the value of the timer counter tm to the initial value TM, i.e., the timer counter tm is started.

In the first embodiment, it is decided whether the value of the identified gain coefficient b1 hat falls in the predetermined range or not to determine the stability of the identifying process of the identifier 25. However, the other identified gain coefficients a1 hat, a2 hat may be evaluated similarly, and if their values are inappropriate, the identifying process of the identifier 25 may be judged as being unstable, followed by the processing in STEP5-11-2 and STEP5-11-4.

Referring back to FIG. 11, after the identifier 25 has evaluated the identified gain coefficient vector Θ, the identifier 25 determines the value of the flag f/id/mng set in STEP5-6 in STEP5-12. If the value of the flag f/id/mng is "1", i.e., if the air-fuel ratio of the exhaust gas having passed through the catalytic converter 3 changes from a lean side to a rich side, i.e., if the changing behavior of the air-fuel ratio of the exhaust gas is preferable for identifying (updating) the gain coefficients a1, a2, b1, then the identifier 25 calculates the matrix P(k) according to the equation (9) for the processing of a next control cycle in STEP5-13, after which control returns to the main routine shown in FIG. 8. If the value of the flag f/id/mng is "0", the identifier 25 maintains the matrix P(k) according to the equation (9) for the processing of a next control cycle for the present matrix P(k−1) in STEP5-14, after which control returns to the main routine shown in FIG. 8.

The processing subroutine of STEP5 for the identifier 25 has been described above.

Figure 19:
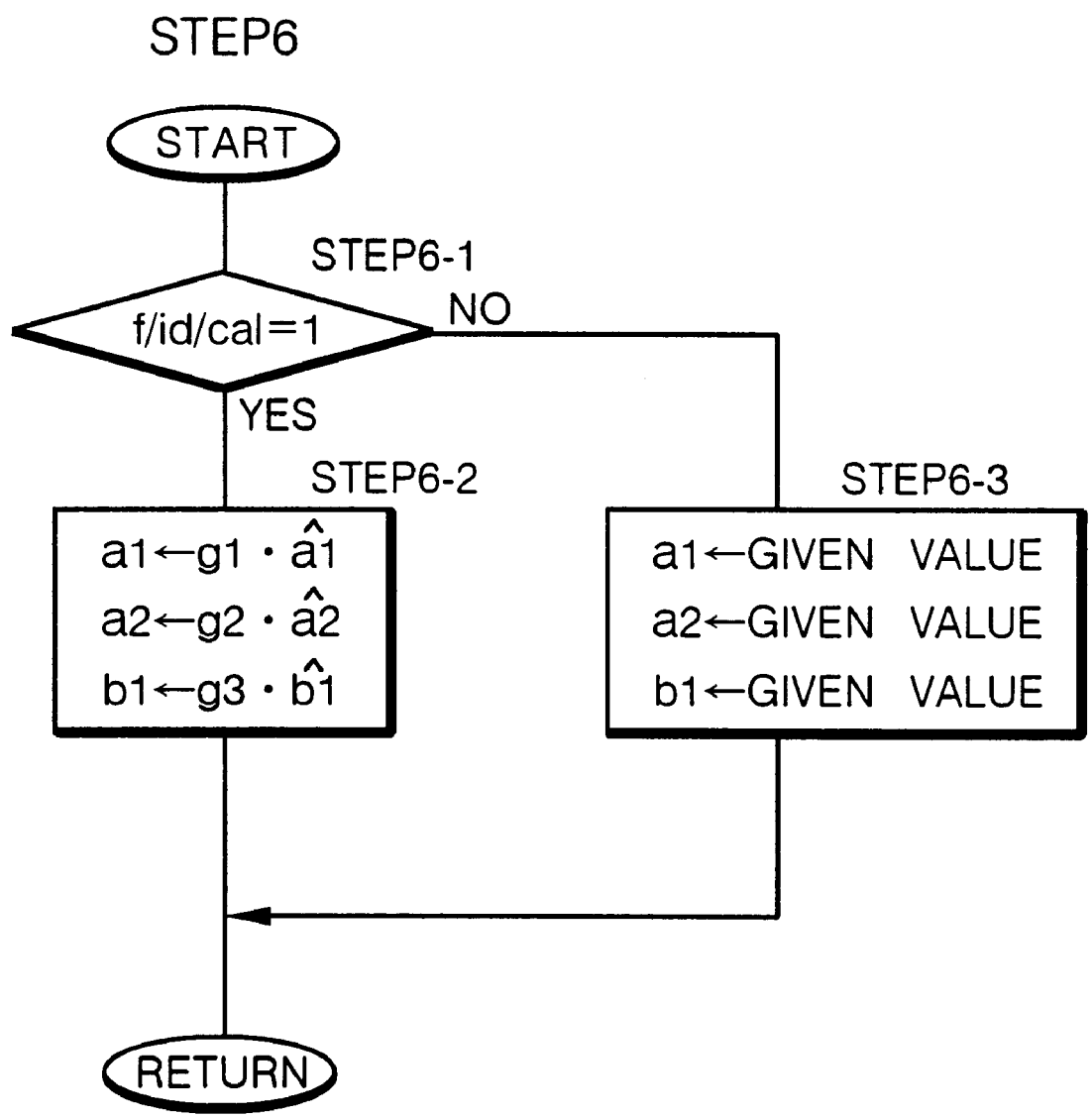
FIG. 19 is a flowchart of yet still another subroutine of the process shown in FIG. 8.

In FIG. 8, after the processing of the identifier 25 has been carried out, the air-fuel ratio manipulated variable determining unit 13 determines the gain coefficients a1, a2, b1 in STEP6. The determining subroutine of STEP6 is shown in detail in FIG. 19. As shown in FIG. 19, the air-fuel ratio manipulated variable determining unit 13 determines the value of the flag f/id/cal set in STEP2 in STEP6-1. If the value of the flag f/id/cal is "1", i.e., if the gain coefficients a1, a2, b1 have been identified by the identifier 25, then the gain coefficients a1, a2, b1 are set to respective values that are produced by scaling the identified gain coefficients a1 hat, a2 hat, b1 hat determined by the identifier 25 in STEP5-10 (see FIG. 11) with respective scaling coefficients g1, g2, g3, in STEP6-2. In the first embodiment, each of the scaling coefficients g1, g2, g3 has a value of "1".

If the value of the flag f/id/cal is "0", i.e., if the gain coefficients a1, a2, b1 have not been identified by the identifier 25, then the gain coefficients a1, a2, b1 are set to predetermined values, respectively, in STEP6-3.

Then, the air-fuel ratio manipulated variable determining unit 13 effects a processing operation of the estimator 26, i.e., calculates the estimated differential output VO2 bar, in STEP7 of the main routine shown in FIG. 8.

Figure 20:
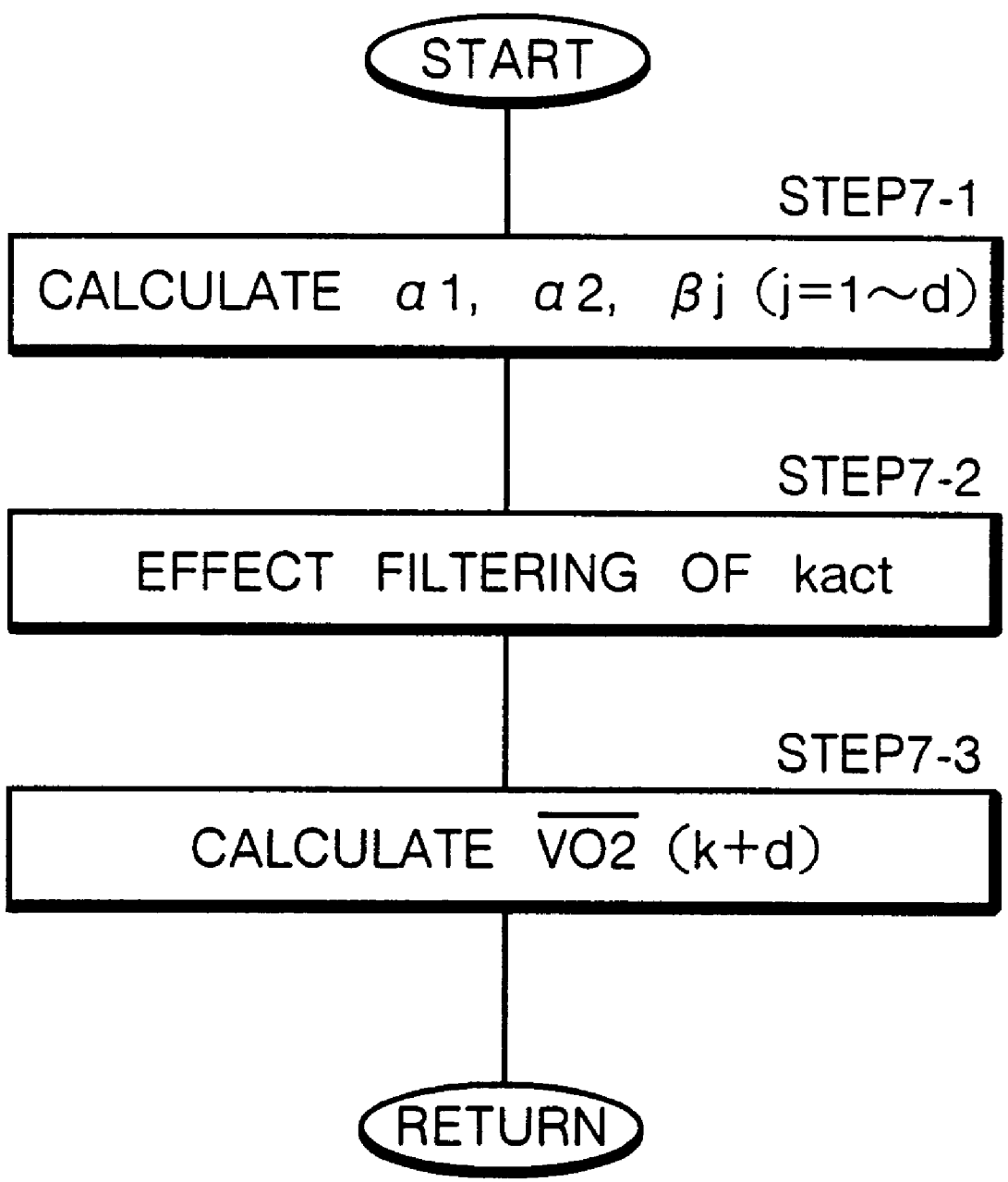
FIG. 20 is a flowchart of a further subroutine of the process shown in FIG. 8.

The calculating subroutine of STEP7 is shown in detail in FIG. 20. As shown in FIG. 20, the estimator 26 calculates the coefficients α1, α2, βj (j=1, 2, . . . , d) to be used in the equation (13), using the gain coefficients a1, a2, b1 determined in STEP6, (see the equations (11), (12)), in STEP7-1. Then, the estimator 26 filters with the low-pass characteristics the differential output kact (acquired in STEP3) of the LAF sensor 5 to be used in the equation (13) in STEP7-2. Thereafter, the estimator 26 calculates the estimated differential output VO2(k+d) bar (estimated value of the differential output VO2 after the dead time d from the time of the present control cycle) according to the equation (13), using the time-series data of the filtered value of the differential output kact, the time-series data of the differential output VO2 of the $O_2$ sensor (acquired in STEP3), and the coefficients α1, α2, βj calculated in STEP7-1, in STEP7-3.

The differential output kact of the LAF sensor 5 is filtered in STEP7-2 for the following reasons:

Inasmuch as the exhaust system E including the catalytic converter 3 has low-pass frequency characteristics as described above (see FIG. 16), it is necessary to attach importance to the low-frequency band C (see FIG. 6) in controlling the output VO2/OUT of the $O_2$ sensor 6 as the output from the exhaust system E at the target value VO2/TARGET. Therefore, it is preferable to attach importance to the low-frequency band C (see FIG. 6) in determining the estimated differential output VO2 bar according to the equation (13) which is used for the sliding mode controller 27 to determine the SLD manipulating input usl. The differential output VO2 from the $O_2$ sensor 6 which is used, together with the differential output kact of the LAF sensor 5, in the equation (13) to determine the estimated differential output VO2 bar contains almost no high-frequency components because the exhaust system E has low-pass frequency characteristics. However, the differential output kact generally tends to contain high-frequency components. Accordingly, in the first embodiment, the differential output kact of the LAF sensor 5 is filtered to remove high-frequency components therefrom, and then the estimated differential output VO2 bar is determined according to the equation (13).

The differential output kact of the LAF sensor 5 is filtered is filtered according to the moving averaging process as is the case with the filtering process carried out by the identifier 25.

Referring back to FIG. 8, the air-fuel ratio manipulated variable determining unit 13 then calculates the SLD manipulating input usl with the sliding mode controller 27 in STEP8.

Figure 21:
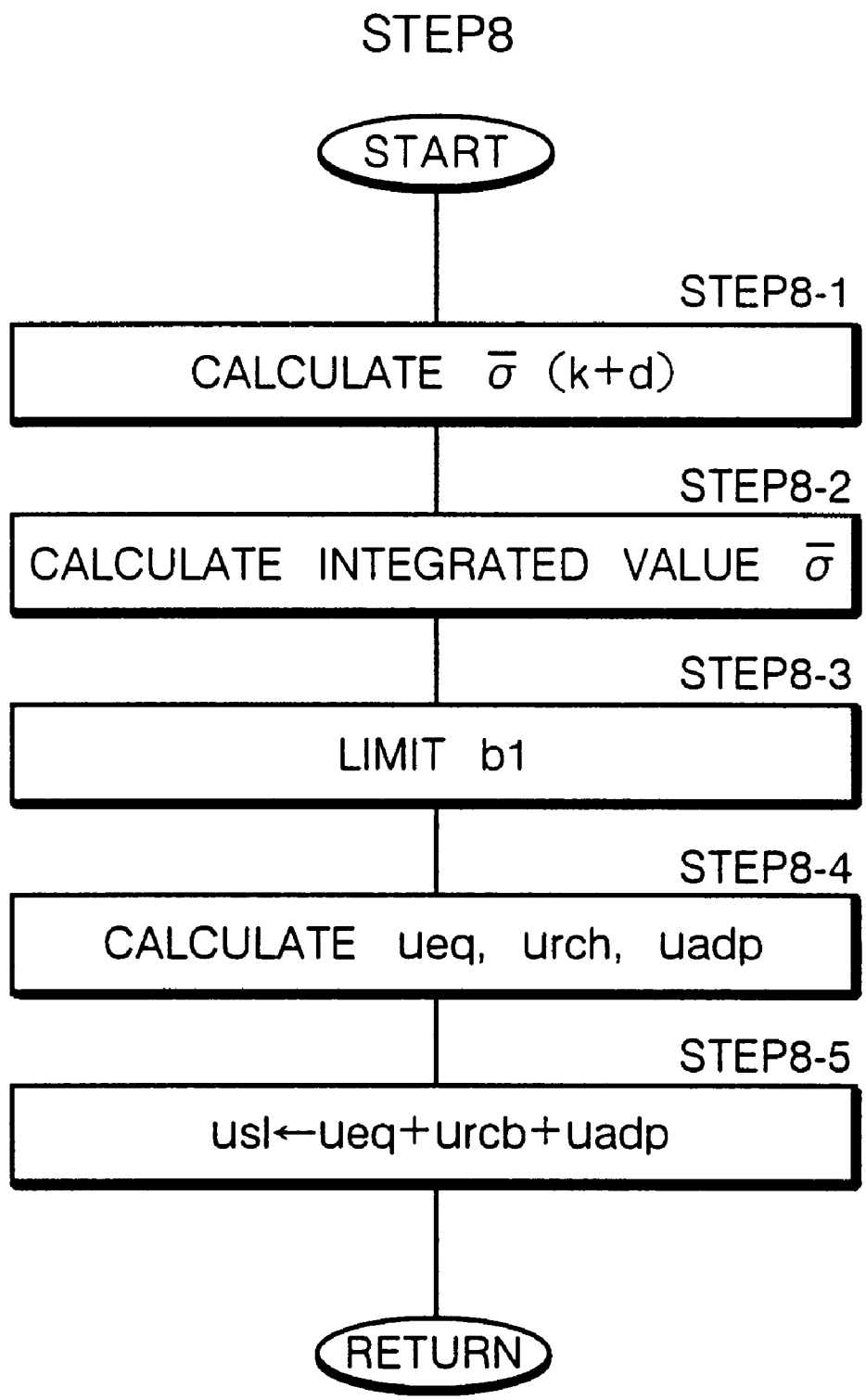
FIG. 21 is a flowchart of a still further subroutine of the process shown in FIG. 8.

The calculating subroutine of STEP8 is shown in detail in FIG. 21.

As shown in FIG. 21, the sliding mode controller 27 calculates a value σ(k+d) bar (corresponding to an estimated value, after the dead time d, of the linear function σ defined according to the equation (14)), after the dead time d from the present control cycle, of the linear function σ bar defined according to the equation (35), using the time-series data of the estimated differential output VO2 bar determined by the estimator 26 in STEP8 (specifically, the VO2(k+d) bar determined in the present control cycle and the VO2(k+d−1) bar determined in the preceding control cycle), in STEP8-1.

Then, the sliding mode controller 27 accumulates values σ(k+d) bar calculated in respective control cycles in STEP8-1, i.e., adds a value σ(k+d) calculated in the present control cycle to the sum determined in the preceding control cycle, thereby calculating an integrated value of σ(k+d) bar (which corresponds to the term at the right end of the equation (37)) in STEP8-2. In the first embodiment, the integrated value of σ(k+d) bar falls in a predetermined range, and if the integrated value of σ(k+d) bar exceeds a given upper or lower limit, then the integrated value of σ(k+d) bar is limited to the upper or lower limit. This is because if the integrated value of σ(k+d) bar is excessively large, then adaptive control law input uadp determined according to the equation (37) will become excessive, tending to impair controllability.

Then, the sliding mode controller 27 limits the gain coefficient b1 determined in STEP6 in STEP8-3.

Figure 22:
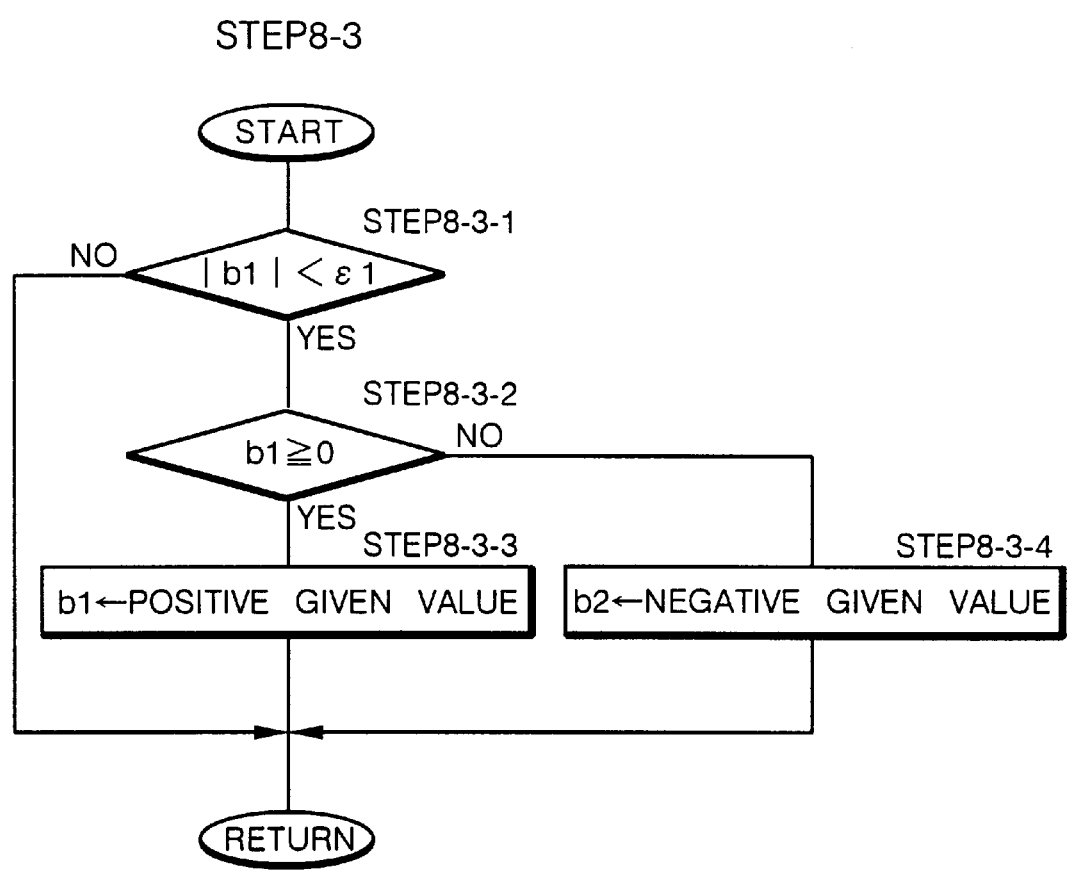
FIG. 22 is a flowchart of a subroutine of the subroutine shown in FIG. 21.

The limiting subroutine of STEP8-3 is shown in detail in FIG. 22. As shown in FIG. 22, the sliding mode controller 27 decides whether the magnitude of the gain coefficient b1 is smaller than a predetermined value ε1 or not in STEP8-3-1. If $|b1| \geq \epsilon 1$, then control returns to the subroutine processing shown in FIG. 21.

If $|b1| < \epsilon 1$ (b1≈0), then depending on whether the sign of the gain coefficient b1 is positive (including b1=0) or not in STEP8-3-2, the value of the gain coefficient b1 is forcibly limited to a predetermined positive value ($\geq \epsilon 1$) in STEP8-3-3 or a predetermined negative value ($\leq -\epsilon 1$) in STEP8-3-4. The magnitude of the gain coefficient b1 is limited and hence is prevented from becoming excessively small for the following reasons: As can be seen from the equations (34), (36), (37), since the gain coefficient b1 is used as a denominator term in the calculation of the equivalent control input ueq, the reaching control law input urch, and the adaptive control law uadp, if the gain coefficient b1 is excessively small, the equivalent control input ueq, the reaching control law input urch, and the adaptive control law uadp will be calculated as excessively large values.

While only the gain coefficient b1 is limited in the first embodiment, the other gain coefficients a1, a2 may be limited.

In FIG. 21, after having limited the gain coefficient b1, the sliding mode controller 27 calculates the equivalent control input ueq, the reaching control law input urch, and the adaptive control law uadp according to the respective equations (34), (36), (37) in STEP8-4, using the time-series data VO2(k+d)bar, VO2(k+d−1) bar of the estimated differential output VO2 bar determined by the estimator 26 in STEP8, the value σ(k+d) bar of the linear function and its integrated value which are determined respectively in STEP8-1 and STEP8-2, the gain coefficients a1 hat, a2 hat determined in STEP6, and the gain coefficient b1 hat determined in STEP8-3.

The sliding mode controller 27 then adds the equivalent control input ueq, the reaching control law input urch, and the adaptive control law uadp determined in STEP8-4 to calculate the SLD manipulating input usl, i.e., the input (the difference between the air-fuel ratio of the exhaust gas detected by the LAF sensor 5 and the reference value FLAF/BASE) to be applied to the exhaust system E for converging the output signal VO2/OUT of the $O_2$ sensor 6 toward the target value VO2/TARGET in STEP8-5.

In FIG. 8, after the SLD manipulating input usl has been calculated, the air-fuel ratio manipulated variable determining unit 13 determines the stability of the adaptive sliding mode control process carried out by the sliding mode controller 27, and sets a value of a flag f/sld/stb indicative of whether the adaptive sliding mode control process is stable or not in STEP9.

Figure 23:
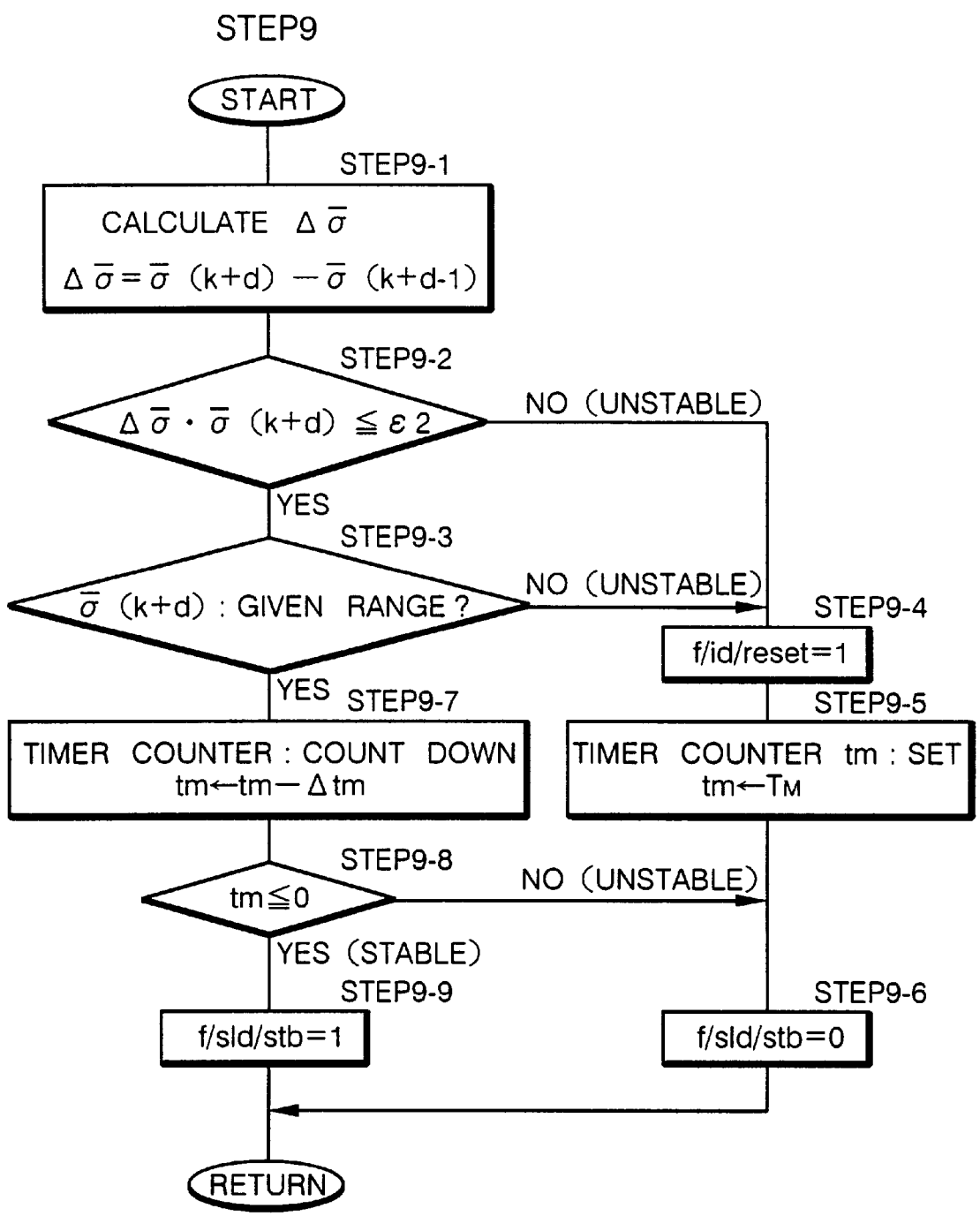
FIG. 23 is a flowchart of a yet still further subroutine of the process shown in FIG. 8.

The determining subroutine of STEP9 is shown in detail in FIG. 23.

As shown in FIG. 23, the air-fuel ratio manipulated variable determining unit 13 calculates a difference $\Delta\sigma$ bar (corresponding to a rate of change of the linear function $\sigma$ bar) between the present value $\sigma(k+d)$ bar calculated in STEP8-1 and a preceding value $\sigma(k+d-1)$ bar of the linear function $\sigma$ bar in STEP9-1.

Then, the air-fuel ratio manipulated variable determining unit 13 decides whether or not a product $\Delta\sigma \cdot \sigma(k+d)$ bar (corresponding to the time-differentiated function of a Lyapunov function $\sigma$ $bar^2/2$ relative to the $\sigma$ bar) of the difference $\Delta\sigma$ bar calculated in STEP9-1 and the present value $\sigma(k+d)$ bar is equal to or smaller than a predetermined value $\epsilon 2$ ($\geq 0$) in STEP9-2.

When the difference $\Delta\sigma \cdot \sigma(k+d)$ bar is greater than $\epsilon 2$, the differential outputs VO2(K+d), VO2(k+d−1) change away from the hyperplane $\sigma=0$ with $\sigma$ $bar^2$ increasing, and hence the adaptive sliding mode control process is considered to be unstable, i.e., the SLD manipulating input usl calculated in STEP8 is inappropriate. Therefore, if $\Delta\sigma \cdot \sigma(k+d)$ bar>$\epsilon 2$ in STEP9-2, then the adaptive sliding mode control process is judged as being unstable, and the value of the flag f/id/reset is set to "1" in order to initialize the identifier 25 in STEP9-4. Then, the value of the timer counter tm (count-down timer) is set to the predetermined initial value TM (the timer counter tm is started) in order to inhibit the determination of the target air-fuel ratio KCMD using the SLD manipulating input usl calculated in STEP8 for a predetermined time in STEP9-5. Thereafter, the value of the flag f/sld/stb is set to "0" (the flag f/sld/stb=0 represents that the adaptive sliding mode control process is unstable) in STEP9-6.

While the value $\epsilon 2$ used in the decision step of STEP9-2 may theoretically be "0", it should preferably be slightly greater than "0" in view of the effect of probabilistic disturbance.

If $\Delta\sigma \cdot \sigma(k+d)$ bar$\leq \epsilon 2$ in STEP9-2, then the air-fuel ratio manipulated variable determining unit 13 decides whether the present value $\sigma(k+d)$ bar of the linear function $\sigma$ bar falls within a predetermined range or not in STEP9-3.

When the present value $\sigma(k+d)$ bar of the linear function $\sigma$ bar does not fall within the predetermined range, the differential outputs VO2(K+d), VO2(k+d−1) are spaced widely apart from the hyperplane $\sigma=0$, and hence the adaptive sliding mode control process is considered to be unstable, i.e., the SLD manipulating input usl calculated in STEP8 is inappropriate. Therefore, if the present value $\sigma(k+d)$ bar of the linear function $\sigma$ bar does not fall within the predetermined range in STEP9-3, then the adaptive sliding mode control process is judged as being unstable, and the processing of STEP9-4 through STEP9-6 is executed to set the value of the flag f/id/reset to "1" in order to initialize the identifier 25 and start the timer counter tm.

If the present value $\sigma(k+d)$ bar of the linear function $\sigma$ bar falls within the predetermined range in STEP9-3, then the air-fuel ratio manipulated variable determining unit 13 counts down the timer counter tm for a predetermined time $\Delta tm$ in STEP9-7. The air-fuel ratio manipulated variable determining unit 13 then decides whether or not the value of the timer counter tm is equal to or smaller than "0", i.e., whether a time corresponding to the initial value TM has elapsed from the start of the timer counter tm or not, in STEP9-8.

If tm>0, i.e., if the timer counter tm is still measuring time and its set time has not yet elapsed, then since the adaptive sliding mode control process tends to be unstable before substantial time has not elapsed since the adaptive sliding mode control process was judged as being unstable in STEP9-2 or STEP9-3, the value of the flag f/sld/stb is set to "0" in STEP9-6.

If tm$\leq 0$ in STEP9-8, i.e., if the set time of the timer counter tm has elapsed, then the adaptive sliding mode control process is judged as being stable, and the value of the flag f/sld/stb is set to "1" (the flag f/sld/stb=1 represents that the adaptive sliding mode control process is stable) in STEP9-9.

The timer counter tm is also started when the identified error id/e is not converged and the identified gain coefficients a1 hat, a2 hat, b1 hat are not yet definitely determined in the above process of evaluating the identified gain coefficients a1 hat, a2 hat, b1 hat with the identifier 25 (the subroutine shown in FIG. 18). Therefore, even if the condition of STEP9-2 or STEP9-3 is satisfied, it may be possible that tm>0 in STEP9-8 and the value of the flag f/sld/stb is set to "0". This is because insofar as the identified gain coefficients a1 hat, a2 hat, b1 hat are not yet definitely determined, the adaptive sliding mode control process using the identified gain coefficients a1 hat, a2 hat, b1 hat is apt to be unstable.

The air-fuel ratio manipulated variable determining unit 13 determines the stability of the adaptive sliding mode control process carried out by the sliding mode controller 27 according to the subroutine shown in FIG. 23. If the adaptive sliding mode control process is judged as being unstable, then the value of the flag f/sld/stb is set to "0", and if the adaptive sliding mode control process is judged as being stable, then the value of the flag f/sld/stb is set to "1".

In the first embodiment, the stability of the adaptive sliding mode control process is determined by judging the conditions of STEP9-2, STEP9-3. However, the stability of the adaptive sliding mode control process may be determined by judging either one of the conditions of STEP9-2, STEP9-3. Alternatively, the stability of the adaptive sliding mode control process may be determined by comparing the magnitude (absolute value) of the difference $\Delta\sigma$ corresponding to the rate of change of the linear function $\sigma$ bar with a predetermined value.

Referring back to FIG. 8, after a value of the flag f/sld/stb indicative of the stability of the adaptive sliding mode control process carried out by the sliding mode controller 27 has been set, the air-fuel ratio manipulated variable determining unit 13 determines the value of the flag f/sld/stb in STEP10. If the value of the flag f/sld/stb is "1", i.e., if the adaptive sliding mode control process is judged as being stable, then the sliding mode controller 27 limits the SLD manipulating input usl calculated in STEP 8 in STEP11. Specifically, the value of the SLD manipulating input usl or a range in which the value of the SLD manipulating input usl can vary is limited to a certain range, and if the present value usl(k) of the SLD manipulating input usl calculated in STEP 8 exceeds a given upper or lower limit, then the value of the SLD manipulating input usl is forcibly limited to the upper or lower limit. If a change of the present value usl(k) of the SLD manipulating input usl calculated in STEP 8 from a preceding value usl(k−1) thereof exceeds a predetermined quantity, then the value of the SLD manipulating input usl is forcibly set to a value which is equal to the sum of the preceding value usl(k−1) and the predetermined quantity.

After having limited the SLD manipulating input usl as described above, the sliding mode controller 27 calculates the target air-fuel ratio KCMD according to the equation (38) in STEP13. Then, the processing of the present control cycle is finished.

If the value of the flag f/sld/stb is "0", i.e., if the adaptive sliding mode control process is judged as being unstable, then the air-fuel ratio manipulated variable determining unit 13 sets the value of the SLD manipulating input usl in the present control cycle forcibly to a predetermined value, i.e., either a fixed value or a preceding value of the SLD manipulating input usl, in STEP12. Thereafter, the sliding mode controller 27 calculates the target air-fuel ratio KCMD according to the equation (38) in STEP13, followed by an end put to the processing of the present control cycle.

The target air-fuel ratio KCMD that is finally determined in STEP13 is stored as time-series data for respective control cycles in a memory (not shown). When the general feedback controller 15, etc. is to use the target air-fuel ratio KCMD determined by the air-fuel ratio manipulated variable determining unit 13 (see STEPf in FIG. 6), the general feedback controller 15 selects the latest target air-fuel ratio KCMD from the stored time-series data thereof.

The operation of the plant control system has been described in detail above.

The operation of the plant control system will be summarized as follows: The air-fuel ratio manipulated variable determining unit 13 sequentially determines the target air-fuel ratio KCMD (corresponding to the target input for the exhaust system E) for the exhaust gas introduced into the catalytic converter 3 so as to adjust (converge) the output signal VO2/OUT (corresponding to the output of the exhaust system E as the plant) of the $O_2$ sensor 6 downstream of the catalytic converter 3 to the target value VO2/TARGET therefor. The amount of fuel supplied to the internal combustion engine 1 as the actuator for generating the input (the air-fuel ratio of the exhaust gas) to the exhaust system E is feedback-controlled according to the target air-fuel ratio KCMD based on the target air-fuel ratio KCMD and the output KACT of the LAF sensor 5 upstream of the catalytic converter 3. By adjusting the output signal VO2/OUT of the $O_2$ sensor 6 downstream of the catalytic converter 3 to the target value VO2/TARGET, the catalytic converter 3 can maintain its optimum exhaust gas purifying performance without being affected by its own aging.

The air-fuel ratio manipulated variable determining unit 13 determines the target air-fuel ratio KCMD (the target input for the exhaust system E) using the sliding mode control process which is essentially resistant to disturbances, especially the adaptive sliding mode control process to which the adaptive control law for eliminating the effect of disturbances as much as possible is added. Consequently, the air-fuel ratio manipulated variable determining unit 13 can determine the target air-fuel ratio KCMD stably while suppressing the effect of disturbances as much as possible, which is suitable for the purpose of adjusting the output signal VO2/OUT (the output of the exhaust system E) of the $O_2$ sensor 6 to the target value VO2/TARGET. Accordingly, the output signal VO2/OUT of the $O_2$ sensor 6 can be controlled stably and accurately at the target value VO2/TARGET.

When the sliding mode controller 27 of the air-fuel ratio manipulated variable determining unit 13 is to determine the target air-fuel ratio KCMD according to the adaptive sliding mode control process, the sliding mode controller 27 uses the estimated differential output VO2 determined by the estimator 26, i.e., the estimated value of the differential output VO2 from the $O_2$ sensor 6 after the dead time d of the exhaust system E. Then, the sliding mode controller 27 determines the target air-fuel ratio KCMD (the target input for the exhaust system E) in order to converge the estimated value of the output VO2/OUT (the output of the exhaust system E) of the $O_2$ sensor 6 after the dead time d, represented by the estimated differential output VO2, toward the target value VO2/TARGET. Therefore, the effect of the dead time d existing in the exhaust system E is compensated for (eliminated), thus increasing the stability of the control process for converging the output VO2/OUT of the $O_2$ sensor 6 toward the target value VO2/TARGET.

In the first embodiment, the present and preceding time-series data VO2(k), VO2(k−1) of the differential output VO2 of the $O_2$ sensor 6 (more specifically, the time-series data VO2(k+d) bar, VO2(k+d−1) bar, prior to the latest data, of the estimated differential output VO2 bar from the $O_2$ sensor 6) are used as the state quantity X to be controlled by the sliding mode controller 27, so that the processing operation of the sliding mode controller 27 can be performed on the discrete-system model of the exhaust system E. Thus, the processing operation of the sliding mode controller 27 can be a simplified operation suitable for discrete-time computer processing.

Since the discrete-system model of the exhaust system E is employed for the processing operation of the sliding mode controller 27, the gain coefficients a1, a2, b1 as parameters to be established for the discrete-system model can be identified on a real-time basis by the identifier 25 to minimize the modeling error of the discrete-system model with respect to the actual exhaust system E depending on the actual behaviors of the exhaust system E. using the gain coefficients a1, a2, b1 identified by the identifier 25, the processing operation of the sliding mode controller 27 is carried out to determine the target air-fuel ratio KCMD (the target input for the exhaust system E). The target air-fuel ration KCMD suitable for converging the output VO2/OUT of the $O_2$ sensor 6 toward the target value VO2/TARGET can be determined depending on the actual behaviors of the exhaust system E, and the output VO2/OUT of the $O_2$ sensor 6 can be converged toward the target value VO2/TARGET with high accuracy. Particularly, because the modeling error is minimized when the state quantity X to be controlled by the sliding mode controller 27 is not converged onto the hyperplane σ=0, the stability of the control process of converging the output VO2/OUT of the $O_2$ sensor 6 toward the target value VO2/TARGET is increased.

Furthermore, since the estimator 26 effects its processing operation using the discrete-system model of the exhaust system E, the processing operation of the estimator 26 can be of a simple operation suitable for computer processing. Inasmuch as the estimator 26 effects its processing operation using the gain coefficients a1, a2, b1 identified on a real-time basis by the identifier 25, it is possible to increase the accuracy of the estimated differential output VO2 bar which is indicative of the estimated value of the output VO2/OUT of the $O_2$ sensor 6 after the dead time d of the exhaust system E. In addition, because the sliding mode controller 27 determines the target air-fuel ratio KCMD using the estimated differential output VO2 bar, the output VO2/OUT of the $O_2$ sensor 6 can be converted toward the target value VO2/TARGET while reliably eliminating the effect of the dead time d.

In the first embodiment, moreover, when the identifier 25 is to identify the gain coefficients a1, a2, b1 of the discrete-system model, the identified differential output VO2 hat (corresponding to the output of the exhaust system E in the discrete-system model) and the differential output VO2 (corresponding to the actual output of the exhaust system E), which are used in the identifying process, are filtered with an weighted frequency band (the low-frequency band C in FIG. 16) where the gain of a change in the output of the exhaust system E with respect to a change in the input of the exhaust system E is relatively large, so that the identified gain coefficients a1 hat, a2 hat, b1 hat can be calculated such that the frequency characteristics of the discrete-system model will match the actual frequency characteristics of the exhaust system E. When the sliding mode controller 27 determines the target air-fuel ratio KCMD using the identified gain coefficients a1 hat, a2 hat, b1 hat and the estimator 26 calculates the estimated differential output VO2 bar, the controllability in the frequency band that is important for converging the output VO2/OUT of the $O_2$ sensor 6 toward the target value VO2/TARGET can be increased. By appropriately setting weighted characteristics of the above filtering process, the stability and quick response of the control process for converging the output VO2/OUT of the $O_2$ sensor 6 toward the target value VO2/TARGET can be increased.

In the first embodiment, the gain coefficients a1, a2, b1 of the discrete-system model are identified when the output of the exhaust system E recognized by the differential output VO2 of the $O_2$ sensor 6 behaves such that the air-fuel ratio (corresponding to the output VO2/OUT of the $O_2$ sensor 6) of the exhaust gas having passed the catalytic converter 3 changes from a lean side toward a rich side, i.e., the changing behavior of the air-fuel ratio of the exhaust gas is preferable for identifying the gain coefficients a1, a2, b1. As a consequence, it is possible to calculate the identified gain coefficients a1 hat, a2 hat, b1 hat that are preferable for appropriately determining the target air-fuel ratio KCMD with the sliding mode controller 27 and calculating the estimated differential output VO2 bar with the estimator 26, and to converge the output VO2/OUT of the $O_2$ sensor 6 reliably toward the target value VO2/TARGET.

In the first embodiment, furthermore, the stability of the identifying process carried out by the identifier 25 and the stability of the adaptive sliding mode control process carried out by the sliding mode controller 27 are determined, and if the stability of these processes is judged as being unstable, then the identifier 25 is initialized. The sliding mode controller 27 is prevented from determining an inappropriate target air-fuel ratio KCMD and the estimator 26 is prevented from determining an inappropriate estimated differential output VO2 bar, using inappropriate identified gain coefficients a1 hat, a2 hat, b1 hat.

In the first embodiment, if the adaptive sliding mode control process carried out by the sliding mode controller 27 is judged as being unstable, and until a predetermined time corresponding to the initial value TM of the timer counter tm elapses after the adaptive sliding mode control process is judged as being unstable, the target air-fuel ratio KCMD is determined with the SLD manipulating input usl as a pre-determined value. Accordingly, situations where the output VO2/OUT of the $O_2$ sensor 6 is controlled at an abnormal state are reliably eliminated.

A plant control system according to a second embodiment will be described below with reference to FIGS. 24 through 26. The plant control system according to the second embodiment differs from the plant control system according to the first embodiment only with respect to the processing of STEP5-11 carried out by the identifier 25, i.e., the process of evaluating the identified gain coefficient vector Θ (see FIGS. 11 and 13) in the first embodiment. Therefore, those parts of the second embodiment which are identical to those of the first embodiment are denoted by identical reference characters and will not be described in detail below.

According to the second embodiment, the values of the gain coefficients a1, a2, b1 that are parameters to be identified by the identifier 25, i.e., the identified gain coefficients a1 hat, a2 hat, b1 hat (elements of the identified gain coefficient vector Θ), are limited to meet predetermined conditions. Using the values of the limited identified gain coefficients a1 hat, a2 hat, b1 hat, the processing operations of the estimator 26 and the sliding mode controller 27 are carried out in the manner described above with respect to the first embodiment.

The predetermined conditions for limiting the values of the identified gain coefficients a1 hat, a2 hat, b1 hat include a condition (hereinafter referred to as a first limiting condition) for limiting combinations of the values of the identified gain coefficients a1 hat, a2 hat relative to a response delay element of the discrete-system model expressed by the equation (1) (more specifically, primary and secondary autoregressive terms) to a predetermined combination, and a condition (hereinafter referred to as a second limiting condition) for limiting the value of the identified gain coefficient b1 hat relative to a dead time element of the discrete-system model.

Prior to describing the first and second limiting conditions, the reasons for limiting the values of the identified gain coefficients a1 hat, a2 hat, b1 hat will be described below.

In the first embodiment described above, when the identifier 25 determines the identified gain coefficients a1 hat, a2 hat, b1 hat, their values are not specially limited, and the identifier 25 is initialized if the identifier 25 is judged as being unstable. The inventors of the present invention have found that while the output signal VO2/OUT of the $O_2$ sensor 6 (the concentration of oxygen in the exhaust gas having passed through the catalytic converter 3) is being stably controlled at the target value VO2/TARGET, there are developed a situation in which the target air-fuel ratio KCMD (the manipulated variable for the air-fuel ratio) determined by the sliding mode controller 27 as described above changes smoothly with time, and a situation in which the target air-fuel ratio KCMD oscillates with time at a high frequency. Neither of these situations poses problems in controlling the output VO2/OUT of the $O_2$ sensor 6 at the target value VO2/TARGET. However, the situation in which the target air-fuel ratio KCMD oscillates with time at a high frequency is not preferable in smoothly operating the internal combustion engine 1 that is controlled on the basis of the target air-fuel ratio KCMD.

A study of the above phenomenon by the inventors has shown that whether the target air-fuel ratio KCMD determined by the sliding mode controller 27 changes smoothly or oscillates at a high frequency depends on the combinations of the values of the identified gain coefficients a1 hat, a2 hat identified by the identifier 25 and the value of the identified gain coefficient b1 hat.

In the second embodiment, the first and second limiting conditions are established appropriately, and the combinations of the values of the identified gain coefficients a1 hat, a2 hat and the value of the identified gain coefficient b1 hat are appropriately limited to eliminate the situation in which the target air-fuel ratio KCMD oscillates at a high frequency, while keeping stable the controllability of the output VO2/OUT of the $O_2$ sensor 6 at the target value VO2/TARGET.

According to the second embodiment, the first and second limiting conditions are established as follows:

With respect to the first limiting condition for limiting the values of the identified gain coefficients a1 hat, a2 hat, the study by the inventors indicates that whether the target air-fuel ratio KCMD determined by the sliding mode controller 27 changes smoothly or oscillates at a high frequency is closely related to combinations of the coefficient values $\alpha 1$, $\alpha 2$ in the equation (13) which are determined by the values of the gain coefficients a1, a2, i.e., the coefficient values $\alpha 1$, $\alpha 2$ used for the estimator 26 to determine the estimated differential output VO2(k+d) bar according to the equation (13) (the coefficient values $\alpha 1$ $\alpha 2$ are the first-row, first-column element and the first-row, second-column element of the matrix $A^d$ which is a power of the matrix A defined by the equation (11)).

Figure 24:
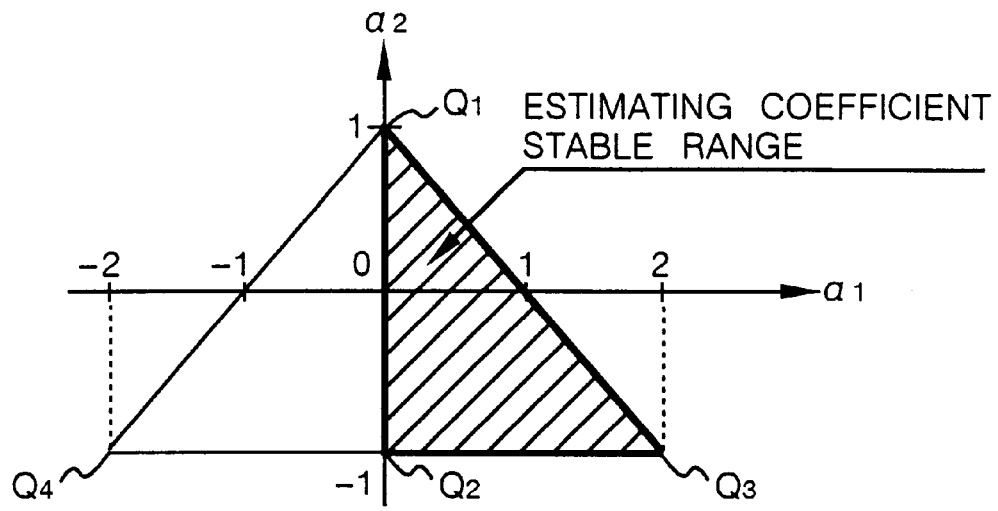
FIG. 24 is a diagram illustrative of a plant control system according to a second embodiment of the present invention.

Specifically, as shown in FIG. 24, when a coordinate plane whose coordinate components or axes are represented by the coefficient values $\alpha 1$, $\alpha 2$ is established, if a point on the coordinate plane which is determined by a combination of the coefficient values $\alpha 1$, $\alpha 2$ lies in a hatched range, which is surrounded by a triangle $Q_1 Q_2 Q_3$ (including the boundaries) and will hereinafter be referred to as an estimating coefficient stable range, then the time-dependent change of the target air-fuel ratio KCMD tends to be smooth. Conversely, if a point on the coordinate plane which is determined by a combination of the coefficient values $\alpha 1$, $\alpha 2$ does not lie in the estimating coefficient stable range, then the time-dependent change of the target air-fuel ratio KCMD tends to be oscillatory at a high frequency, or the controllability of the output VO2/OUT of the $O_2$ sensor 6 at the target value VO2/TARGET tends to be poor.

Therefore, the combinations of the values of the gain coefficients a1, a2 identified by the identifier 25, i.e., the combinations of the values of the identified gain coefficients a1 hat, a2 hat, should be limited such that the point on the coordinate plane shown in FIG. 24 which corresponds to the combination of the coefficient values $\alpha 1$, $\alpha 2$ determined by the values of the gain coefficients a1, a2 or the values of the identified gain coefficients a1 hat, a2 hat will lie within the estimating coefficient stable range.

In FIG. 24, a triangular range $Q_1 Q_4 Q_3$ on the coordinate plane which contains the estimating coefficient stable range is a range that determines combinations of the coefficient values $\alpha 1$, $\alpha 2$ which makes theoretically stable a system defined according to the following equation (51), i.e., a system defined by an equation similar to the equation (13) except that VO2(k), VO2(k−1) on the right side of the equation (13) are replaced respectively with VO2(k) bar, VO2(k−1) bar (VO2(k) bar, VO2(k−1) bar mean respectively an estimated differential output determined before the dead time d by the estimator 26 and an estimated differential output determined in a preceding cycle by the estimator 26).

$$\overline{VO2}(k+d) = \alpha 1 \cdot \overline{VO2}(k) + \alpha 2 \cdot \overline{VO2}(k-1) + \quad (51)$$

-continued $$\sum_{j=1}^{d} \beta j \cdot kact(k-j)$$

The condition for the system defined according to the equation (51) to be stable is that a pole of the system (which is given by the following equation (52)) exists in a unit circle on a complex plane:

$$\text{Pole of the system according to the equation (51)} = \frac{\alpha 1 \pm \sqrt{\alpha 1^2 + 4 \cdot \alpha 2}}{2} \quad (52)$$

The triangular range $Q_1 Q_4 Q_3$ shown in FIG. 24 is a range for determining the combinations of the coefficient values $\alpha 1$, $\alpha 2$ which satisfy the above condition. Therefore, the estimating coefficient stable range is a range indicative of those combinations where $\alpha 1 \geq 0$ of the combinations of the coefficient values $\alpha 1$, $\alpha 2$ which make stable the system defined by the equation (51).

Since the coefficient values $\alpha 1$, $\alpha 2$ are determined by a combination of the values of the gain coefficients a1, a2, a combination of the values of the gain coefficients a1, a2 is determined by a combination of the coefficient values $\alpha 1$, $\alpha 2$. Therefore, the estimating coefficient stable range shown in FIG. 24 which determines preferable combinations of the coefficient values $\alpha 1$, $\alpha 2$ can be converted into a range on a coordinate plane shown in FIG. 25 whose coordinate components or axes are represented by the gain coefficients a1, a2. Specifically, the estimating coefficient stable range shown in FIG. 24 is converted into a range enclosed by the imaginary lines in FIG. 25, which is a substantially triangular range having an undulating lower side and will hereinafter be referred to as an identifying coefficient stable range, on the coordinate plane shown in FIG. 25. Stated otherwise, when a point on the coordinate plane shown in FIG. 25 which is determined by a combination of the values of the gain coefficients a1, a2 resides in the identifying coefficient stable range, a point on the coordinate plane shown in FIG. 24 which corresponds to the combination of the coefficient values $\alpha 1$, $\alpha 2$ determined by those values of the gain coefficients a1, a2 resides in the estimating coefficient stable range.

Figure 25:
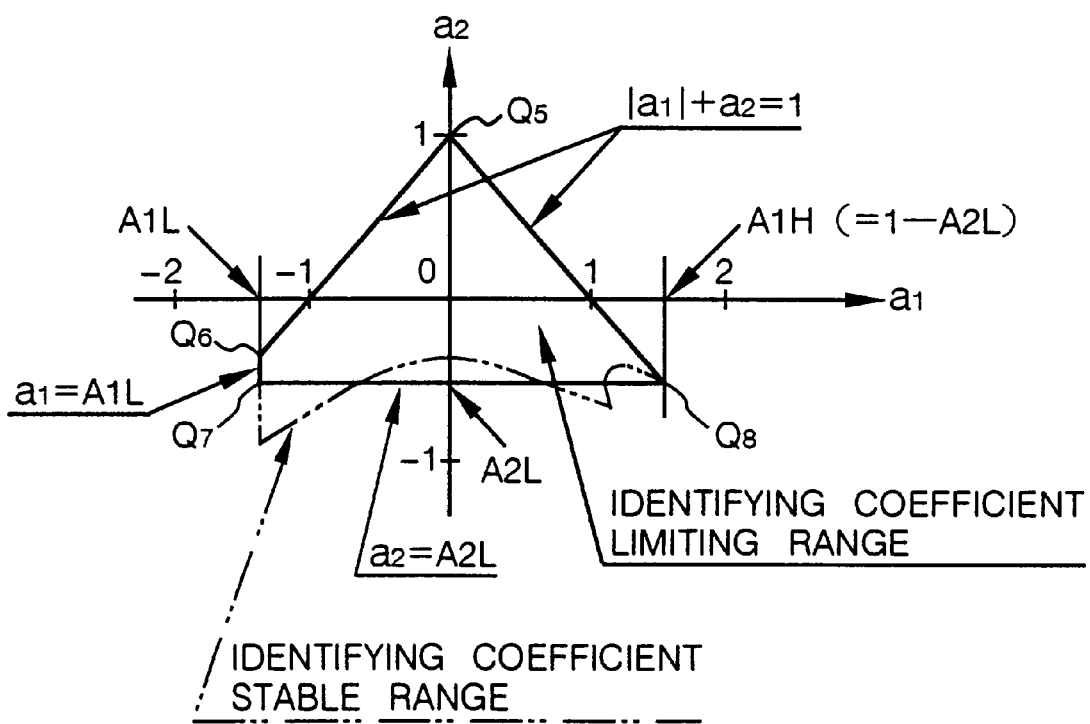
FIG. 25 is a diagram illustrative of the plant control system according to the second embodiment.

Consequently, the first limiting condition for limiting the values of the identified gain coefficients a1 hat, a2 hat determined by the identifier 25 should preferably be basically established such that a point on the coordinate plane shown in FIG. 25 which is determined by those values of the identified gain coefficients a1 hat, a2 hat reside in the identifying coefficient stable range.

However, since a boundary (lower side) of the identifying coefficient stable range indicated by the imaginary lines in FIG. 25 is of a complex undulating shape, a practical process for limiting the point on the coordinate plane shown in FIG. 25 which is determined by the values of the identified gain coefficients a1 hat, a2 hat is liable to be complex.

For this reason, according to the second embodiment, the identifying coefficient stable range is substantially approximated by a quadrangular range $Q_5 Q_6 Q_7 Q_8$ enclosed by the solid lines in FIG. 25, which has straight boundaries and will hereinafter be referred to as an identifying coefficient limiting range. As shown in FIG. 25, the identifying coefficient limiting range is a range enclosed by a polygonal line (including line segments $Q_5 Q_6$ and $Q_5 Q_8$) expressed by a functional expression |a1|+a2=1, a straight line (including a line segment $Q_6Q_7$) expressed by a constant-valued functional expression a1=A1L (A1L: constant), and a straight line (including a line segment $Q_7Q_8$) expressed by a constant-valued functional expression a2=A2L (A2L: constant). The first limiting condition for limiting the values of the identified gain coefficients a1 hat, a2 hat is established such that the point on the coordinate plane shown in FIG. 25 which is determined by those values of the identified gain coefficients a1 hat, a2 hat lies in the identifying coefficient limiting range, and the values of the identified gain coefficients a1 hat, a2 hat are limited such that the point determined by those values of the identified gain coefficients a1 hat, a2 hat lies in the identifying coefficient limiting range. Although part of the lower side of the identifying coefficient limiting range deviates from the identifying coefficient stable range, it has experimentally been confirmed that the point determined by the identified gain coefficients a1 hat, a2 hat determined by the identifier 25 does not actually fall in the deviating range. Therefore, the deviating range will not pose any practical problem.

The above identifying coefficient limiting range is given for illustrative purpose only, and may be equal to or may substantially approximate the identifying coefficient stable range, or may be of any shape insofar as most or all of the identifying coefficient limiting range belongs to the identifying coefficient stable range. Thus, the identifying coefficient limiting range may be established in various configurations in view of the ease with which to limit the values of the identified gain coefficients a1 hat, a2 hat and the practical controllability. For example, while the boundary of an upper portion of the identifying coefficient limiting range is defined by the functional expression |a1|+a2=1 in the illustrated embodiment, combinations of the values of the gain coefficients a1, a2 which satisfy this functional expression are combinations of theoretical stable limits where a pole of the system defined by the equation (52) exists on a unit circle on a complex plane. Therefore, the boundary of the upper portion of the identifying coefficient limiting range may be determined by a functional expression |a1|+a2=r (r is a value slightly smaller than "1" corresponding to the stable limits, e.g., 0.99) for higher control stability.

The above identifying coefficient stable range shown in FIG. 25 as a basis for the identifying coefficient limiting range is given for illustrative purpose only. The identifying coefficient stable range which corresponds to the estimating coefficient stable range shown in FIG. 24 is affected by the dead time d (more precisely, its set value) and has its shape varied depending on the dead time d, as can be seen from the definition of the coefficient values $\alpha 1$, $\alpha 2$ (see the equations (12), (13)). Irrespective of the shape of the identifying coefficient stable range, the identifying coefficient limiting range may be established, as described above, in a manner to match the shape of the identifying coefficient stable range.

In this embodiment, the second limiting condition for limiting the value of the gain coefficient b1 identified by the identifier 25, i.e., the value of the identified gain coefficient b1 hat, is established as follows:

The inventors have found that the situation in which the time-depending change of the target air-fuel ratio KCMD is oscillatory at a high frequency tends to happen also when the value of the identified gain coefficient b1 hat is excessively large or small. According to the second embodiment, an upper limit value B1H and a lower limit value B1L (B1H>B1L>0) for the identified gain coefficient b1 hat are determined in advance through experimentation or simulation. Then, the second limiting condition is established such that the identified gain coefficient b1 hat is equal to or smaller than the upper limit value B1H and equal to or greater than the lower limit value B1L (B1L≦b1 hat≦B1H).

A process of limiting the values of the identified gain coefficients a1 hat, a2 hat, b1 hat according to the first and second limiting conditions is carried out according to the process of evaluating the identified gain coefficient vector $\Theta$ in STEP5-11.

Figure 26:
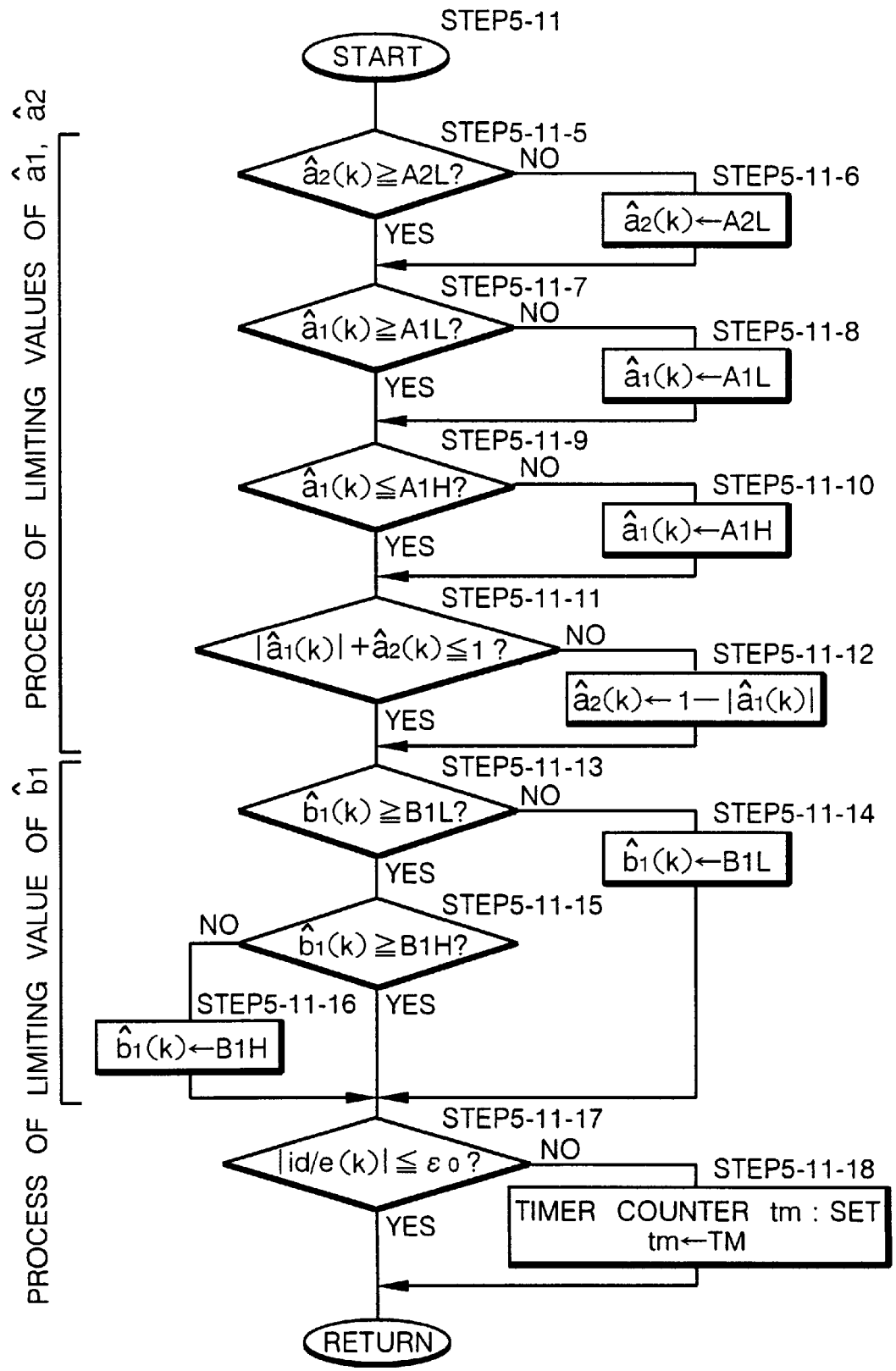
FIG. 26 is a flowchart of a control subroutine carried out by the plant control system according to the second embodiment.

Such a limiting subroutine is shown in detail in FIG. 26. As shown in FIG. 26, the identifier 25 limits combinations of the identified gain coefficients a1(k) hat, a2(k) hat determined in STEP5-10 shown in FIG. 11 according to the first limiting condition in STEP5-11-5 through STEP5-11-12.

Specifically, the identifier 25 decides whether or not the value of the identified gain coefficient a2(k) hat determined in STEP5-10 is equal to or greater than a lower limit value A2L (see FIG. 25) for the gain coefficient a2 in the identifying coefficient limiting range in STEP5-11-5.

If the value of the identified gain coefficient a2(k) is smaller than A2L, then since a point on the coordinate plane shown in FIG. 25, which is expressed by (a1(k) hat, a2(k) hat), determined by the combination of the values of the identified gain coefficients a1(k) hat, a2(k) hat does not reside in the identifying coefficient limiting range, the value of a2(k) hat is forcibly changed to the lower limit value A2L in STEP5-11-6. Thus, the point (a1(k) hat, a2(k) hat) on the coordinate plane shown in FIG. 25 is limited to a point in a region on and above a straight line, i.e., the straight line including the line segment $Q_7Q_8$, expressed by at least a2=A2L.

Then, the identifier 25 decides whether or not the value of the identified gain coefficient a1(k) hat determined in STEP5-10 is equal to or greater than a lower limit value A1L (see FIG. 25) for the gain coefficient a1 in the identifying coefficient limiting range in STEP5-11-7, and then decides whether or not the value of the identified gain coefficient a1(k) hat is equal to or smaller than an upper limit value A1H (see FIG. 25) for the gain coefficient a1 in the identifying coefficient limiting range in STEP5-11-9. The upper limit value A1H for the gain coefficient a1 in the identifying coefficient limiting range is represented by A1H=1−A2L because it is an a1 coordinate of the point $Q_8$ where the polygonal line |a1+a2=1 (a1>0) and the straight line a2=A2L intersect with each other, as shown in FIG. 25.

If the value of the identified gain coefficient a1(k) hat is smaller than the lower limit value A1L or greater than the upper limit value A1H, then since the point (a1(k) hat, a2(k) hat) on the coordinate plane shown in FIG. 25 does not reside in the identifying coefficient limiting range, the value of a1(k) hat is forcibly changed to the lower limit value A1L or the upper limit value A1H in STEP5-11-8, STEP8-11-10.

Thus, the point (a1(k) hat, a2(k) hat) on the coordinate plane shown in FIG. 25 is limited to a region on and between a straight line, i.e., the straight line including the line segment $Q_6A_7$, expressed by a1=A1L, and a straight line, i.e., the straight line passing through the point $Q_8$ and perpendicular to the a1 axis, expressed by a1=A1H.

The processing in STEP5-11-7 and STEP5-11-8 and the processing in STEP5-11-9 and STEP5-11-10 may be switched around. The processing in STEP5-11-5 and STEP5-11-6 may be carried out after the processing in STEP5-11-5 through STEP5-11-10.

Then, the identifier 25 decides whether the present values of a1(k) hat, a2(k) hat after STEP5-11-5 through STEP5-11-10 satisfy an inequality |a1|+a1≦1 or not, i.e., whether the point (a1(k) hat, a2(k) hat) is positioned on or below or on or above the polygonal line (including line segments $Q_5Q_6$ and $Q_5Q_8$) expressed by the functional expression $|a1|+a2=1$ in STEP5-11-11.

If $|a1|+a1 \leq 1$, then the point (a1(k) hat, a2(k) hat) determined by the values of a1(k) hat, a2(k) hat after STEP5-11-5 exists in the identifying coefficient limiting range (including its boundaries).

If $|a1|+a1>1$, then since the point (a1(k) hat, a2(k) hat) deviates upwardly from the identifying coefficient limiting range, the value of the a2(k) hat is forcibly changed to a value $(1-|a1(k) hat|)$ depending on the value of a1(k) hat in STEP5-11-12. Stated otherwise, while the value of a1(k) hat is being kept unchanged, the point (a1(k) hat, a2(k) hat) is moved onto a polygonal line expressed by the functional expression $|a1|+a2=1$, i.e., onto the line segment $Q_5Q_6$ or the line segment $Q_5Q_8$ which is a boundary of the identifying coefficient limiting range.

Through the above processing in STEP5-11-5 through 5-11-12, the values of the identified gain coefficients a1(k) hat, a2(k) hat are limited such that the point (a1(k) hat, a2(k) hat) determined thereby resides in the identifying coefficient limiting range. If the point (a1(k) hat, a2(k) hat) corresponding to the values of the identified gain coefficients a1(k) hat, a2(k) hat that have been determined in STEP5-10 exists in the identifying coefficient limiting range, then those values of the identified gain coefficients a1(k) hat, a2(k) hat are maintained.

The value of the identified gain coefficient a1(k) hat relative to the primary autoregressive term of the discrete-system model is not forcibly changed insofar as the value resides between the lower limit value A1L and the upper limit value A1H of the identifying coefficient limiting range. If a1(k) hat<A1L or a1(k) hat>A1H, then since the value of the identified gain coefficient a1(k) hat is forcibly changed to the lower limit value A1L which is a minimum value that the gain coefficient a1 can take in the identifying coefficient limiting range or the upper limit value A1H which is a maximum value that the gain coefficient a1 can take in the identifying coefficient limiting range, the change in the value of the identified gain coefficient a1(k) hat is minimum. Stated otherwise, if the point (a1(k) hat, a2(k) hat) corresponding to the values of the identified gain coefficients a1(k) hat, a2(k) hat that have been determined in STEP5-10 deviates from the identifying coefficient limiting range, then the forced change in the value of the identified gain coefficient a1(k) hat is held to a minimum.

After having limited the values of the identified gain coefficients a1(k) hat, a2(k) hat, the identifier 25 limits the identified gain coefficient b1(k) hat according to the second limiting condition in STEP5-11-13 through STEP5-11-16.

Specifically, the identifier 25 decides whether or not the value of the identified gain coefficient b1(k) hat determined in STEP5-10 is equal to or greater than the lower limit value B1L in STEP5-11-13. If the lower limit value B1L is greater than the value of the identified gain coefficient b1(k) hat, the value of b1(k) hat is forcibly changed to the lower limit value B1L in STEP5-11-14.

The identifier 25 decides whether or not the value of the identified gain coefficient b1(k) hat is equal to or smaller than the upper limit value B1H in STEP5-11-15. If the upper limit value B1H is greater than the value of the identified gain coefficient b1(k) hat, the value of b1(k) hat is forcibly changed to the upper limit value B1H in STEP5-11-16.

Through the above processing in STEP5-11-13 through 5-11-16, the value of the identified gain coefficient b1(k) hat is limited to a range between the lower limit value B1L and the upper limit value B1H.

After having limited the combination of the values of the identified gain coefficients a1(k) hat, a2(k) hat and the identified gain coefficient b1(k) hat, the identifier 25 effects the same processing as in STEP5-11-3, STEP5-11-4 shown in FIG. 18. Specifically, the identifier 25 decides whether or not the magnitude of the identified error id/e calculated in STEP5-8 (see FIG. 11) is of a sufficiently small value equal to or smaller than a predetermined value $\epsilon 0$, i.e., whether the identified error id/e has converged substantially toward "0" and the identified gain coefficients a1 hat, a2 hat, b1 hat have been determined definitely or not, in STEP5-11-17. If $|id/e| \leq \epsilon 0$, then control returns to the routine shown in FIG. 11.

If $|id/e| > \epsilon 0$ in STEP5-11-17, then the value of the timer counter tm, which is used to determine the stability of the sliding mode control process as described above with respect to the first embodiment, is set to the initial value TM, i.e., the timer counter tm is started, in STEP5-11-18. Then, control returns to the routine shown in FIG. 11.

Other details of the operation of the plant control system according to the second embodiment are identical to those of the plant control system according to the first embodiment. The preceding values a1(k−1) hat, a2(k−1) hat, b1(k−1) hat of the identified gain coefficients used for determining the identified gain coefficients a1(k) hat, a2(k) hat, b1(k) hat in STEP5-10 shown in FIG. 11 are the values of the identified gain coefficients limited according to the first and second limiting conditions in STEP5-11 in the preceding control cycle. Therefore, the values of the identified gain coefficients a1(k) hat, a2(k) hat, b1(k) hat determined in STEP5-10 in each control cycle can easily be settled to values that satisfy the first and second limiting conditions.

In the second embodiment, the processing in STEP8-3 shown in FIG. 21 may be dispensed with because the upper and lower limit values for the identified gain coefficient b1 are limited to positive values in STEP5-11-13 through STEP5-11-16.

The plant control system according to the second embodiment offers the same advantages as those of the plant control system according to the first embodiment. In addition, since the values of the identified gain coefficients a1(k) hat, a2(k) hat, b1(k) hat are limited according to the first and second limiting conditions as described above, the target air-fuel ratio KCMD determined by the sliding mode controller 27 is reliably prevented from oscillating at a high frequency. As a result, the internal combustion engine 1 is allowed to operated smoothly, and the output VO2/OUT of the $O_2$ sensor 6 can be controlled highly accurately at the target value VO2/TARGET.

The values of the identified gain coefficients a1(k) hat, a2(k) hat relative to the response delay element of the discrete-system model of the exhaust system E are not limited individually, but limited in their combination where their values are correlated to each other. In this manner, it is possible to obtain optimum values of the identified gain coefficients a1(k) hat, a2(k) hat for controlling the output VO2/OUT of the $O_2$ sensor 6 at the target value VO2/TARGET and reliably preventing the target air-fuel ratio KCMD from oscillating at a high frequency.

Combinations of the values of the identified gain coefficients a1(k) hat, a2(k) hat are limited such that the identified gain coefficient a1(k) hat relative to an autoregressive term of lower order on the right side of the equation (1), i.e., the primary autoregressive term, or stated otherwise, the identified gain coefficient a1(k) hat relative to a newer output VO2/OUT or differential output VO2 from the $O_2$ sensor 6 in the discrete-system model expressed by the equation (1), will be changed minimally, for thereby calculating the target air-fuel ratio KCMD more reliably for stable control.

Inasmuch as the identifying coefficient limiting range (see FIG. 25) for limiting combinations of the values of the identified gain coefficients a1(k) hat, a2(k) hat has its boundaries established as straight lines, the process for limiting the values of the identified gain coefficients a1(k) hat, a2(k) hat can be effected with ease.

The present invention is not limited to the first and second embodiments described above, but may be modified as follows:

In the first and second embodiments, the LAF sensor (wide-range air-fuel ratio sensor) 5 is employed as second detecting means. However, the second detecting means may comprise an ordinary $O_2$ sensor or any of various other types of sensors insofar as it can detecting the air-fuel ratio of an exhaust gas.

In the first and second embodiments, the $O_2$ sensor 6 is employed as first detecting means. However, the first detecting means may comprise any of various other types of sensors insofar as it can detect the concentration of a certain component of an exhaust gas downstream of the catalytic converter to be controlled. For example, if carbon monoxide in an exhaust gas downstream of the catalytic converter is to be controlled, the first detecting means may comprise a CO sensor. If nitrogen oxide (NOx) in an exhaust gas downstream of the catalytic converter is to be controlled, the first detecting means may comprise an NOx sensor. If hydrocarbon (HC) in an exhaust gas downstream of the catalytic converter is to be controlled, the first detecting means may comprise an HC sensor. When a three-way catalytic converter is employed, then even if the concentration of any of the above gas components is detected, it may be controlled to maximize the purifying performance of the three-way catalytic converter. If a catalytic converter for oxidation or reduction is employed, then purifying performance of the catalytic converter can be increased by directly detecting a gas component to be purified.

In the first and second embodiments, the differential output kact from the LAF sensor 5 and the differential output VO2 from the $O_2$ sensor 6 are employed in constructing the discrete-system model of the exhaust system E and performing the processing operation of the identifier 25, the estimator 26, and the sliding mode controller 27. However, the output KACT of the LAF sensor 5 and the output VO2/OUT of the $O_2$ sensor 6 may directly be employed in constructing the discrete-system model of the exhaust system E and performing the processing operation of the identifier 25, the estimator 26, and the sliding mode controller 27. It is preferable, however, to employ the differential outputs kact, VO2 for simplifying the discrete-system model of the exhaust system E and also simplifying the processing operation of the identifier 25, the estimator 26, and the sliding mode controller 27. The reference value FLAF/BASE relative to the differential output kact (=KACT−FLAF/BASE) may not necessarily be of a constant value, but may be established depending on the rotational speed NE and intake pressure PB of the internal combustion engine 1.

In the first and second embodiments, the manipulated variable determined by the air-fuel ratio manipulated variable determining unit 13 is used as the target air-fuel ratio KCMD (the target input for the exhaust system E) for the exhaust gas introduced into the catalytic converter 3, and the amount of fuel supplied to the internal combustion engine 1 is feedback-controlled according to the target air-fuel ratio KCMD. However, it is possible for the air-fuel ratio manipulated variable determining unit 13 to determine a corrective quantity for the amount of fuel supplied to the internal combustion engine 1, or it is also possible to control the amount of fuel supplied to the internal combustion engine 1 in a feedforward fashion from the target air-fuel ratio KCMD.

In the first and second embodiments, the sliding mode controller 27 performs the adaptive sliding mode control process having the adaptive control law in view of the effect of disturbances. However, the sliding mode controller 27 may perform a general sliding mode control process free of the adaptive control law.

In the first and second embodiments, state quantities to be controlled by the sliding mode controller 27 are two differential outputs VO2(k), VO2(k−1). However, more state quantities, e.g., differential outputs VO2(k), VO2(k−1), VO2(k−2), etc. may be controlled by the sliding mode controller 27.

In the first and second embodiments, if the adaptive sliding mode control process is judged as being unstable, the SLD manipulating input usl is forcibly set to a predetermined value, and hence the target air-fuel ratio KCMD is set to a predetermined value. However, if the adaptive sliding mode control process is judged as being unstable, a controller such as a PID controller of the like, separate from the air-fuel ratio manipulated variable determining unit 13, may be used to determine target air-fuel ratio KCMD for temporarily converging the output signal VO2/OUT of the $O_2$ sensor 6 toward the target value VO2/TARGET.

In the first and second embodiments, the processing operation of the estimator 26 and the processing operation of the sliding mode controller 27 are carried out on the basis of the same discrete-system model of the exhaust system E which is expressed by the equation (1). However, the processing operation of the estimator 26 and the processing operation of the sliding mode controller 27 may be performed on respective different discrete-system models. In such a case, parameters of the discrete-system model for the estimator 26 may be maintained at predetermined values, or may be established appropriately using a map or the like depending on the operating conditions of the internal combustion engine 1 and the deteriorated state of the catalytic converter 3, and the processing operation of the estimator 26 may be may be performed on a continuous-system model of the exhaust system E.

If the dead time of the exhaust system is sufficiently small, then the estimator 26 may be dispensed with. In such case, the dead time d may be set to d=0 and the processing operation of the estimator 26 may be dispensed with in the first embodiment. The sliding mode controller may determine the equivalent control input ueq, the reaching control law input urch, and the adaptive control law uadp for determining the target air-fuel ratio KCMD according to the equations (20), (21), (25) where d=0. For limiting the values of parameters identified by the identifier 25 according to the second embodiment, limiting conditions may be established through experimentation or simulation in view of control stability irrespectively of the processing operation of the estimator 26.

In the first and second embodiments, the target air-fuel ratio KCMD is determined by the sliding mode controller 27 using the gain coefficients a1, a2, b1 of the discrete-system model are identified by the identifier 25. However, the target air-fuel ratio KCMD may be determined using the gain coefficients a1, a2, b1 identified by a recursive-type controller such as an adaptive controller or the like. Alternatively, a fuzzy controller or a neural-network controller may be used insofar as it can determine the target air-fuel ratio KCMD using the identified gain coefficients a1, a2, b1.

In the first and second embodiments, the dead time d of the exhaust system E is set to a predetermined value. However, it is possible to identify the dead time d together with the gain coefficients a1, a2, b1. In such a case, the value of the identified dead time d may be limited according to suitable limiting conditions as with the second embodiment.

In the first and second embodiments, the gain coefficients a1, a2, b1 are identified by the identifier 25 on a behavioral change when the air-fuel ratio of the exhaust gas having passed through the catalytic converter 3 changes from a lean side to a rich side. However, the gain coefficients a1, a2, b1 may be identified by the identifier 25 on a behavioral change when the air-fuel ratio of the exhaust gas having passed through the catalytic converter 3 changes from a rich side to a lean side. Alternatively, the gain coefficients a1, a2, b1 may be identified on any arbitrary behavioral change, not on the particular behavioral change, or may be identified differently on a behavioral change when the air-fuel ratio of the exhaust gas having passed through the catalytic converter 3 changes from a lean side to a rich side, and on a behavioral change when the air-fuel ratio of the exhaust gas having passed through the catalytic converter 3 changes from a rich side to a lean side. In such a case, the gain coefficients a1, a2, b1 used by the estimator 26 and the sliding mode controller 27 are gain coefficients that are actually identified in the present control cycle by the identifier 25.

In the first and second embodiment, the plant control system serves to control a plant which comprises the exhaust system E. However, the plant control system may be used to control another plant.

A plant control system according to a third embodiment of the present invention will be described below with reference to FIG. 27.

Figure 27:
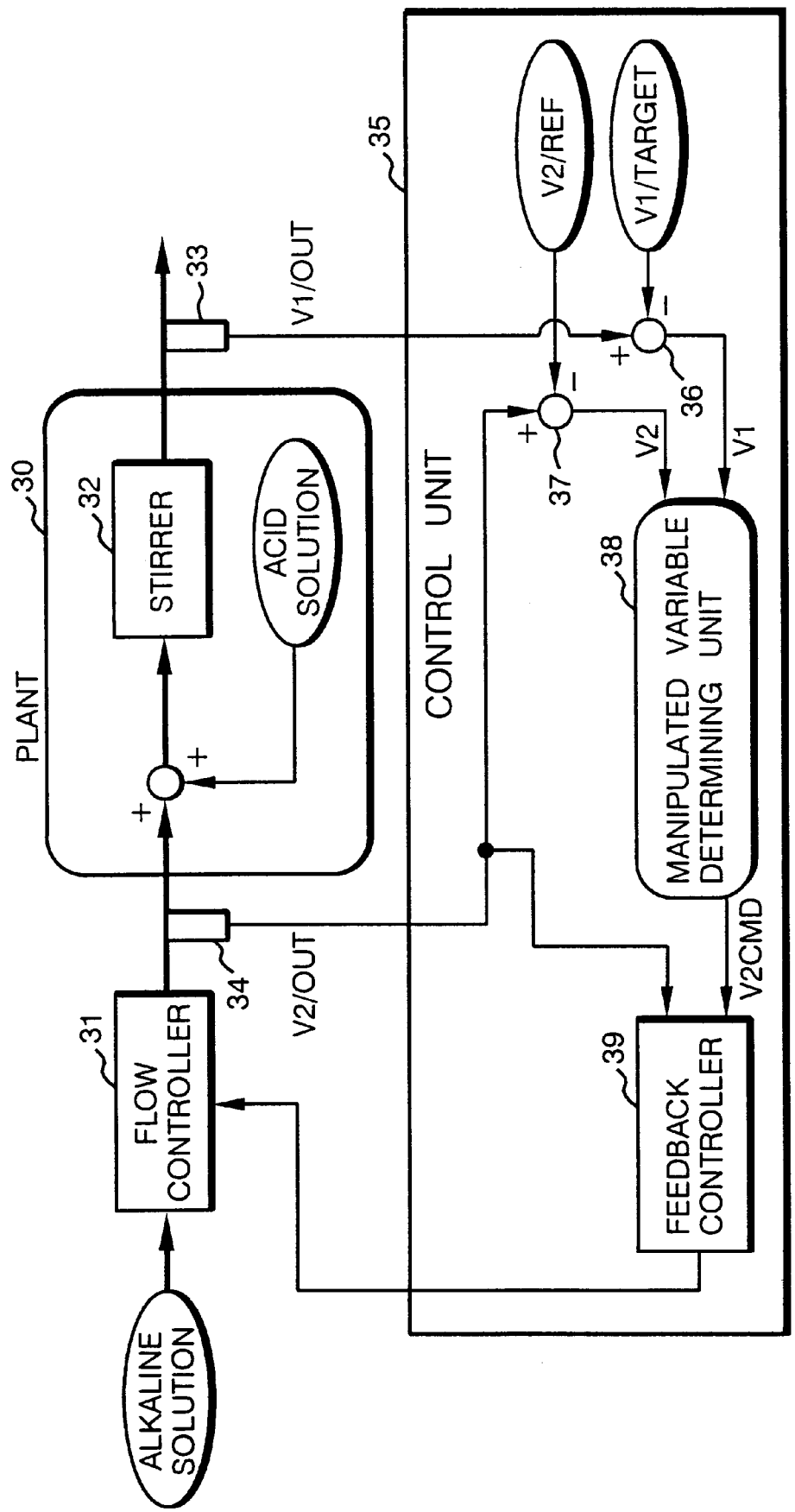
FIG. 27 is a diagram illustrative of a plant control system according to a third embodiment of the present invention.

As shown in FIG. 27, a plant 30 is supplied with an alkaline solution at a flow rate which can be regulated by a flow controller (actuator) 31. The plant 30 mixes the supplied alkaline solution with an acid solution, and stirs them into a mixed solution with a stirrer 32.

The plant control system according to the third embodiment shown in FIG. 27 serves to control the flow rat e of the alkaline solution supplied to the plant 30 for adjusting the pH of the mixed solution (the mixture of the alkaline solution and the acid solution) discharged from the plant 30 to a desired pH, i.e., a pH corresponding to a neutral value.

The plant control system has a pH sensor 33 (first detecting means) disposed at the outlet of the plant 30 for detecting the pH of the mixed solution discharged from the plant 30, a flow rate sensor 34 disposed at the inlet of the plant 30 for detecting the flow rate of the alkaline solution supplied to the plant 30, and a control unit 35 for performing a processing operation (described later on) based on respective outputs V1/OUT, V2/OUT of the pH sensor 33 and the flow rate sensor 34.

The control unit 35 comprises a microcomputer or the like. The control unit 35 comprises a subtractor 36 for calculating a difference V1 (=V1/OUT−V1/TARGET, which will hereinafter referred to as a differential output V1 from the pH sensor 33) between the output V1/OUT of the pH sensor 33 and a target value V1/TARGET (which corresponds to a target pH of the mixed solution) therefor, as data representing the output of the pH sensor 33, a subtractor 37 for calculating a difference V2 (=V2/OUT−V1/REF, which will hereinafter referred to as a differential output V2 from the flow rate sensor 34) between the output V2/OUT of the flow rate sensor 34 and a predetermined reference value V1/REF (which may be an arbitrary value), as data representing the output of the flow rate sensor 34, a manipulated variable determining unit 38 for determining a target flow rate V2CMD for the alkaline solution supplied to the plant 30 for converging the output V1/OUT of the pH sensor 33 toward the target value V1/TARGET based on the differential outputs V1, V2, as a manipulated variable for determining the input to the plant 30, an d a feedback controller 39 for feedback-controlling a controlled variable for the flow controller 31 for equalizing the output V2/OUT (detected flow rate) of the flow rate sensor 34 to the target flow rate V2CMD.

The manipulated variable determining unit 38 has an identifier, an estimator, and a sliding mode controller (not shown) which are identical to those of the air-fuel ratio manipulated variable determining unit 13 according to the first embodiment. The manipulated variable determining unit 38 employs a discrete-system model of the plant 30 where VO2, kact in the equation (1) described above are replaced respectively with the differential outputs V1, V2, and carries out the same processing operations as those of the identifier 25, the estimator 26, and the sliding mode controller 27 of the air-fuel ratio manipulated variable determining unit 13 to calculate identified values (which correspond to the identified gain coefficients a1 hat, a2 hat, b1 hat in the first embodiment) of parameters of the discrete-system model of the plane 30, an estimated value (which corresponds to the estimated differential output VO2 bar in the first embodiment) of the output V1/OUT or the differential output V1 of the pH sensor 33 after a dead time existing in the plant 30, and the target flow rate V2CMD (which corresponds to the target air-fuel ratio KCMD in the first embodiment) using the identified values of the parameters and the estimated value of the output V1/OUT or the differential output V1 of the pH sensor 33.

The filtering process in the identifier and the filtering process in the estimator according to the first embodiment are carried out in view of the frequency characteristics of the plant 30. Basically, a filtering process with importance attached to a frequency band where the gain of a change in the output from the plant 30 with respect to a change in the input to the plant 30 is relatively large may be carried out as required in the same manner as with the first and second embodiments.

For carrying out the identifying process with the identifier in a particular behavioral state of the plant 30, a behavioral state suitable for identifying parameters of the discrete-system model may be determined through experimentation or the like, and may be recognized on the basis of the output V1/OUT or the differential output V1 of the pH sensor 33 for performing the identifying process.

For limiting the values of parameters of the discrete-system model to be identified by the identifier as with the second embodiment, conditions for limiting the values of the parameters or their combinations may be established through experimentation or simulation in view of the controllability of the output V1/OUT of the pH sensor 33 at the target value V1/TARGET, the stability of the target flow rate V2CMD, and the stability of operation of the flow controller 31 depending thereon, in the same manner as with the second embodiment.

As with the general feedback controller 15 according to the first and second embodiments, the feedback controller 39 feedback-controls the operation of the flow controller 31 to equalize the output V2/OUT (detected flow rate) of the flow rate sensor 34 to the target flow rate V2CMD with a PID controller, an adaptive controller, or the like (not shown).

The plant control system according to the second embodiment shown in FIG. 24 is effective to control the output V1/OUT of the pH sensor 33, i.e., the pH of the mixed solution generated by the plant 30, accurately at a desired pH according to the adaptive sliding mode control process regardless of the effect of disturbances and the dead time existing in the plant 30, without recognizing the pH of the acid solution mixed with the alkaline solution in the plant 30 and the flow rate of the acid solution.

The plant control system according to the third embodiment shown in FIG. 27 may be modified in the same manner as the plant control system according to the first and second embodiments in which the exhaust system E is regarded as a plant.

Although certain preferred embodiments of the present invention have been shown and described in detail, it should be understood that various changes and modifications may be made therein without departing from the scope of the appended claims.

What is claimed is:

1. A plant control system for controlling a plant modeled as a discrete-system model including an element relative to a response delay of the plant, comprising:

an actuator for generating an input to the plant;

first detecting means for detecting an output from the plant;

second detecting means for detecting the input to the plant which is generated by said actuator;

identifying means for identifying parameters to be established of said discrete-system model based on data representing an output of said first detecting means and data representing an output of said second detecting means; and manipulated variable determining means for determining a manipulated variable which determines the input to the plant to control operation of said actuator such that the output from said first detecting means will be equalized to a predetermined target value, according to a predetermining algorithm using the parameters of said discrete-system model which are identified by said identifying means.

2. A plant control system according to claim 1, wherein said plant comprises a system of an exhaust system of an internal combustion engine which ranges from a position upstream of a catalytic converter in the exhaust system to a position downstream of the catalytic converter, and wherein said input to said plant comprises an air-fuel ratio of an exhaust gas generated by said internal combustion engine as said actuator and introduced into said catalytic converter, and said output from said plant comprises the concentration of a component of the exhaust gas which has passed through said catalytic converter.

3. A plant control system according to claim 1 or 2, wherein said parameters identified by said identifying means include a gain coefficient of the element relative to the response delay of said discrete-system model.

4. A plant control system according to claim 1 or 2, wherein said data representing the output of said first detecting means comprises a difference between the output of said first detecting means and said target value, and said data representing the output of said second detecting means comprises a difference between the output of said second detecting means and a predetermined reference value.

5. A plant control system according to claim 1 or 2, wherein said discrete-system model includes an element relative to a dead time of the plant, further comprising:

estimating means for generating data representing an estimated value of the output of said first detecting means after the dead time, based on the data representing the output of said first detecting means and the data representing the output of said second detecting means in said discrete-system model;

said manipulated variable determining means comprising means for determining said manipulated variable such that said estimated value, represented by the data generated by said estimating means, of the output of said first detecting means after the dead time will be equalized to said target value.

6. A plant control system according to claim 5, wherein said parameters identified by said identifying means include a gain coefficient of the element relative to the response delay of said discrete-system model and a gain coefficient of the element relative to said dead time.

7. A plant control system according to claim 5, wherein said data representing the output of said first detecting means comprises a difference between the output of said first detecting means and said target value, and said data representing the output of said second detecting means comprises a difference between the output of said second detecting means and a predetermined reference value, and wherein said data generated by said estimating means and representing the estimated value of the output of said first detecting means after the dead time comprises a difference between the estimated value of the output of said first detecting means and said target value.

8. A plant control system according to claim 5, wherein said manipulated variable determining means comprises means for determining said manipulated variable from the data representing the estimated value of the output of said first detecting means after said dead time according to a sliding mode control process.

9. A plant control system according to claim 8, wherein said manipulated variable determining means comprises means for determining said manipulated variable according to an adaptive sliding mode control process taking into account the effect of a disturbance or a modeling error.

10. A plant control system according to claim 5, wherein said estimating means comprises means for generating the data representing the estimated value of the output of said first detecting means after the dead time, according to a predetermined estimating algorithm using the data representing the output of said first detecting means and the data representing the output of said second detecting means and a plurality of coefficient values determined by values of the parameters to be identified by said identifying means, and said identifying means comprises means for limiting the values of the parameters to values which satisfy predetermined conditions, said predetermined conditions being established such that said coefficient values determined by the values of the parameters are provided in a predetermined combination.

11. A plant control system according to claim 1 or 2, wherein said manipulated variable determining means comprises means for determining said manipulated variable from the data representing the output of said first detecting means according to a sliding mode control process.

12. A plant control system according to claim 11, wherein said manipulated variable determining means comprises means for determining said manipulated variable according to an adaptive sliding mode control process taking into account the effect of a disturbance or a modeling error.

13. A plant control system according to claim 1 or 2, wherein said manipulated variable to be determined by said manipulated variable determining means comprises a target input to said plant, further comprising:

feedback control means for feedback-controlling operation of said actuator such that the output of said second detecting means will be equalized to said target input.

14. A plant control system according to claim 13, wherein said feedback control means comprises a recursive-type controller.

15. A plant control system according to claim 14, wherein said recursive-type controller comprises an adaptive controller.

16. A plant control system according to claim 1 or 2, wherein said identifying means comprises means for identifying said parameters according to an algorithm to minimize an error between an identified value of the data representing the output of said first detecting means in said discrete-system model and the data representing actual data of said first detecting means, further comprising means for filtering the identified value of the data representing the output of said first detecting means in said discrete-system model and the data representing the actual data of said first detecting means with predetermined identical frequency characteristics having a predetermined weighted frequency band when said identifying means calculates said error.

17. A plant control system according to claim 16, wherein said frequency characteristics are established such that frequency characteristics of a gain of said discrete-system model and frequency characteristics of a gain of said plant have substantially identical tendencies, and the gain at each frequency of said discrete-system model is greater than the gain at each frequency of said plant.

18. A plant control system according to claim 16, wherein said frequency characteristics are established such that frequency characteristics of a gain of said discrete-system model and frequency characteristics of a gain of said plant have substantially identical tendencies, and the gain at each frequency of said discrete-system model is greater than the gain at each frequency of said plant in a frequency band other than said predetermined weighted frequency band.

19. A plant control system according to claim 2, wherein said identifying means comprises means for identifying said parameters depending on a particular behavior of the output of said first detecting means.

20. A plant control system according to claim 19, wherein said first detecting means comprises an oxygen concentration sensor for detecting an oxygen concentration in the exhaust gas which has passed through said catalytic converter, said particular behavior being such that the air-fuel ratio of the exhaust gas represented by the output of said first detecting means changes from a lean side to a rich side.

21. A plant control system according to claim 2, wherein said identifying means comprises means for limiting values of said parameters to be identified by said identifying means to values which satisfy predetermined conditions.

22. A plant control system according to claim 1 or 2, further comprising means for determining stability of a process carried out by said identifying means to identify the parameters, said identifying means comprising means for resetting values of the parameters or a predetermined variable used by the identifying means in the process to identify the parameters, to a predetermined initial value if the process carried out by said identifying means to identify the parameters is judged as being unstable.

23. A plant control system according to claim 1 or 2, further comprising means for determining stability of a process carried out by said manipulated variable determining means to determine the manipulated variable, said identifying means comprising means for resetting values of the parameters or a predetermined variable used by the identifying means in a process to identify the parameters, to a predetermined initial value if the process carried out by said manipulated variable determining means to determine the manipulated variable is judged as being unstable.

24. A plant control system according to claim 1, wherein said identifying means comprises means for identifying said parameters depending on a particular behavior of the output of said first detecting means.

25. A plant control system according to any one of claims 19, 20 or 24, wherein said identifying means comprises means for deciding whether the output of said first detecting means is having said particular behavior, based on a value of a predetermined function determined by a plurality of present and previous time-series data representing the output of said first detecting means.

26. A plant control system according to claim 1, wherein said identifying means comprises means for limiting values of said parameters to be identified by said identifying means to values which satisfy predetermined conditions.

27. A plant control system according to claim 26 or 21, wherein said predetermined conditions include a condition for limiting combinations of values of at least two of said parameters to a predetermined combination.

28. A plant control system according to claim 26 or 21, wherein said predetermined conditions include a condition for limiting a value of at least one of said parameters to be identified by said identifying means to upper and lower limit values.

29. A plant control system according to claim 26 or 21, wherein said identifying means comprises means for updating and identifying the values of said parameters which have been determined in past control cycles, in each control cycle, the values in the past of said parameters used in said algorithm being limited to values which satisfy said predetermined conditions.

30. A plant control system according to claim 26 or 21, wherein said element relative to the response delay of said discrete-system model includes an element relative to a primary autoregressive term and an element relative to a secondary autoregressive term, said parameters to be identified by said identifying means including a first gain coefficient of the element relative to the primary autoregressive term and a second gain coefficient of the element relative to the secondary autoregressive term, said predetermined conditions being established such that a point on a coordinate plane having two coordinate components represented by values of said first and second gain coefficients resides in a predetermined range defined on said coordinate system.

31. A plant control system according to claim 30, wherein said predetermined range has straight boundaries.

32. A plant control system according to claim 30, wherein said predetermined range has boundaries, at least part of said boundaries being defined by a predetermined functional expression having variables represented by said first and second gain coefficients.

33. A plant control system according to claim 30, wherein said identifying means comprises means for changing the values of said first and second gain coefficients to values in said predetermined range to minimize a change in the value of the first gain coefficient for thereby limiting the values of the first and second gain coefficients, if a point on the coordinate plane determined by the values of said first and second gain coefficients identified based on the data representing the outputs of said first and second detecting means deviates from said predetermined range.

* * * * *